(12) United States Patent  (10) Patent No.: US 8,810,673 B2
Yoshizumi  (45) Date of Patent: Aug. 19, 2014

(54) COMPOSITION DETERMINATION DEVICE, COMPOSITION DETERMINATION METHOD, AND PROGRAM

(75) Inventor: Shingo Yoshizumi, Tokyo (JP)

(73) Assignee: Sony Corporation (JP)

( * ) Notice: Subject to any disclaimer, the term of this patent is extended or adjusted under 35 U.S.C. 154(b) by 534 days.

(21) Appl. No.: 12/381,982

(22) Filed: Mar. 18, 2009

(65) Prior Publication Data

US 2009/0256925 A1 Oct. 15, 2009

(30) Foreign Application Priority Data

Mar. 19, 2008 (JP) ................. P2008-071721

(51) Int. Cl.
*H04N 5/228* (2006.01)
*G06K 9/36* (2006.01)

(52) U.S. Cl.
USPC ........................................ 348/222.1; 382/276

(58) Field of Classification Search
USPC ............. 348/333.12, 143; 382/103, 203, 236, 382/190; 345/473
See application file for complete search history.

(56) References Cited

U.S. PATENT DOCUMENTS

| 6,661,450 | B2 | 12/2003 | Yata |
| 2004/0207743 | A1* | 10/2004 | Nozaki et al. ............. 348/333.12 |
| 2005/0046730 | A1* | 3/2005 | Li ............................ 348/333.12 |
| 2005/0088542 | A1 | 4/2005 | Stavely et al. |
| 2005/0219393 | A1 | 10/2005 | Sugimoto |
| 2006/0098104 | A1* | 5/2006 | Fujii et al. .................. 348/222.1 |
| 2006/0204054 | A1 | 9/2006 | Steinberg et al. |
| 2006/0244866 | A1* | 11/2006 | Kishida .......................... 348/699 |
| 2007/0127788 | A1 | 6/2007 | Kakinuma et al. |
| 2008/0166052 | A1* | 7/2008 | Hatano ........................... 382/190 |
| 2008/0239104 | A1* | 10/2008 | Koh ........................... 348/240.99 |
| 2009/0135188 | A1* | 5/2009 | Ding et al. ..................... 345/473 |

FOREIGN PATENT DOCUMENTS

| EP | 1280336 | A2 | 1/2003 |
| EP | 1855464 | A2 | 11/2007 |
| JP | 59-208983 | A | 11/1984 |
| JP | 2001-268425 | A | 9/2001 |
| JP | 2001245278 | A | 9/2001 |
| JP | 2004151523 | A | 5/2004 |
| JP | 2004356718 | A | 12/2004 |
| JP | 2007-156693 | A | 6/2007 |
| JP | 2007179569 | A | 7/2007 |
| JP | 2008042729 | A | 2/2008 |

(Continued)

OTHER PUBLICATIONS

Office Action from Japanese Application No. 2008-071721, dated Feb. 2, 2010.

(Continued)

*Primary Examiner* — Mekonnen Dagnew
(74) *Attorney, Agent, or Firm* — Lerner, David, Littenberg, Krumholz & Mentlik, LLP

(57) ABSTRACT

A composition determination device includes: a subject detection unit configured to detect a subject in an image based on acquired image data; a still detection unit configured to detect a still state, with an image based on the image data, or a subject detected by the subject detection unit, as the object thereof; and a composition determination unit configured to determine a composition, with only real subjects or only unreal subjects, of subjects detected by the subject detection unit, as the object thereof, based on detection results of the still detection unit.

17 Claims, 43 Drawing Sheets

(56) References Cited

FOREIGN PATENT DOCUMENTS

| | | |
|---|---|---|
| TW | 373396 | 11/1999 |
| TW | 378278 B | 1/2000 |
| TW | 200608779 | 3/2006 |

OTHER PUBLICATIONS

European Search Report EP 09155492, dated Mar. 30, 2010.
Office Action from Taiwan Application No. 098108465, dated Aug. 31, 2012.

* cited by examiner

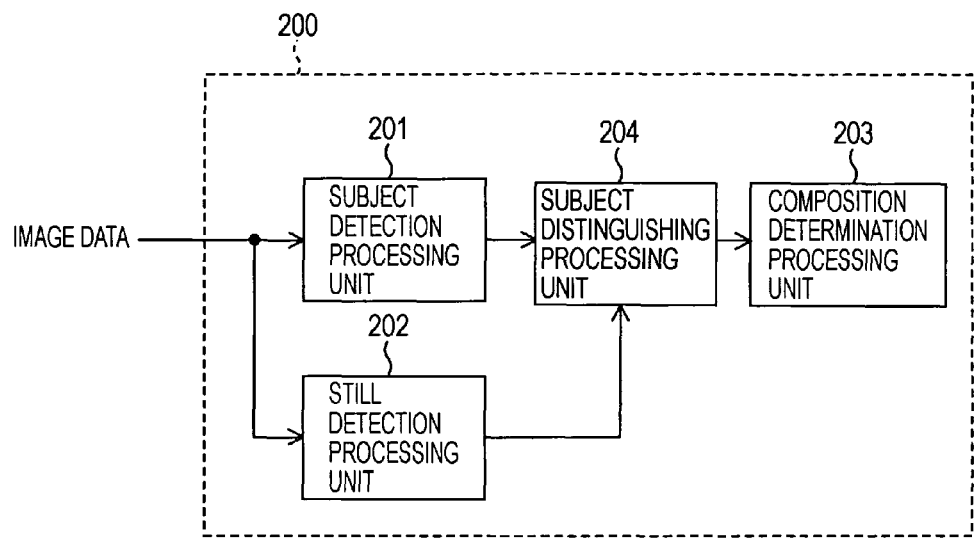
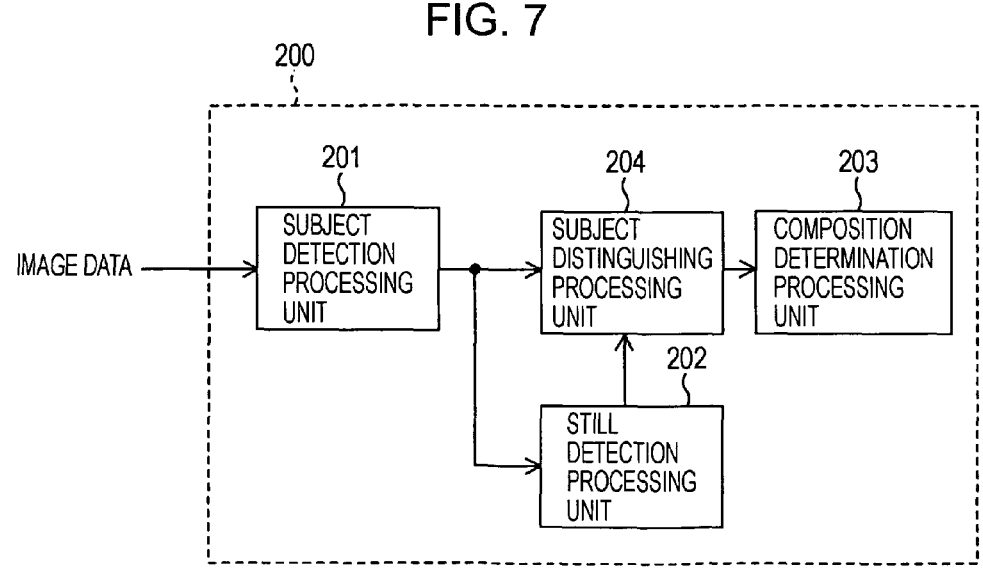

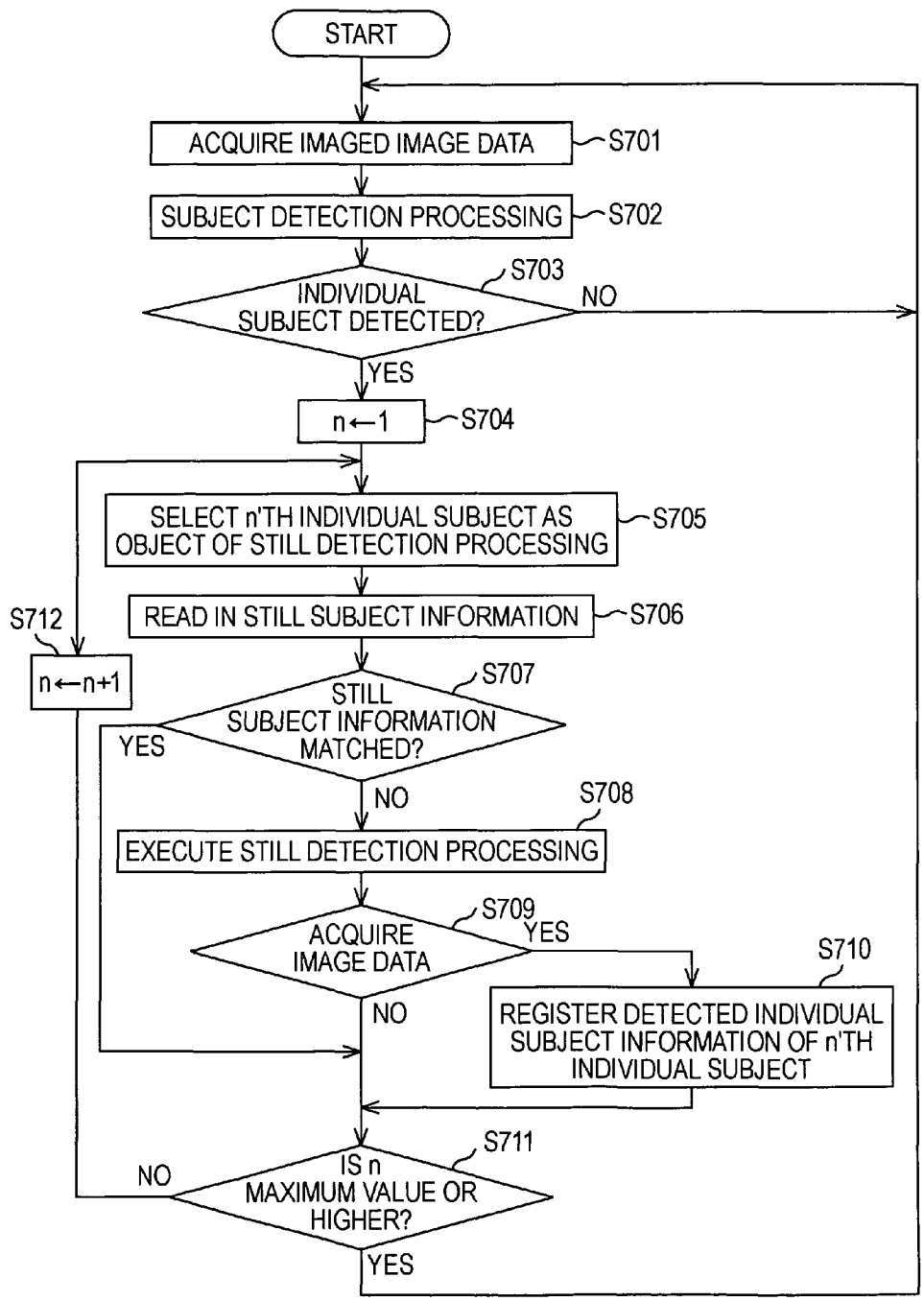

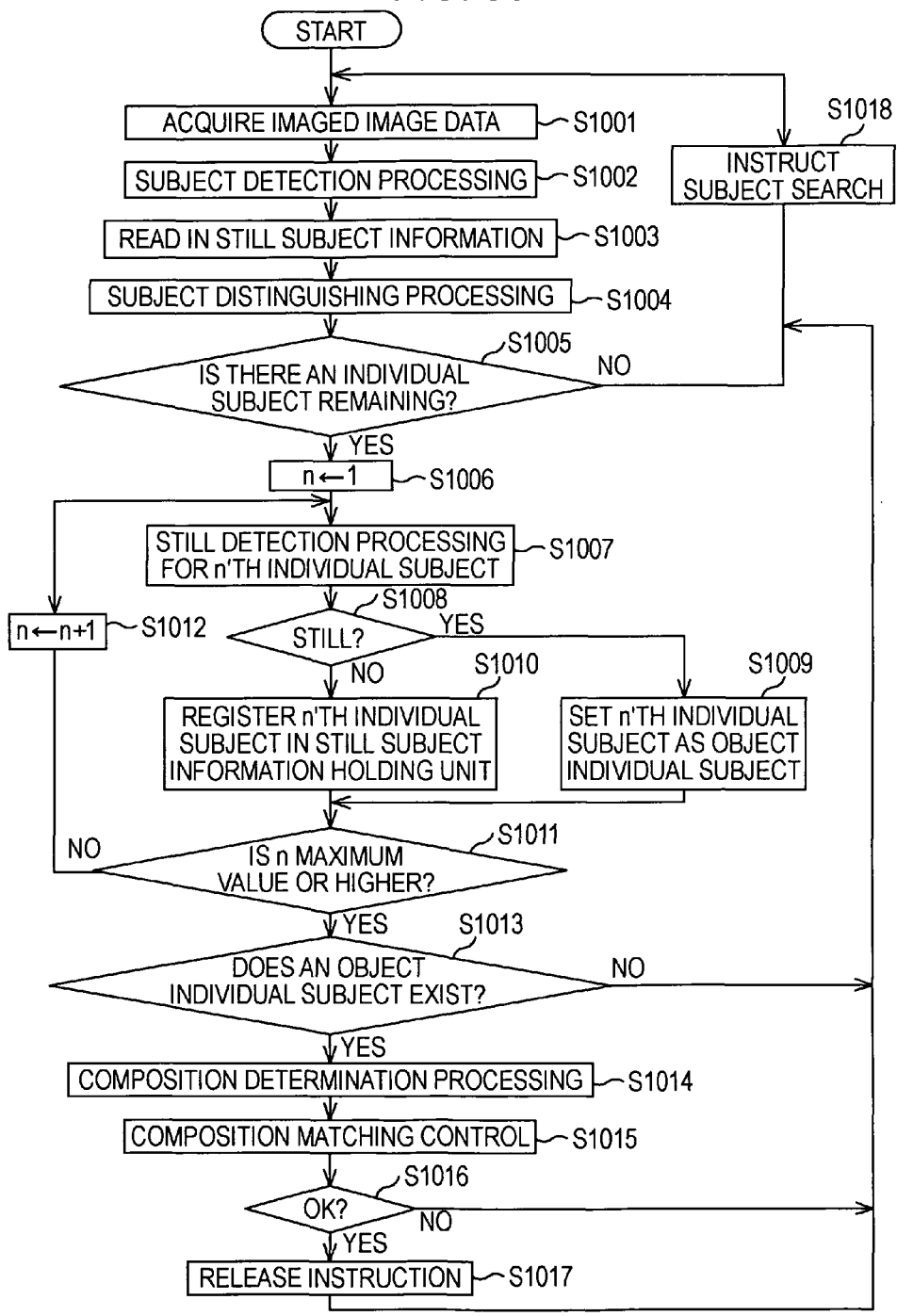

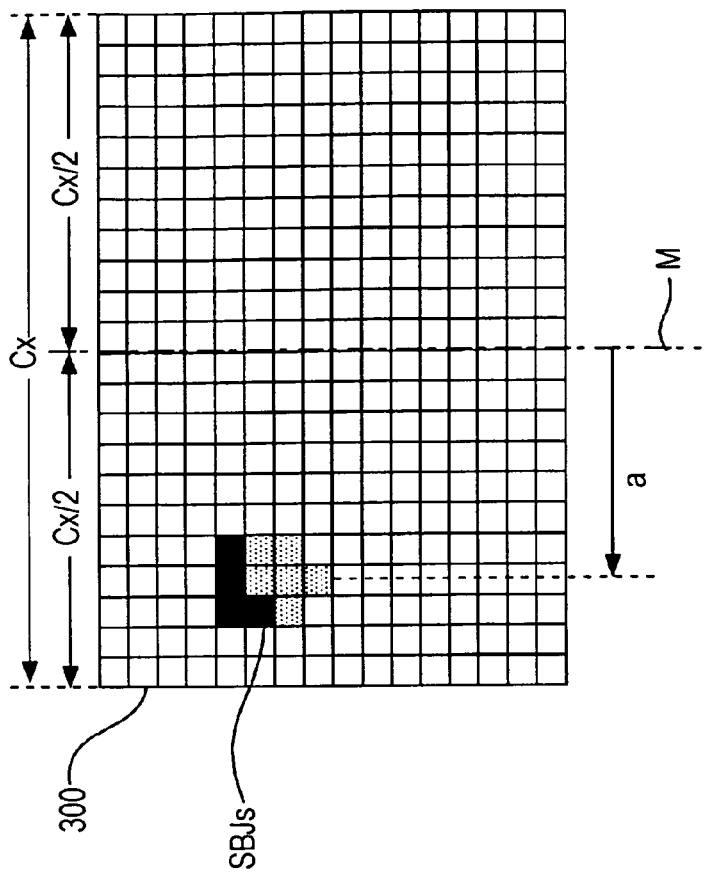

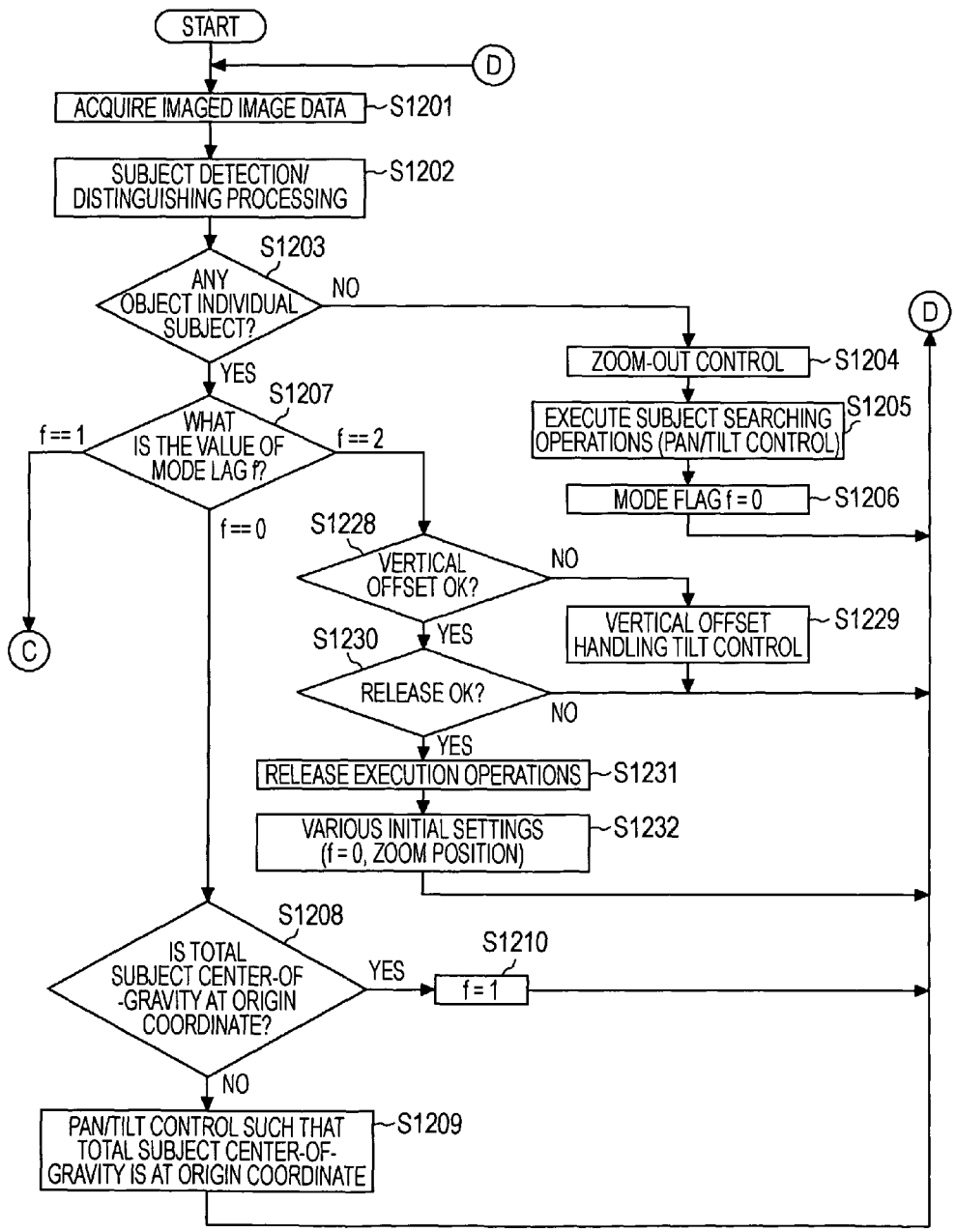

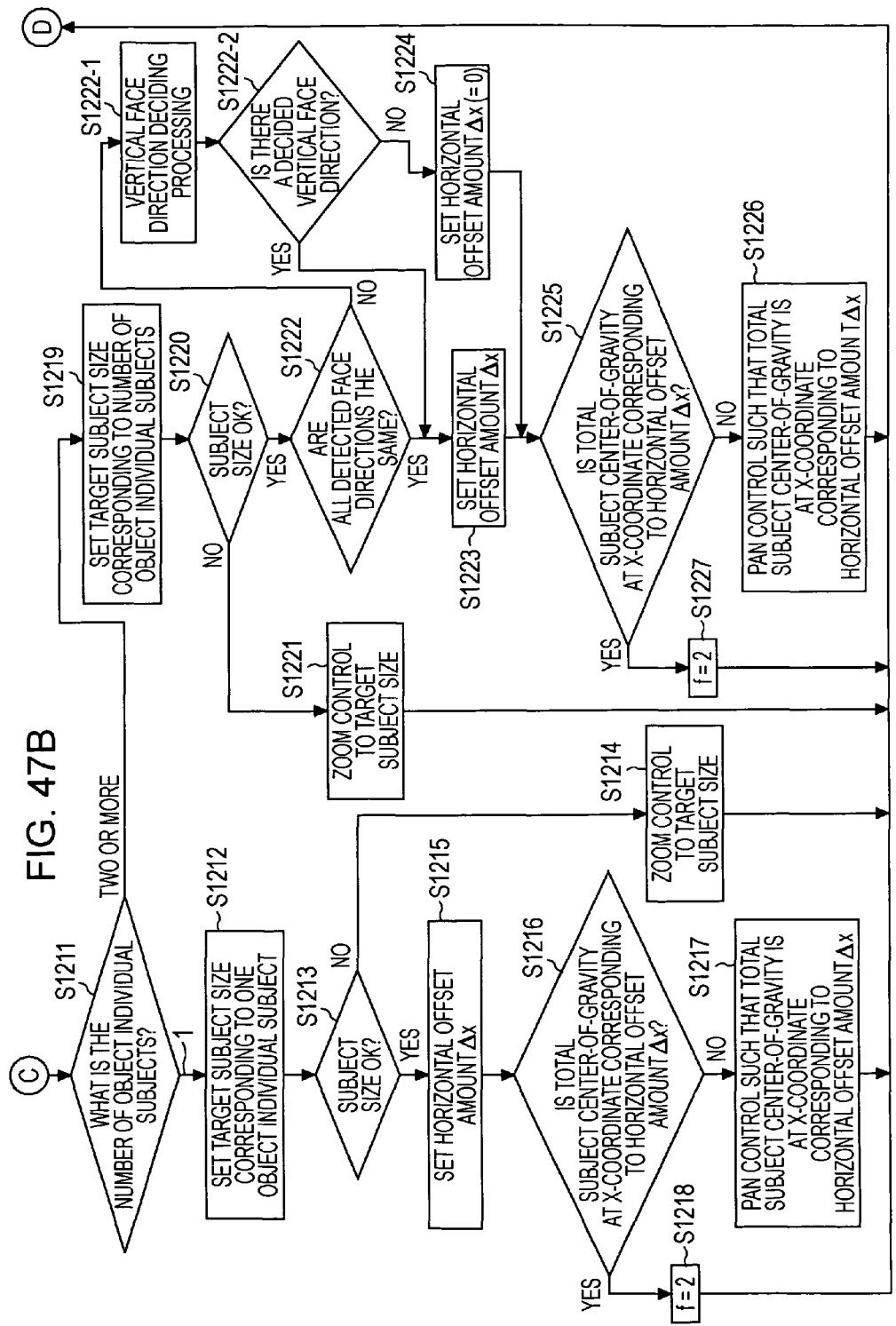

COMPOSITION DETERMINATION DEVICE, COMPOSITION DETERMINATION METHOD, AND PROGRAM

The present application claims priority from Japanese Patent Application No. JP 2008-071721, filed in the Japanese Patent Office on Mar. 19, 2008, the entire content of which is incorporated herein by reference.

BACKGROUND OF THE INVENTION

1. Field of the Invention

The present invention relates to a composition determination device which is a device configured to make determination regarding a composition which image contents of image data have, and to a method thereof, and to a program which the device executes.

2. Description of the Related Art

One example of an element regarding techniques for shooting a photograph which has a good impression on viewers is composition settings. The term "composition" as used here is also called "framing", and refers to the state of placement of a subject or subjects within an image frame making up a photograph, for example.

While there are several basic techniques generally available for good composition, shooting a photograph with a good composition is no easy feat for a general camera user unless the user has sufficient knowledge and skills regarding photography. Accordingly, there is demand for a technology which will enable users to shoot photographs with good composition in an easy and simple manner.

For example, Japanese Unexamined Patent Application Publication No. 59-208983 discloses a technology regarding an automatic tracking device, wherein the difference between images separated by a predetermined time interval is determined, the center of gravity of the difference between the images is calculated, the amount and direction of motion of the center of gravity is used to detect the amount and direction of motion of a subject image as to the imaging screen, and the imaging apparatus is controlled, thereby setting the subject image within a reference region of the imaging screen.

Also, Japanese Unexamined Patent Application Publication No. 2001-268425 discloses a technology regarding an automatic tracking device, wherein, at the time of automatic tracking of a person, tracking is performed such that the face of the person is at the center of the image and also the area of the face is the upper 20% of the entire area of the subject image on the screen, thereby shooting the face of the person in a sure manner while tracking.

From the perspective of deciding composition, these technical configurations enable a subject, which is a person, to be automatically searched, and situated in an imaging screen with a certain set composition.

Also, Japanese Unexamined Patent Application Publication No. 2007-156693 discloses a configuration regarding face recognition performed using images shot by a surveillance camera. This configuration involves a technology for effectively masking face images included in (i.e., printed on) posters, signboards, etc. An application thereof would to be to operate the configuration in recreation facility for example, at a time of day when neither customers nor workers would be present, i.e., after closing hours. A masking pattern is generated for masking a part of an image obtained by imaging, the masking pattern is repeatedly changed by a face extracting unit until face images not of an arriving person become unobtainable from the image, the masking pattern whereby until face images not of an arriving person become unobtainable due to the image being masked is stored, images are masked with this stored masking pattern, and face image detection is performed.

SUMMARY OF THE INVENTION

It has been found that there is demand for furthering and broader application of composition determination, for example, to provide a composition determination device and so forth which performs composition determination wherein a subject, which is not an actual person but is a face printed on a poster or work of art or the like, is eliminated from objects of composition determination being performed for subjects which are people, or vise versa, whereby desired composition determination results can be obtained in a more exact manner.

According to an embodiment of the present invention, a composition determination device includes: a subject detection unit configured to detect a subject in an image based on acquired image data; a still detection unit configured to detect a still state, with an image based on the image data, or a subject detected by the subject detection unit, as the object thereof; and a composition determination unit configured to determine a composition, with only real subjects or only unreal subjects, of subjects detected by the subject detection unit, as the object thereof, based on detection results of the still detection unit.

With the above configuration, still detection is performed with an image based on image data, or a subject detected by the subject detection unit, as the object thereof, whereby a still region in the image, or subjects detected by subject detection which are still, are recognized. Using the results of such still detection allows only one of real subjects or only unreal subjects, of subjects detected by the subject detection unit, to be set as the object of composition determination.

With the composition determination processing according to an embodiment of the present invention, still detection regarding images or subjects is used in taking one of real subjects or unreal subjects as the object of composition determination. Using still detection in this way allows, in a situation wherein there are subjects which actually exist and subjects which are only images or the like and do not actually exist, together as subjects in an image for example, taking just one of the subjects which actually exist or the subjects which do not actually exist as the object of composition determination, in an accurate manner.

Thus, according to an embodiment of the present invention, an arrangement can be provided wherein, in a situation wherein there are subjects which actually exist and subjects which are only images or the like and do not actually exist, together as subjects, just one of the subjects which actually exist or the subjects which do not actually exist can be taken as the object of composition determination, in an accurate manner. In comparison with the related art wherein subjects which actually exist and subjects which are only images or the like and do not actually exist are both detected as subjects, and composition determination is performed based upon this, the range of application is markedly broader, and users can be provided with arrangements which are easy to use.

BRIEF DESCRIPTION OF THE DRAWINGS

FIGS. 1A and 1B are diagrams illustrating an example of configuration determination in a case wherein one subject has been detected simply using face detection technology or the like;

FIGS. 2A and 2B are diagrams illustrating an example of configuration determination in a case wherein two subjects have been detected simply using face detection technology or the like;

FIG. 6 is a diagram illustrating a configuration example (third example) of a configuration determination block according to an embodiment;

FIG. 7 is a diagram illustrating a configuration example (fourth example) of a configuration determination block according to an embodiment;

FIG. 30 is a flowchart illustrating an example of processing procedures for still detection with the composition determination block shown in FIG. 29;

FIG. 35 is a flowchart illustrating an example of processing procedures which the composition determination block shown in FIG. 34 executes;

FIGS. 37A and 37B are diagrams for describing another example of a technique for obtaining absolute position information of a subject;

FIG. 47 is a flowchart illustrating an example of processing procedures for the second example of composition control.

DESCRIPTION OF THE PREFERRED EMBODIMENTS

Embodiments for carrying out the present invention will now be described. First, terms used here will be defined. "Composition" is also called framing, and refers to the state of placement of a subject or subjects within an image frame. "Image frame" is the range of a region equivalent to one screen, with an image appearing to have been fit therein, for example. "Angle of field" or "field angle" is also called zoom angle, and refers to the range which fits into the image frame as determined by the position of the zoom lens in the optical system of the imaging apparatus, expressed in terms of angle. Generally, this is determined by the focal distance of the imaging optical system and the size of the imaging face (imaging sensor or film), but here, elements capable of changing corresponding to focal distance are called "angle of field" or "field angle", which are used interchangeably. "Imaging view angle" deals with a range of an image, obtained by imaging with an imaging apparatus set at a predetermined position, and is determined by, in addition to the above "angle of field", the pan angle in the panning (horizontal) direction, and the angle in the tilting (vertical) direction (elevation angle and depression angle). For example, the composition of an image refers to the state of placement of a subject or subjects within an image frame as determined by the image view angle.

First, according to a preferred embodiment for carrying out the present invention, an apparatus or system is configured so as to perform composition determination. Before describing the configuration of the embodiment, let us consider performing automatic composition adjustment for a subject obtained by imaging, for example. Note that the subject is a person.

Figure 1A:
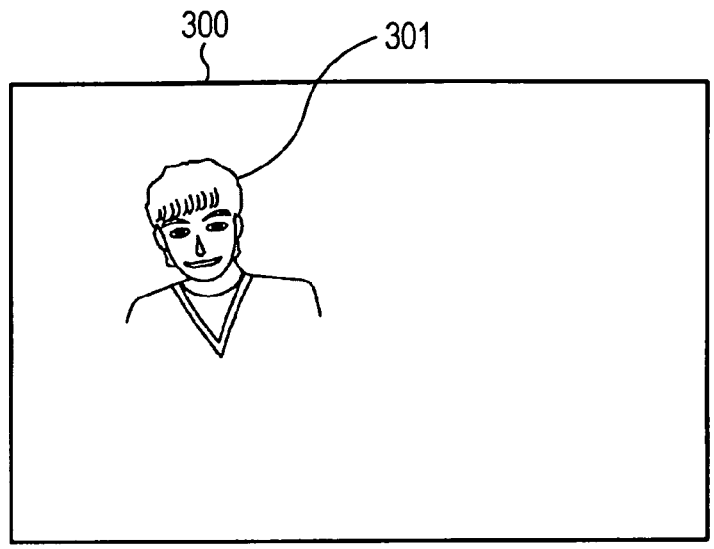

FIG. 1A illustrates a state wherein a single subject 301 exists within the image frame, as an example of an image content obtained by imaging, for example. An algorithm for composition determination processing can be configured so as to first detect that one subject 301 exists in the image shown in FIG. 1A for example, and based on the detection results, determine that a composition ideal for the image in which the subject 301 is (ideal composition), is such as that shown in FIG. 1B. For example, in this case, the state (composition) is such that the subject 301 within the image frame 300 has been enlarged to a certain size and situated in the approximate middle.

Figure 2A:
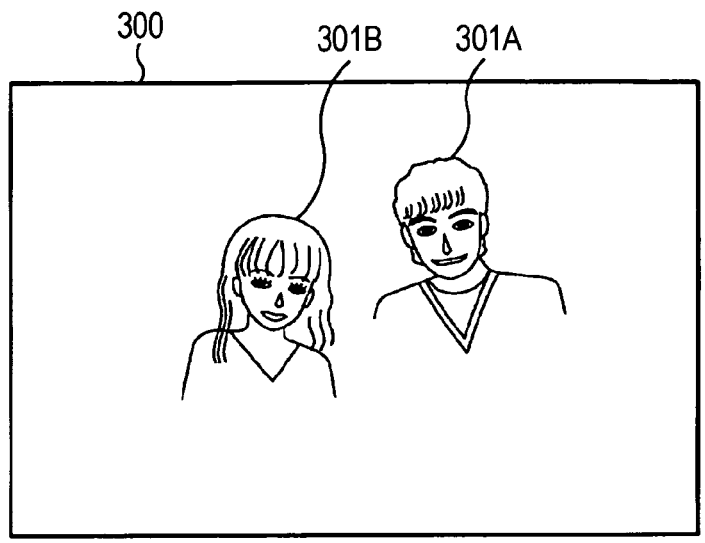
Figure 2B:
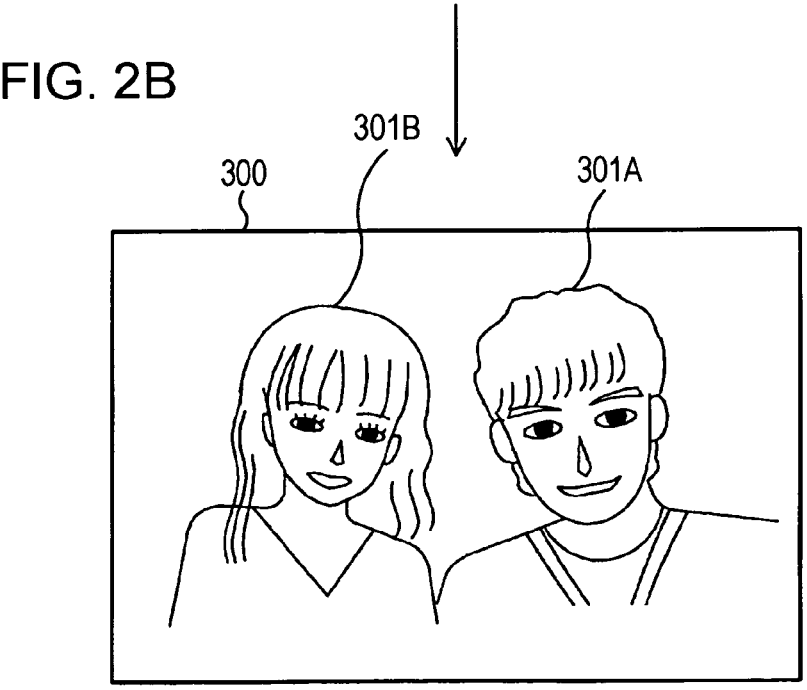

Also, FIGS. 2A and 2B illustrate that in the event that the image shown in FIG. 2A for example is input, the fact that two subjects 301A and 301B exist is detected from the image, and based on the detection results, determine that an ideal composition for the image in which the subjects 301A and 302B are is such as that shown in FIG. 2B. In FIG. 2B, the composition is such that the subjects 301A and 301B within the image frame 300 have been enlarged to a certain size and situated approximately uniformly to the left and right.

Figure 3:
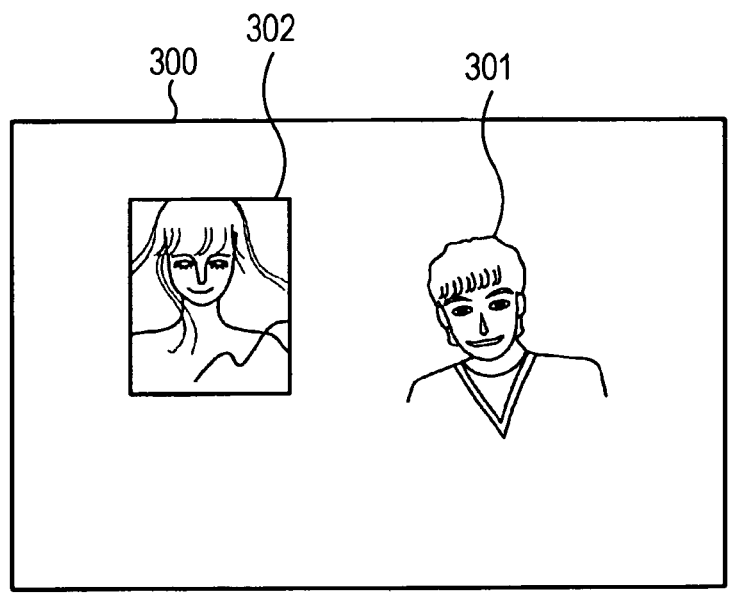
FIG. 3 is a diagram for illustrating that when simply using face detection technology, faces printed on posters and the like are also detected, not just faces of actual people.

Face detection technology for example can be applied for subject detection in the above-described composition determination, but simple application of face detection technology can lead to the following problem. Referring to FIG. 3, we can see that in the image frame 300 there is the subject 301 which is an actual person, and a poster (facial image poster) 302 with the face of a person printed, painted, or the like. Simple application of face detection technology for subject detection will result in not only the subject 301 but also the face in the facial image poster 302 being detected as a subject.

Figure 1B:
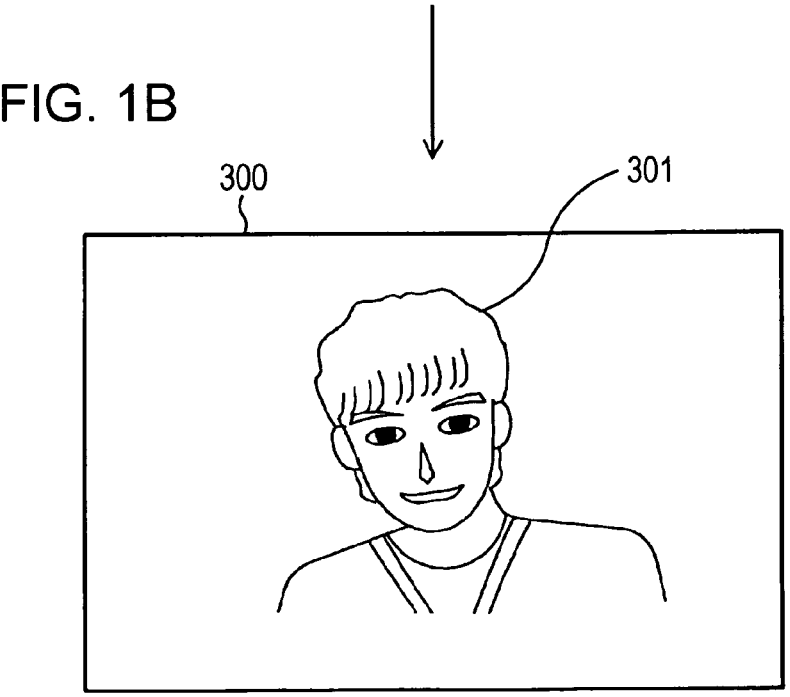

In this case, there is only one subject which is an actual person, so the composition determination results should have a close-up of only the subject 301 as with the case shown in FIG. 1B. However, in this case, the face detection has detected two subjects, and accordingly the results of composition determination will be more like that shown in FIG. 2B, with the face of the subject 301 and the face on the facial image poster 302 both brought close up, as the optimal composition.

Accordingly, the present embodiment provides a technical configuration for composition determination with a person or people as subjective subjects (hereinafter referred to simply as "subject"), such that subjects which are not actual people (unreal subjects) like faces or people printed or painted or the like in posters or signboards, faces of three-dimensional sculptures or statures or the like, are eliminated and accurate composition determination results are obtained with only actually-existing people (real subjects) are taken to be subjects.

Figure 4:
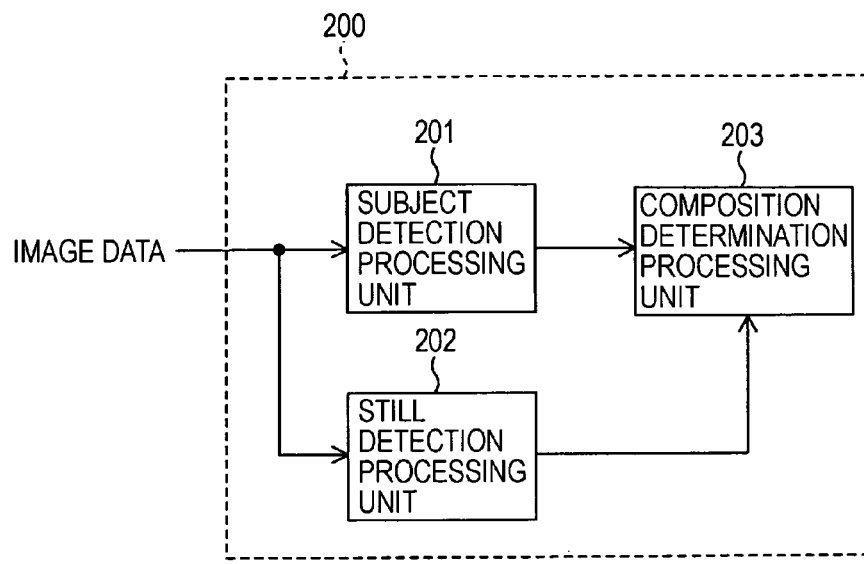
FIG. 4 is a diagram illustrating a configuration example (first example) of a configuration determination block according to an embodiment.

FIG. 4 is a diagram schematically illustrating the configuration of a first example regarding composition determination with the present embodiment. This diagram illustrates a composition determination block 200 as a portion for executing the composition determination. The composition determination block 200 acquires image data and performs composition determination, and includes a subject detection processing unit 201, a still detection processing unit 202, and a composition determination processing unit 203.

The subject detection processing unit 201 is a member which uses the acquired image data and executes subject detection processing. The subject detection processing as used here is processing for first distinguishing subjects which are people from the image contents of the image data, with the information obtained as detection results here (individual subject detection information) being the number of subjects which are people, position information within the image frame regarding each subject (individual subject), which can be expressed by x-coordinates and y-coordinates in the matrix of pixels for positions within the image frame for example, the size (space occupied) in the image frame of each individual subject, and so forth.

Face detection technology can be used as a specific technique for the subject detection processing, while there are several face detection methods and techniques according to the related art, the present embodiment is not particularly restricted to any method or technique, and an appropriate method can be selected taking into consideration detection precision, design difficulty, compatibility with a technique used for later-described still detection, and so forth. At this stage, the technique and algorithm used for subject detection processing may detect real subjects of actual people taken in the image and unreal subjects without distinguishing between the two. The subject detection processing unit 201 outputs information made up of a collection of the individual subject detection information as detected subject information.

Also, the subject detection processing which the subject detection processing unit 201 performs can be realized by image signal processing. In the event of a configuration wherein the image signal processing is executed by a DSP (Digital Signal Processor) for example, the subject detection processing can be realized by programs and instructions provided to the DSP. Note that this also holds true for the following still detection processing unit 202 and all other portions described later which are capable of realizing the functions thereof by image signal processing.

Also, the acquired image data is divided upstream of the subject detection processing unit 201 and also input to the still detection processing unit 202. The still detection processing unit 202 executes processing by image signal processing for example, to detect a region where there is no movement and is still (still region) within the image (image frame) of the acquired image data. This detection processing yields the position of a still region in the image of the image data, and information indicating distribution thereof (detected still region information). This detected still region information can be thought of as indicating the distribution of pixels detected as a still region, for example.

The composition determination processing unit 203 is this case acquires and inputs the detected subject information output from the subject detection processing unit 201 and the detected still region information output from the still detection processing unit 202, and finally executes the composition determination processing whereby optimal composition is determined with only real subjects as the object. Note that the composition determination processing performed by the composition determination processing unit 203 can be realized by a CPU (Central Processing Unit) for example executing a program, i.e., by software. Another example of a configuration which can be employed here is tandem use of image signal processing, realized by software and/or hardware, as appropriate.

Figure 10:
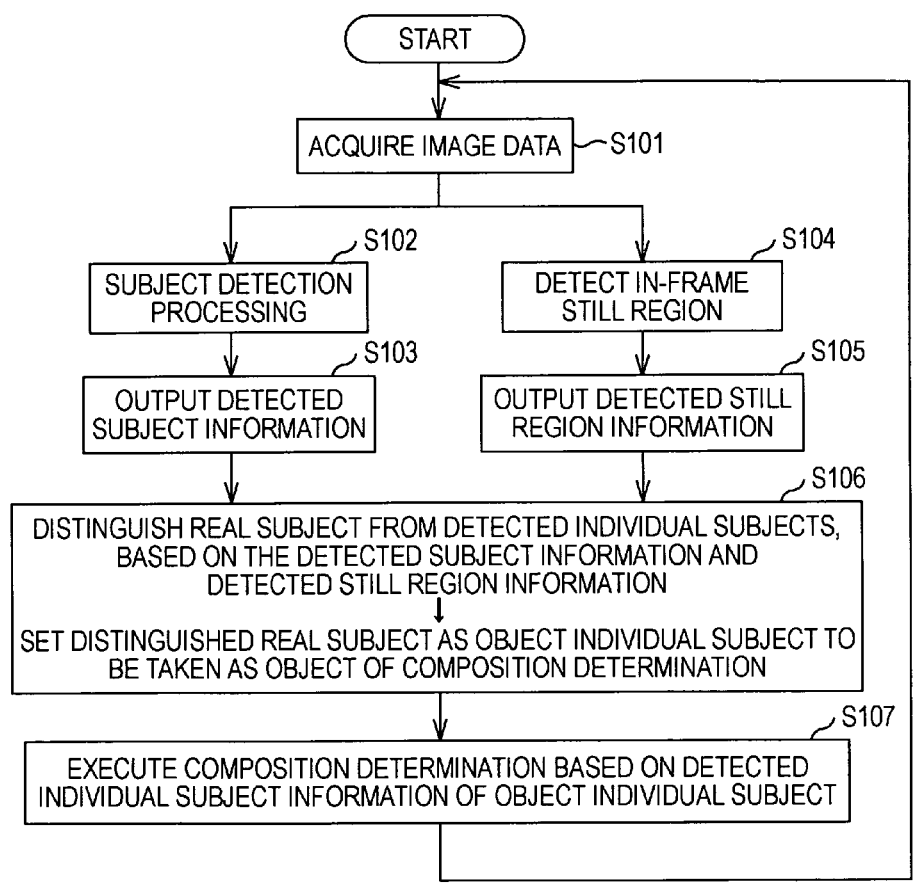
FIG. 10 is a flowchart illustrating an example of processing procedures with the configuration determination block according to the first example.

The flowchart shown in FIG. 10 illustrates an example of the procedures for the processing executed by the subject detection processing unit 201, still detection processing unit 202, and composition determination processing unit 203 of the composition determination block 200. It should be noted that the example of processing procedures shown in FIG. 10 is only one example, and that the processing procedures executed by the composition determination block 200 shown in FIG. 4 is by no way restricted to this. The configuration shown in FIG. 4 has realized its intended function as long as the composition determination processing unit 203 ultimately determines an optimal composition with only real subjects as the object, based on the detected subject information from the subject detection processing unit 203 and the detected still region information from the still detection processing unit 202. This holds true for the later-described second through sixth examples as well.

Also, the correlation between the block configuration shown in FIG. 4 and the steps in the flowchart in FIG. 10 is but one straightforwardly conceived example, and other correlations can be conceived and employed. This point also holds true for the later-described correlations between corresponding block diagrams and flowcharts.

First, in step S101, the subject detection processing unit 201 and still detection processing unit 202 acquire (input) the image data.

Steps S102 and S103 are procedures executed by the subject detection processing unit 201. The subject detection processing unit 201 executes the above-described subject detection processing in step S102, and in step S103 outputs detected subject information which is the detection result thereof.

Parallel with the steps S102 and S103, the still detection processing unit 202 executes the procedures in steps S104 and S105. In step S104, a still region is detected in the image within the image frame of the input image data. A motion detection technique for example can be applied to detection of the still region with this first example. That is to say, a region wherein change between temporally related images, which are equivalent to frames (or fields), is within a predetermined amount, can be detected as being a still region, and in step S105, detected still region information which is the detection result is output.

Step S106 is executed by the composition determination processing unit 203. In step S106, the composition determination processing unit 203 inputs the detected subject information output from the subject detection processing unit 201 instep S103 and the detected still region information output from the still detection processing unit 202 instep S105. Thereupon, the composition determination processing unit 203 first eliminates unreal subjects from the individual subjects indicated by the detected subject information, so as to distinguish out only real subjects, i.e., performs distinguishing processing.

In the real world, real people continuously exhibit change such as the face itself shifting, or even if the face does not move there will be blinking, changes in facial expressions, and so forth, which can be taken to be movement regarding the face portion. With the still detection processing performed by the still detection processing unit 202 corresponding to step S104, regions including positions where actual people are in the image, i.e., regions including positions where real subjects have been detected, are detected as regions with motion, and still regions are regions where no movement is detected. As opposed to real subjects, faces in posters and signboards and the like which are unreal subjects exhibit none of the above movements real people, and accordingly the above still detection processing detects regions including positions where unreal subjects have been detected as still regions.

Accordingly, the composition determination processing unit 203 is configured to compare the position information for each detected individual subject indicated by the detected subject information, and the distribution of still regions indicated by the detected still region information, for the above-described distinguishing processing. That is to say, the detected individual subjects of which the position information is included in a still region are still subjects with no motion, i.e., an unreal subject. On the other hand, the detected individual subjects of which the position information is not included in a still region are subjects with motion, i.e., a real subject. Thus, with the present embodiment, just real subjects can be distinguished. Also, such processing can be conceptually understood as determining whether detected individual subjects are real subjects or unreal subjects. The composition determination processing unit 203 then sets only the real subjects distinguished as described above as individual subjects to be used for composition determination (object individual subjects).

Next, the composition determination processing unit 203 executes the processing of step S107. In step S107, processing for composition determination is executed with a predetermined algorithm, using the detected subject information of the object individual subjects set in step S106 as described above. Examples of composition determination algorithms, usage examples of composition determination results, and so forth, will be described later.

Figure 5:
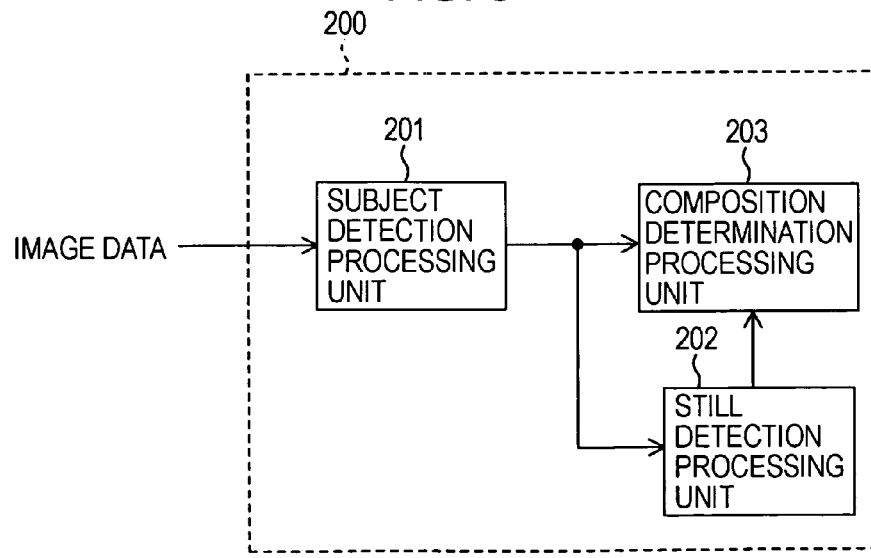
FIG. 5 is a diagram illustrating a configuration example (second example) of a configuration determination block according to an embodiment.

FIG. 5 illustrates the configuration of the composition determination block 200 as a second example in the present embodiment. The composition determination block 200 in this diagram also includes the subject detection processing unit 201, still detection processing unit 202, and composition determination processing unit 203, in the same way as with the first example shown in FIG. 4. With this case, the subject detection processing unit 201 first acquires the image data and performs detection of individual subjects (including both real subjects and unreal subjects), and detected subject information, which is the detection result thereof, is output to the composition determination processing unit 203 and the still detection processing unit 202.

The still detection processing unit 202 in this case performs still detection processing wherein, based on the input detected subject information, still subjects are detected from the detected individual subjects. Note that the still subjects detected here are equivalent to unreal subjects.

One example of still subject detection which can be used in this second example as well, is motion detection. That is to say, change in positional information of a detected individual subject indicated by detected subject information obtained at a sampling timing before and/or after the detected individual subject is detected, and subjects wherein the amount of change is a certain level or lower can be detected as still subjects.

Also, with a configuration such as this second example wherein still subjects are to be detected at a stage following subject detection, still detection techniques such as described next can also be conceived.

One is to apply an Expression detection technique, since facial Expression are changeable for a real subject as a matter of course, but do not change for an unreal subject. For example, the subject detection processing unit 201 first performs individual subject detection with face detection by a predetermined method, and then the still detection processing unit 202 receives information of images where the facial image portions of individual subjects detected by the face detection processing (face images) have been extracted. The still detection processing unit 202 obtains the amount of change in expression, and detects detected individual subjects corresponding to face images where this amount of change is a certain level or below to be still subjects.

One example of this is to apply the Expression evaluation technique described in Japanese Unexamined Patent Application Publication No. 2008-42319 filed by the Present Assignee. This Expression evaluation technique involves performing computation to evaluate a degree of Expression of a face in a facial image, based on a normalized face image and differentiation axis information, so as to obtain an Expression evaluation value. An example of application of this technique might be to obtain the amount of change of the Expression evaluation value over a unit time, and detect detected individual subjects corresponding to face images where this amount of change is a certain level or below to be still subjects.

Another conceivable example is to apply a technique for detecting the movement of eyelids, i.e., blinking. While real subjects do blink as a matter of course, an unreal subject would not be thought of as being capable of blinking. In this case as well, the subject detection processing unit 201 first performs individual subject detection with face detection by a predetermined method, and then the still detection processing unit 202 receives information of images where the facial image portions of individual subjects detected by the face detection processing (face images) have been extracted. The still detection processing unit 202 further extracts the eye portions of the face images that have been received. The still detection processing unit 202 then detects detected individual subjects corresponding the extracted eye images which have been determined to not blink, to be still subjects.

One example of such a blinking detection technique is to apply the Expression evaluation technique described in Japanese Unexamined Patent Application Publication No. 2004-343315 filed by the Present Assignee. With this technique, first, face detection is performed by face detection processing including skin color detection, white regions within the detected skin color region are detected (i.e., eye portions are detected), and a region including the eye portions (eye region) is captured. The percentage of white information in the eye region is then calculated, which changes over time, since the percentage of white information will be great when the eye is open and will be small when the eyelid is closed due to blinking. Detected individual subjects corresponding to eye regions regarding which the percentage of white information calculated over time is constant with no such chance can be detected as being still subjects.

Thus, several still detection techniques and algorithms, including the examples given above, can be conceived. With the present embodiment, any one of the techniques and algorithms may be applied, or two or more may be applied in a compounded manner. In any case, the still detection processing unit 202 outputs information having detected individual subject information for each detected still subject, as described above, as detected still subject information.

The composition determination processing unit 203 uses the detected individual subject information output from the subject detection processing unit 201 and the detected still subject information output from the still detection processing unit 202, and ultimately performs composition determination with the real subjects as the object.

With an example of processing performed by the composition determination processing unit 203, first, processing is performed for distinguishing real subjects. This processing involves comparing position information of the detected individual subjects indicated by the obtained detected subject information with the positional information of still subjects which the detected still subject information indicates. In this comparison, the detected individual subjects indicated by the detected subject information regarding which the position information matches the position information of the still subjects indicated by the detected still subject information are unreal subjects, and those not matching are real subjects. The detected subjects recognized as being real subjects are then set as being object individual subjects.

Thereupon, the composition determination processing unit 203 extracts the individual subject detection information regarding the individual subjects set as the object individual subjects from the input detected subject information, and uses the individual subject detection information to execute composition determination processing.

Note that the still detection to which the above-described Expression detection or blinking detection is applied can also be applied to the example of the first example shown earlier in FIG. 4. For example, the still detection processing unit 202 first performs face detection regarding the acquired image data, and uses the face images obtained thereby to perform the above-described Expression detection or blinking detection, thereby performing still detection. The composition determination processing unit 203 then can compare the positions of the detected individual subjects indicated by the detected subject information from the subject detection processing unit 201 with the positions of face images determined by the still detection processing unit 202 to be in a still state, to distinguish real subjects.

Figure 11:
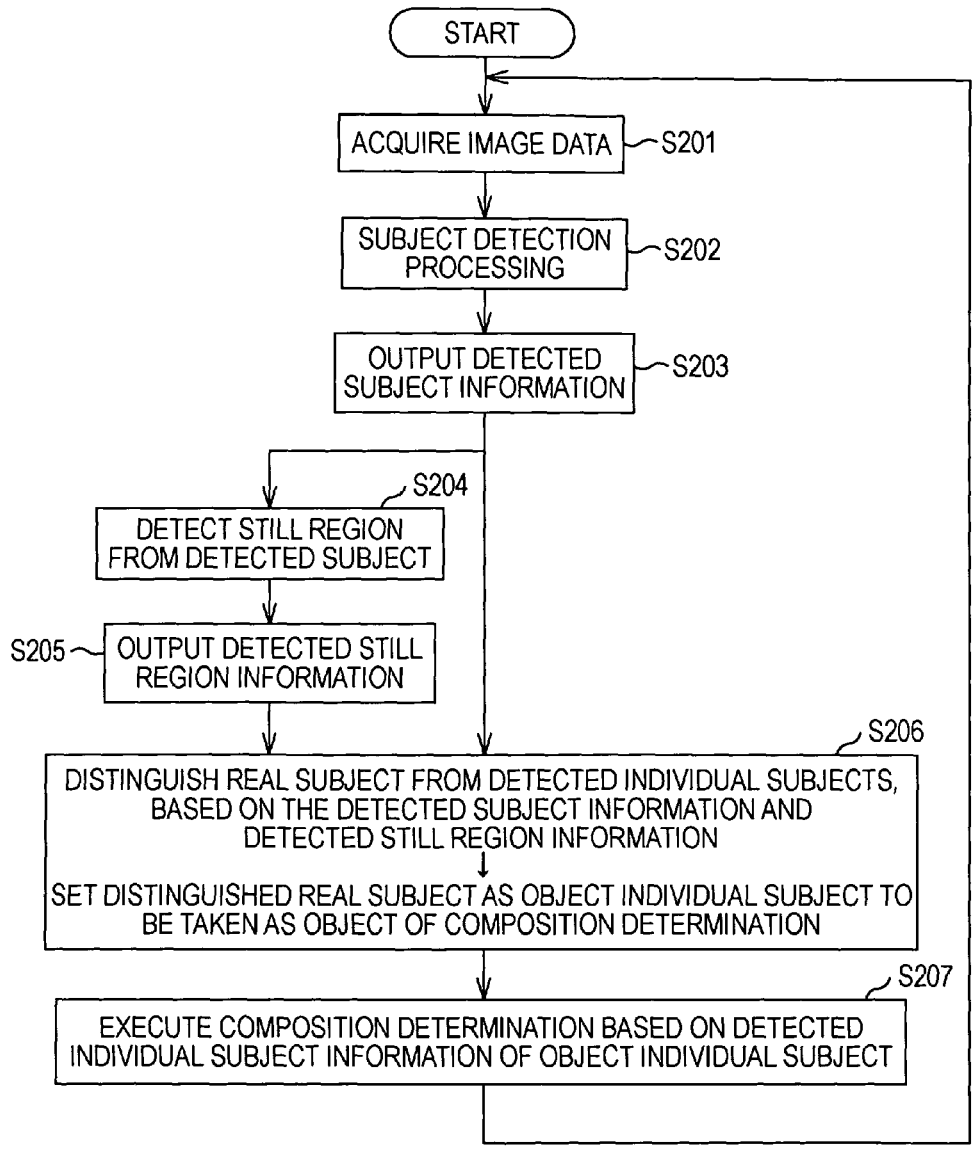
FIG. 11 is a flowchart illustrating an example of processing procedures with the configuration determination block according to the second example.

The flowchart shown in FIG. 11 illustrates an example of the procedures for the processing executed by the composition determination block 200 according to the second example which has been described with reference to FIG. 5. The configuration shown in FIG. 5 has realized its intended function as long as the composition determination processing unit 203 ultimately determines an optimal composition with real subjects as the object, based on the detected subject information from the subject detection processing unit 201 and the detected still region information from the still detection processing unit 202, and it should be noted that the example of processing procedures shown in FIG. 11 is only one example.

The subject detection processing unit 201 first performs processing of the steps S201 through S203. In step S201, the subject detection processing unit 201 acquires (input) the image data.

In step S202, subject detection processing is executed based on the input image data, and in step S203, detected subject information which is the detection results thereof, is output.

Steps S204 and S205 are processing executed by the still detection processing unit 202. In step S204, the detected subject information output from the subject detection processing unit 201 in step S203 is input, still subjects are detected from the detected individual subjects indicated by the detected subject information as described above, and in step S205 detected still subject information indicating the detection result is output.

Steps S206 and S207 are processing executed by the composition determination processing unit 203. In step S206, the detected subject information output from the subject detection processing unit 201 in step S203 and the detected still subject information output from the still detection processing unit 202 in step S205 are input, real subjects are distinguished from the detected individual subjects indicated by the detected subject information as described in FIG. 5 based on the detected subject information and detected still subject information as described with reference to FIG. 5, and the distinguished real images are set as object individual subjects.

In step S207, composition determination processing is executed based on the detected individual subject information of the object subjects.

FIG. 6 illustrates the configuration of the composition determination block 200 as a third example in the present embodiment. The configuration shown in this diagram can be viewed as based on the configuration of the first example shown in FIG. 4, with the processing of distinguishing real subjects which had been performed by the composition determination processing unit 203 being extracted as a subject distinguishing processing unit 204. That is to say, in this case, as with the case in FIG. 4, first the subject detection processing unit 201 performs subject detection processing based on the image data that has been input and outputs detected subject information, and the still detection processing unit 202 also performs detection of still regions within the image frame based on the input image data, and outputs detected still region information.

In this case, the detected subject information and detected still region information is input to the subject distinguishing processing unit 204. The subject distinguishing processing unit 204 uses the detected subject information and detected still region information to perform processing for distinguishing real subjects (distinguishing processing) in the same way as with the composition determination processing unit 203 in FIG. 4. The subject distinguishing processing unit 204 then outputs detected individual subject information regarding the individual subjects which have been distinguished by the subject distinguishing processing as being real subject, to the composition determination processing unit 203.

The composition determination processing unit 203 handles the detected individual subject information regarding each individual subject which has been distinguished as being real subject, that is output from the subject distinguishing processing unit 204, as individual subject information of an object individual subject, and executes composition determination processing.

Figure 12:
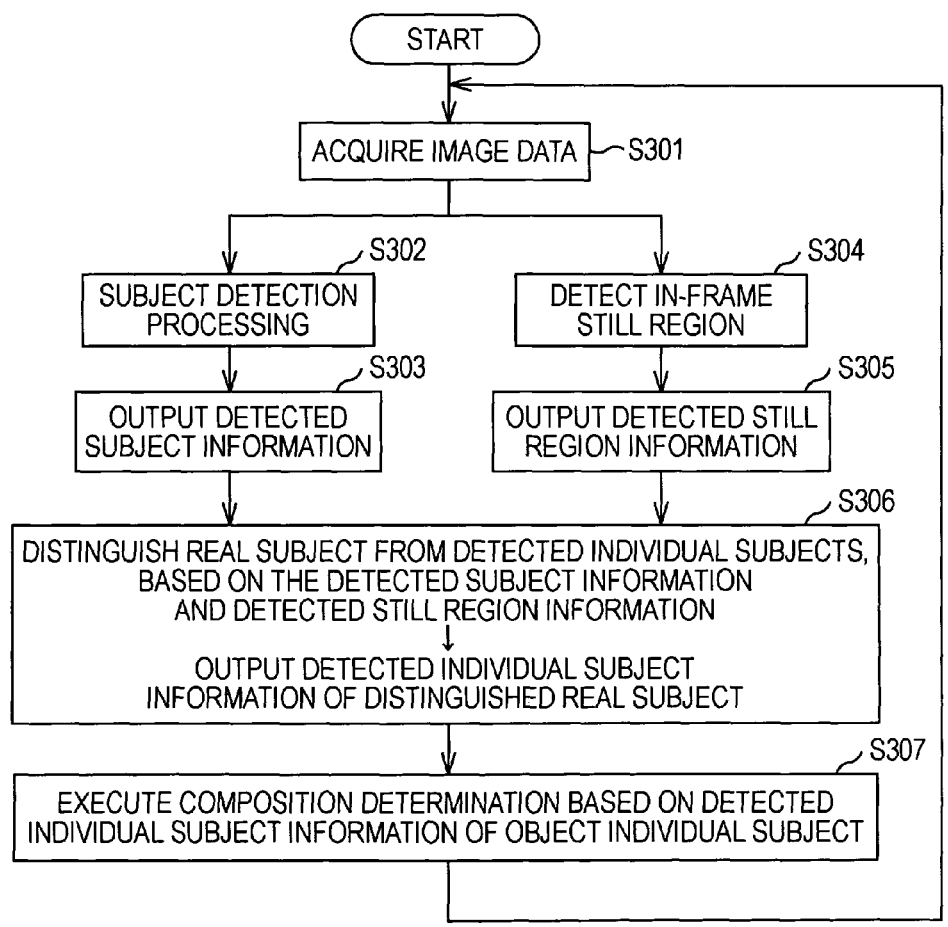
FIG. 12 is a flowchart illustrating an example of processing procedures with the configuration determination block according to the third example.

The flowchart shown in FIG. 12 illustrates an example of the procedures for the processing executed by the composition determination block 200 according to the third example which has been described with reference to FIG. 6. The procedures of steps S301 through S305 are the same as the steps S101 through S105 in FIG. 10, with the image data being input, the subject detection processing unit 201 performing subject detection processing based on the input data and outputting detected subject information, and the still detection processing unit 202 performing still region detection and outputting detected still region information.

In this case, step S306 is executed by the subject distinguishing processing unit 204. In step S306, distinguishing processing is executed in accordance with processing the same as that described as step S106 in FIG. 10, and real subjects are distinguished from the detected individual subjects. Thereafter, in step S306, detected individual subject information of detected individual subjects distinguished from the detected individual subject information making up the detected subject information, by the above distinguishing processing, as being real subjects, is output to the subject distinguishing processing unit 204.

In step S307, the composition determination processing unit 203 inputs the detected individual subject information output in step S306 as that regarding object individual subjects, and executes composition determination processing based on this detected individual subject information.

FIG. 7 illustrates the configuration of the composition determination block 200 as a fourth example in the present embodiment. The configuration shown in this diagram can be viewed as based on the configuration of the second example shown in FIG. 5, with the processing of distinguishing real subjects which had been performed by the composition determination processing unit 203 being extracted as a subject distinguishing processing unit 204.

In this case, first, the subject detection processing unit 201 inputs image data, performs the same processing as with the case in FIG. 5, and then outputs the detected subject information which is the result of the subject detection processing, this time to the still detection processing unit 202 and the subject distinguishing processing unit 204. The still detection processing unit 202 performs still region detection processing in the same way as with FIG. 5, and outputs detected still region information which is the detection result thereof to the subject distinguishing processing unit 204.

The subject distinguishing processing unit 204 inputs the detected subject information and detected still region information output as described above, to perform processing for distinguishing real subjects in the same way as with the composition determination processing unit 203 as described above with reference to FIG. 5. The subject distinguishing processing unit 204 then collects detected individual subject information regarding the individual subjects which have been distinguished by the subject distinguishing processing as being real subject, and outputs this to the composition determination processing unit 203.

The composition determination processing unit 203 inputs the detected individual subject information output from the subject distinguishing processing unit 204, as individual subject information of object individual subjects, and executes composition determination processing based on the detected individual subject information.

Figure 13:
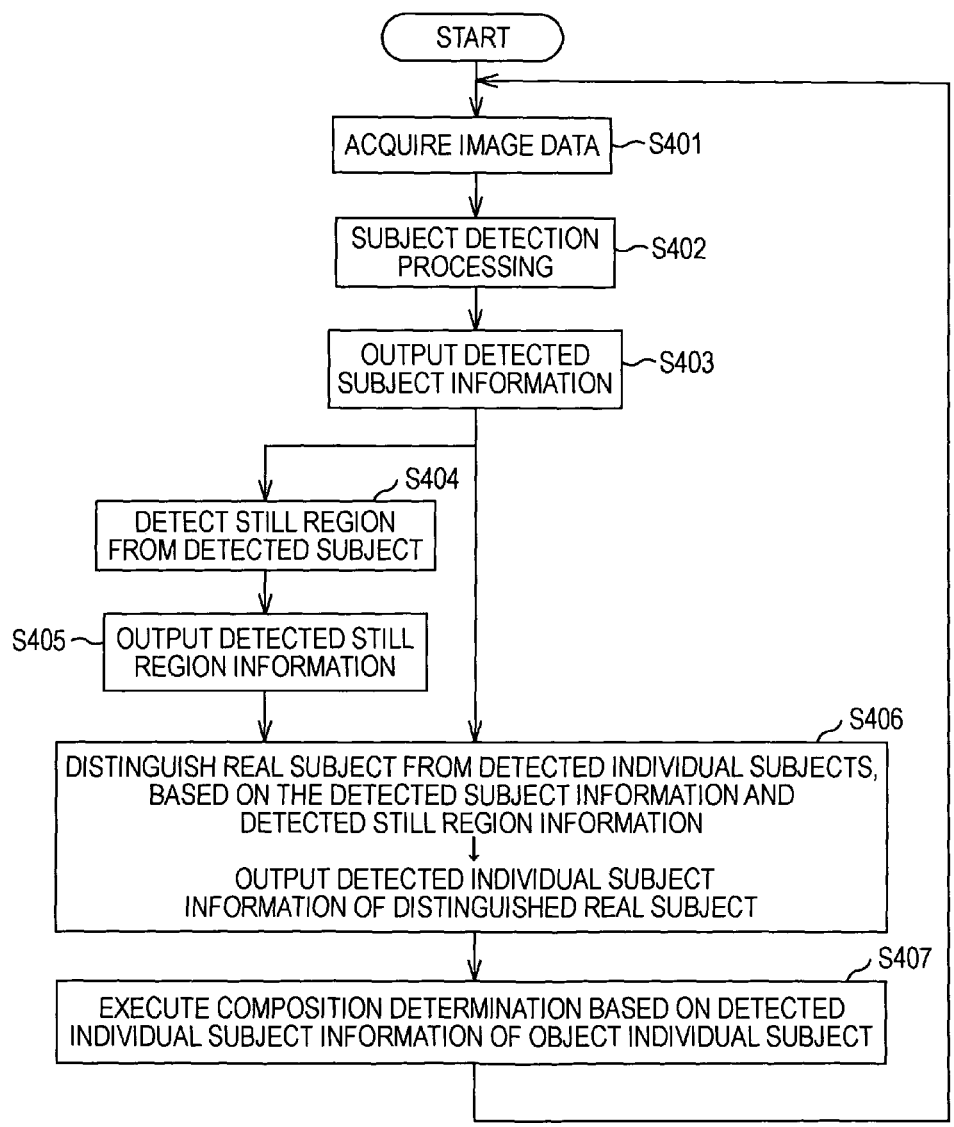
FIG. 13 is a flowchart illustrating an example of processing procedures with the configuration determination block according to the fourth example.

The flowchart shown in FIG. 13 illustrates an example of the procedures for the processing executed by the composition determination block 200 according to the fourth example which has been described with reference to FIG. 7. The procedures of steps S401 through S405 are the same as the steps S201 through S205 in FIG. 11, with the image data being input, the subject detection processing unit 201 performing subject detection processing based on the input data and outputting detected subject information, and the still detection processing unit 202 performing still region detection and outputting detected still region information.

In this case, step S406 is executed by the subject distinguishing processing unit 204. In step S406, distinguishing processing is executed in accordance with processing the same as that described as step S206 in FIG. 11, and real subjects are distinguished from the detected individual subjects. Thereafter, in step S406, detected individual subject information of detected individual subjects distinguished from the detected individual subject information making up the detected subject information, by the above distinguishing processing, as being real subjects, is output to the subject distinguishing processing unit 204.

In step S407, the composition determination processing unit 203 inputs the detected individual subject information output in step S406 as that regarding object individual subjects, and executes composition determination processing based on this detected individual subject information.

Figure 8:
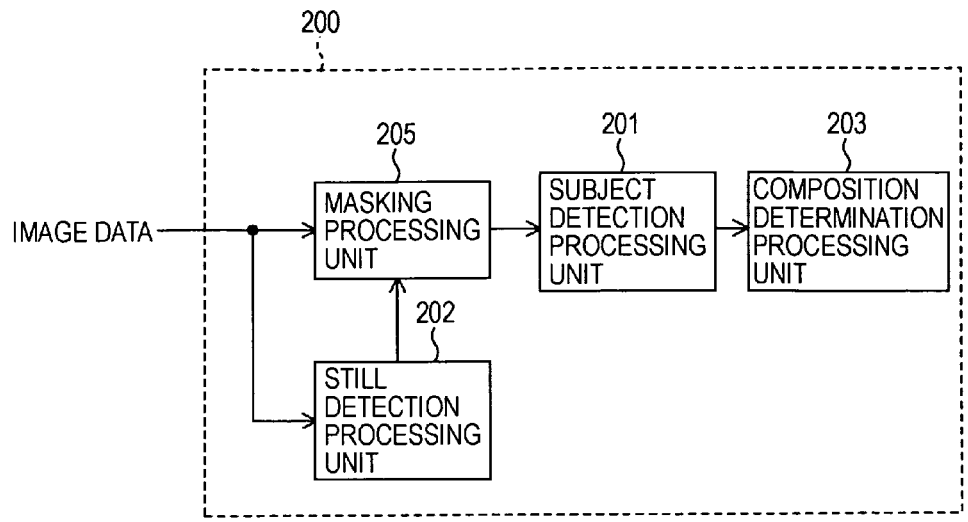
FIG. 8 is a diagram illustrating a configuration example (fifth example) of a configuration determination block according to an embodiment.

FIG. 8 illustrates the configuration of the composition determination block 200 as a fifth example in the present embodiment. The composition determination block 200 in this drawing includes, in addition to the subject detection processing unit 201, still detection processing unit 202, and composition determination processing unit 203, a masking processing unit 205.

In this case, the image data input externally to the composition determination block 200 is first input to the masking processing unit 205 and the still detection processing unit 202. The still detection processing unit 202 detects still regions in the image (image frame) of the input data, and outputs the detected still region information which is the detection result thereof, to the masking processing unit 205.

Based on the detected still region information from the still detection processing unit 202, the masking processing unit 205 sets an invalid region in the image (image frame) of the input image data to be excluded from the object of subject detection processing by the subject detection processing unit 201 (i.e., a detected object invalid region). To this end, the masking processing unit 205 sets, of the entire image region corresponding to the input image data, a region matching the still region which the detected still region information indicates, as a detected object invalid region. We will say that, of the entire image region of the image data, regions other than detected object invalid regions are detected object valid regions.

Next, the masking processing unit 205 performs masking processing wherein detected object invalid regions set as described above are reflected in the input image data. That is to say, in this case, the subject detection processing unit 201 is configured so as to not execute subject detection processing with regard to the detected object invalid regions at the time of performing subject detection processing, and this masking processing is to enable the subject detection processing unit 201 to recognize the detected object invalid regions in the image data.

One specific example of such processing which might be conceived is to add data indicating a pixel range representing the detected object invalid region (or conversely, data indicating a pixel range representing a detected object valid region) as metadata of the image data. Another conceivable example is to execute image processing with regard to the image data such that the subject is not seen, by rewriting the detected object invalid region with a predetermined fixed color, for example.

The masking processing unit 205 then outputs the image data subjected to the above masking processing (i.e., masked image data) to the subject detection processing unit 201, where the input masked image data is used to execute the subject detection processing.

The subject detection processing unit 201 uses the input masked image data to perform subject detection processing. The masked image data has been processed such that image regions in a still state are not taken as an object of subject detection processing, due to the above masking processing. Accordingly, the subject detection processing unit 201 performs the subject detection processing only on image regions with motion. Thus, with the subject detection processing in this case, the detected individual subjects are none other than real subjects. That is to say, with the configuration shown in this drawing, the masking processing unit 205 executing masking processing based on the results of still detection can be viewed as processing being performed for eliminating unreal objects and distinguishing only real objects form the detected individual subjects (i.e., determination processing regarding whether the detected individual subjects are real subjects or unreal subjects).

The subject detection processing unit 201 in this case then outputs detected subject information made up of individual subject information for each individual subject detected as described above, to the composition determination processing unit 203.

The composition determination processing unit 203 inputs the detected subject information output from the subject detection processing unit 201 as described above, and executes composition determination processing. The composition determination results obtained thereby are appropriate results, wherein unreal subjects have been eliminated from the subjects existing in the image of the image data, and only individual subjects which are real subjects are used for the composition determination.

Figure 14:
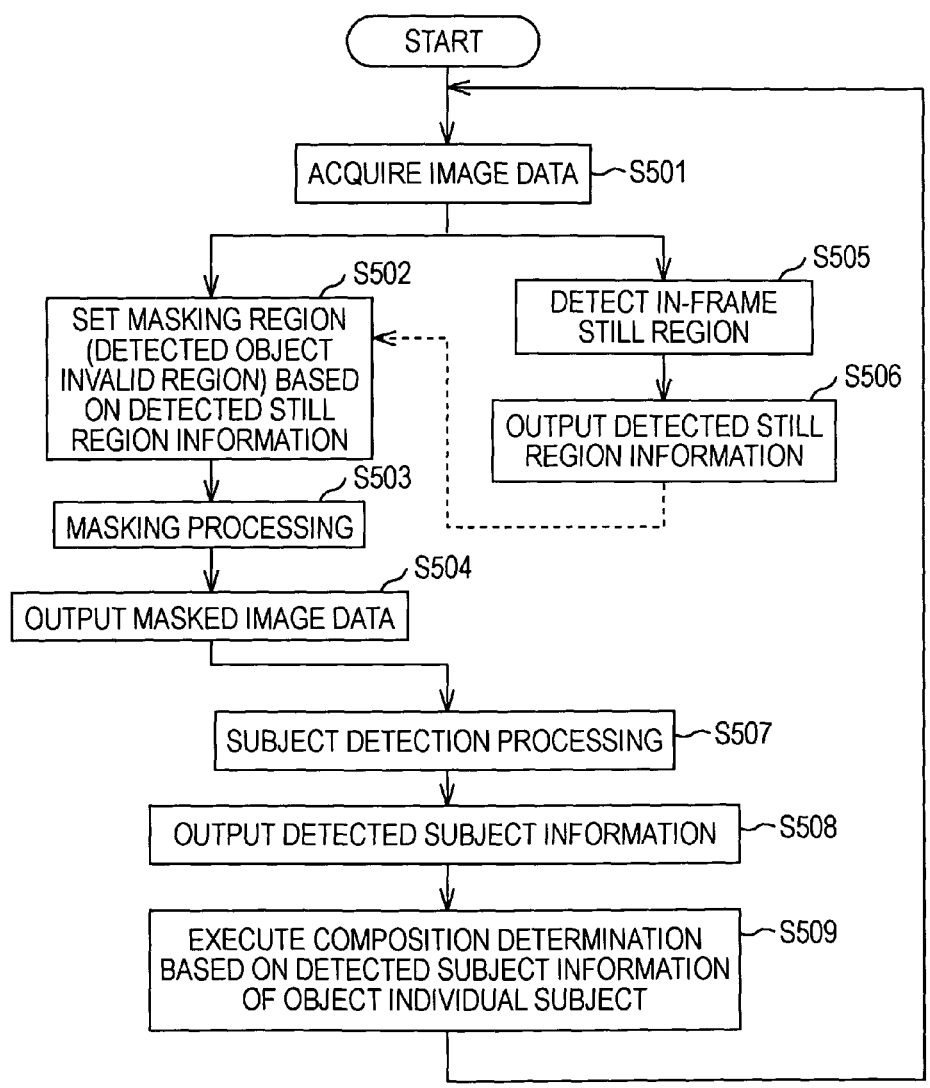
FIG. 14 is a flowchart illustrating an example of processing procedures with the configuration determination block according to the fifth example.

The flowchart shown in FIG. 14 illustrates an example of the procedures for the processing executed by the composition determination block 200 according to the fifth example which has been described with reference to FIG. 8. In step S501, the still detection processing unit 202 and masking processing unit 205 input image data.

Steps S502 through S504 are executed by the masking processing unit 205. In step S502, detected object invalid regions are detected based on the detected still region information currently input from the still detection processing unit 202, as with the description with reference to FIG. 8 above, and in step S504 the masking processing also with reference to FIG. 8 is executed. In step S504, masked image data, which is image data that has been subjected to masking processing, is output.

Also, steps S505 and S506, which are performed in parallel with steps S502 through S504, are executed by the still detection processing unit 202. In step S505, still regions are detected in the image data input in step S501, and in step S506, detected still region information which is the result of the detection is output to the masking processing unit 205. To reiterate, the detected still region information output in this way is used in step S502.

Steps S507 and S508 are executed by the subject detection processing unit 201. In step S507, the subject detection processing described with reference to FIG. 8 earlier is executed with regard to the masked image data output in step S504, and in step S508, the detected subject information which is the detection result thereof is output to the composition determination processing unit 203 in step S508.

In step S509, the composition determination processing unit 203 uses the detected subject information to execute composition determination.

Figure 9:
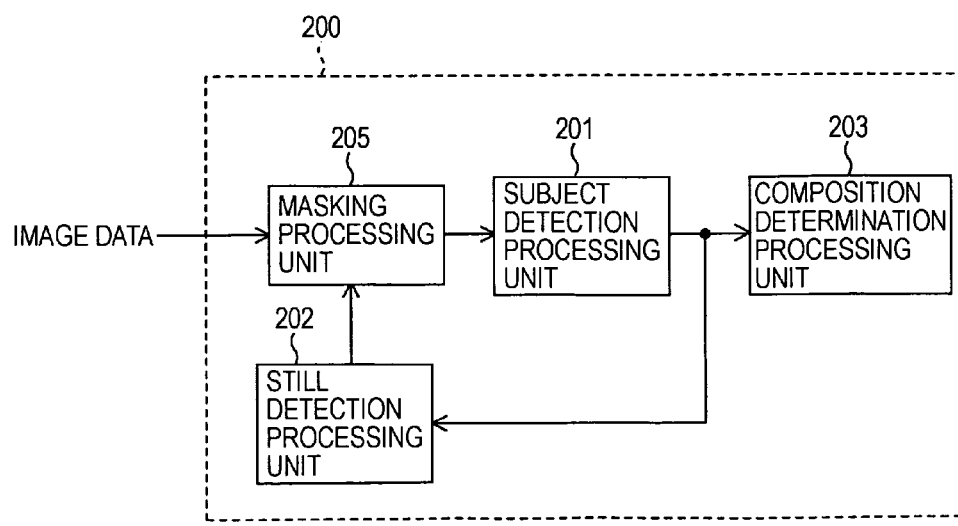
FIG. 9 is a diagram illustrating a configuration example (sixth example) of a configuration determination block according to an embodiment.

FIG. 9 illustrates the configuration of the composition determination block 200 as a sixth example in the present embodiment. The composition determination block 200 in this drawing also includes the subject detection processing unit 201, still detection processing unit 202, composition determination processing unit 203, and masking processing unit 205, which is the same as with the fifth example shown in FIG. 8, but the configuration in the sixth example is as follows.

In this case, the image data which the composition determination block 200 has input is input to the masking processing unit 205. The masking processing unit 205 uses detected still subject information input from the still detection processing unit 202 to subject the input image data to masking processing with the same processing as with the case shown in FIG. 8, and outputs the masked image data to the subject detection processing unit 201.

The subject detection processing unit 201 executes subject detection processing using the input masked data, and outputs detected subject information made up of the detected individual subject information regarding detected individual subjects to the composition determination processing unit 203. The composition determination processing unit 203 then executes composition determination processing based on the input detected subject information.

In this case, the still detection processing unit 202 inputs the detected subject information output from the subject detection processing unit 201, and detects still subjects which are in a still state from the detected individual subjects which the detected subject information indicates, with processing the same as that performed by the still detection processing unit 202 in FIGS. 5 and 7, for example. In this case, the position information for each detected still subject, i.e., information which can indicate where each still subject is in the image of the image data is, is output as detected still subject information.

The masking processing unit 205 subjects the input image data to masking processing, by setting regions within the image region corresponding to positional information for each still subject indicated by the input detected still subject information, so as to generate and output masked image data.

The masked image data generated in this way is set as a detected object invalid region regarding a region where a detected individual subject that has been detected as a still subject is situated, as described above, which means that conversely, regions where detected individual subjects which are real subjects exist are taken as detected object valid regions. Accordingly, the subject detection processing unit 201 inputting the masked image data can detect, from the subjects existing in the image, only real subjects with unreal subjects (still subjects) eliminated, as individual subjects.

The composition determination processing unit 203 then executes composition determination based on detected individual subjects of individual subjects detected in this way. That is to say, composition determination is performed in an appropriate manner only on real subjects. Note that with such a configuration, the detected object invalid regions at the masking processing unit 205 are cleared with a predetermined trigger or timing as appropriate.

Figure 15:
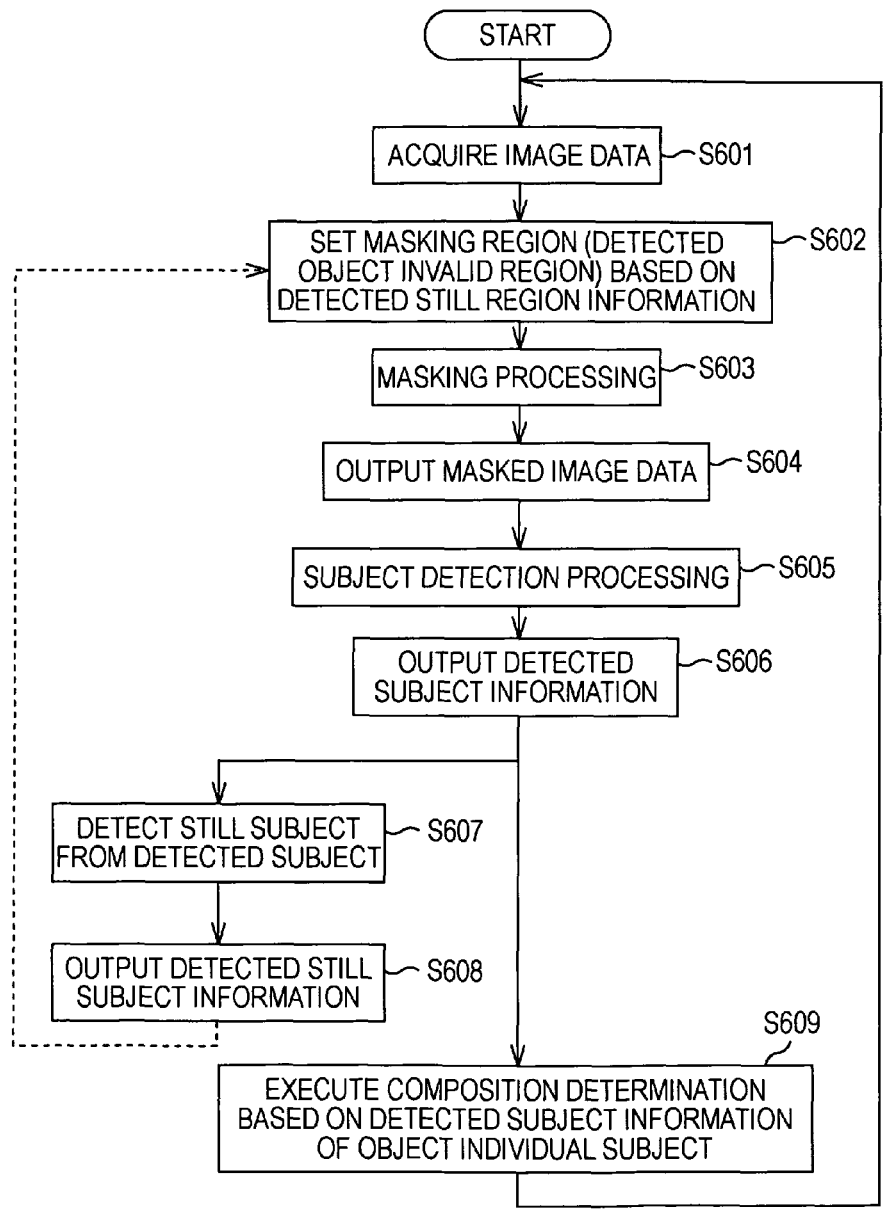
FIG. 15 is a flowchart illustrating an example of processing procedures with the configuration determination block according to the sixth example.

The flowchart shown in FIG. 15 illustrates an example of the procedures for the processing executed by the composition determination block 200 according to the sixth example which has been described with reference to FIG. 9. In this case, in step S601, the masking processing unit 205 inputs the image data.

Next, the masking processing unit 205 also executes the procedures of steps S602 through S604. In step S602, the detected still subject information currently output from the still detection processing unit 202 is input, a masking region (detected object invalid region) is set in the image of the input image data, and in step S603, masked image data is obtained by subjecting the image data to masking processing for reflecting the set masking region, and the masked image data is output in step S604.

The processing of steps S605 and S606 is executed by the subject detection processing unit 201. In step S605, the masked image data output in step S604 is input and subject detection processing is executed, and in step S606, detected subject information made up of detected individual subject information for each detected individual subject is output. Detected individual subject information output in this way is used in step S609 which is executed by the composition determination processing unit 203, and step S607 which is executed by the still detection processing unit 202.

First, in step S607, the still detection processing unit 202 detects still subject information based on the input detected individual subject information, and as the detection result thereof, and in step S608 outputs detected still subject information made up of positional information for each detected still image (detected individual subject information) as described above, to the masking processing unit 205.

Also, in step S609, the composition determination processing unit 203 executes composition determination processing based on the input detected subject information.

The configuration of the composition determination block 200 according to the above-described first through sixth examples, i.e., the basic composition determination configuration according to the present embodiment, enables unreal subjects which should be eliminated from the object of composition determination to be accurately eliminated from being objects even in the event that both real subjects and unreal subjects coexist as subjects in an image of image data, so as to perform appropriate composition determination with only real subjects as the objects.

Now, at the time of distinguishing between real subjects and unreal subjects, the result of still detection regarding the image of the image data, or detected subjects, i.e., detection relating to image motion, is used. Accordingly, even in the event that the image contents of the image data changes over time, still regions or subjects can be dynamically identified in accordance with the image contents at that time, so real subjects and unreal subjects can be constantly distinguished in an accurate manner.

For example, Japanese Unexamined Patent Application Publication No. 2007-156693 discloses a configuration wherein a masking pattern is generated at the time of face image detection such that a face image such as a face in a poster (equivalent to an unreal subject in the present embodiment) is not detected. However, with this configuration, generating of a suitable masking pattern is to be performed as calibration (initial settings) under conditions that there are no faces of actual people such as customers or employees, which are equivalent to real subjects in the presents embodiment, in the image, as described in Paragraph 0060 of Japanese Unexamined Patent Application Publication No. 2007-156693. In other words, with this related art, it is difficult to generate a suitable masking pattern with image contents where unreal subjects and real subjects coexist.

In comparison, with the present embodiment, appropriate masking processing can be performed even in situations where real subjects and unreal subjects coexist in the image (image frame), and also the image contents change over time, as described above, and consequently, composition determination with only real subjects as the object can be performed. Accordingly, with the present embodiment, in the case of application to a fixed-point surveillance system such as described in Japanese Unexamined Patent Application Publication No. 59-208983, preliminary operations such as the above-described calibration do not have to be performed, and even in the event that a new poster is put up during operation hours for some reason, faces on the poster and so forth can be eliminated. Thus, the configuration according to the present embodiment enables an arrangement to be provided which is easier to use and performs better than the related art.

Also, employing the configuration according to the present embodiment realizes flexibility to application in a wide variety of uses, without being restricted to usages such as fixed-point surveillance systems such as in Japanese Unexamined Patent Application Publication No. 59-0898, for example.

Accordingly, several devices examples and system configuration examples of application of the composition determination configuration according to the present embodiment will be described next.

First, description will be made regarding application of the composition determination according to the present embodiment to an imaging system made up of a digital still camera, and a platform to which the digital still camera is mounted. The imaging system corresponding to the preset embodiment enables still image imaging and recording to be performed in accordance with a composition determined by composition determination.

Figure 16:
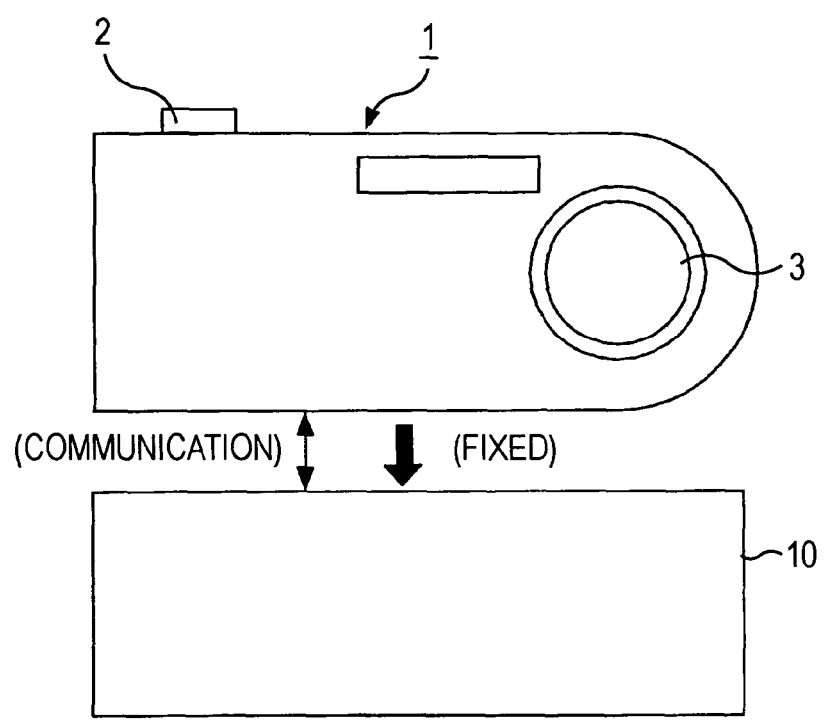
FIG. 16 is a diagram illustrating a digital still camera and a platform making up an imaging system according to an embodiment, to which the configuration determination block according to an embodiment has been applied.

FIG. 16 illustrates an example of the external configuration of an imaging system according to the present embodiment, as viewed from the front. As shown in this drawing, the imaging system according to the present embodiment is configured of a digital still camera 1 and a platform 10.

The digital still camera 1 generates still image data based on imaging light obtained by performing imaging with a lens unit 3 provided to a main unit front side panel, and can store this in an internally-mounted storage medium. That is to say, the digital still camera 1 has a function that images taken as photographs are stored and saved in the storage medium as still image data. In the event of performing such photography imaging manually, the user presses a shutter (release) button provided to the upper face of the main unit.

The platform 10 can mount the digital still camera 1 such that the digital still camera 1 is fixed to the platform 10. That is to say, the digital still camera 1 and platform 10 both have mechanism portions for enabling mutual attachment.

Figure 17A:
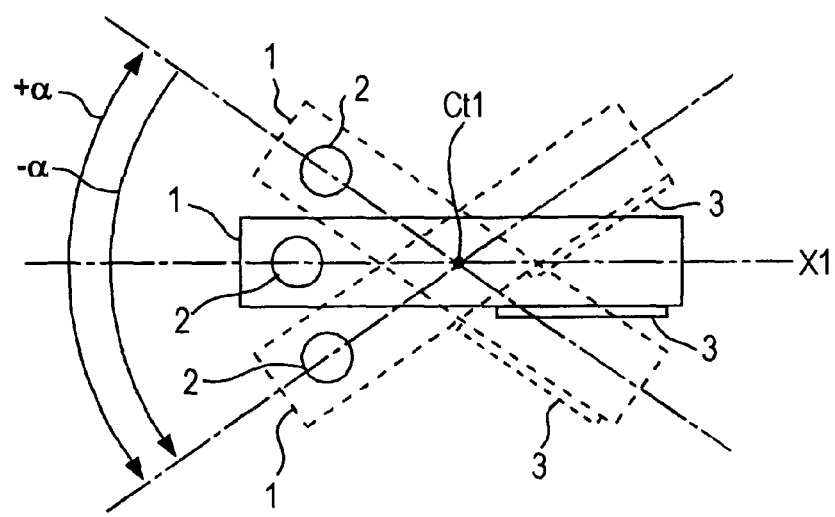
FIGS. 17A and 17B are diagrams schematically illustrating an example of movement of the digital still camera mounted to the platform in the pan direction and tilt direction, as operations of the imaging system according to an embodiment.
Figure 17B:
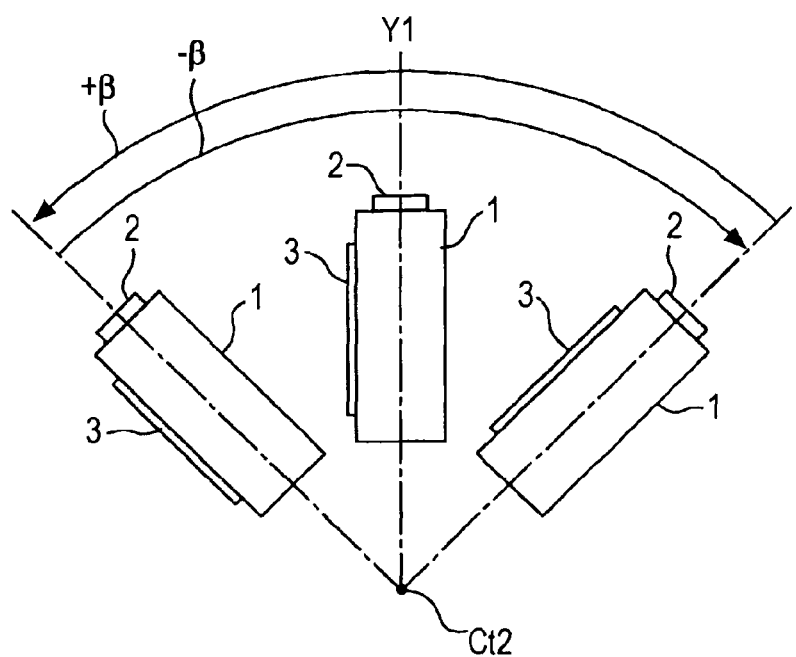

The platform 10 has a pan/tilt mechanism for moving the mounted digital still camera 1 in the panning direction (horizontal direction) and tilting direction. The pan direction and tilt direction of the digital still camera 1 enabled by the pan/tilt mechanism of the platform 10 are as shown in FIGS. 17A and 17B, for example. FIGS. 17A and 17B are views of the digital still camera 1 mounted to the platform 10, from the planar and side directions.

First, with regard to the pan direction, with a positional state wherein the sideways direction of the digital still camera 1 and the line X in FIG. 17A are the same direction as a reference, turning along the rotational direction +α with a rotational axis Ct 1 as the center of rotation provides panning motion in the right direction. Also, turning along the rotational direction −α provides panning motion in the left direction.

Next, with regard to the tilt direction, with a positional state wherein the vertical direction of the digital still camera 1 and the line Y in FIG. 17B are the same direction as a reference, turning along the rotational direction +β with a rotational axis Ct 2 as the center of rotation provides panning motion in the downward direction. Also, turning along the rotational direction −β provides panning motion in the upward direction.

While the maximum turning angles for ±α and ±β in FIGS. 17A and 17B are not mentioned in particular, it can be said that a maximum turning angle as great as possible is desirable if increasing the opportunity for capturing subjects is to be taken into consideration.

Figure 18:
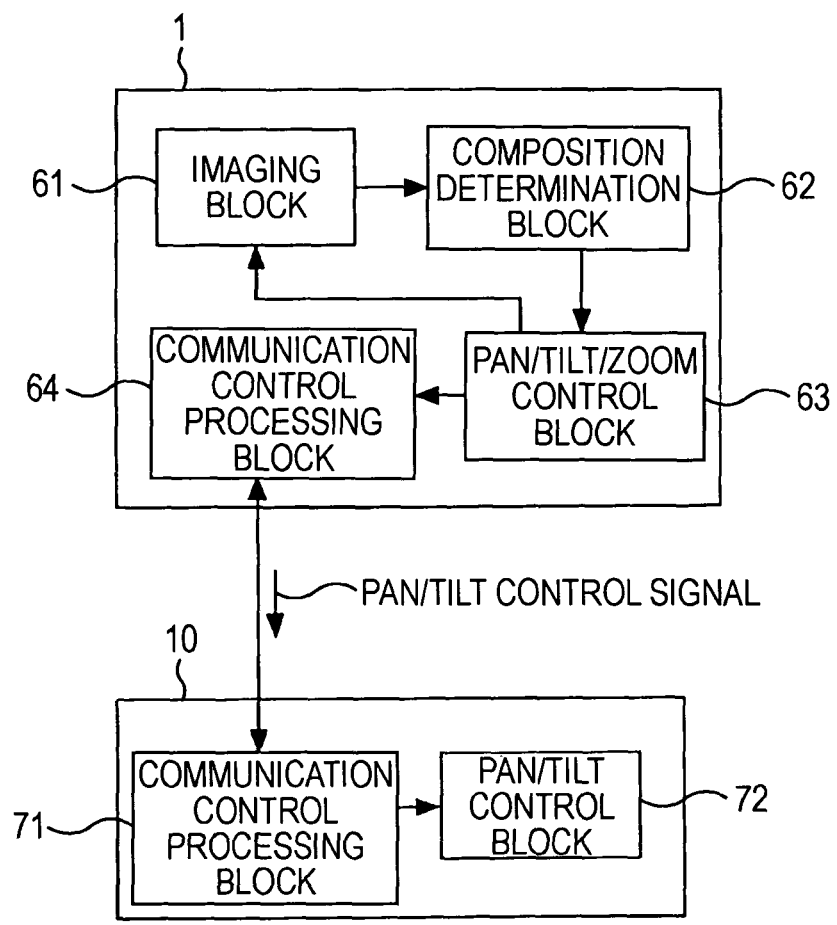
FIG. 18 is a block diagram illustrating an internal system configuration example regarding the imaging system according to an embodiment.

FIG. 18 internally illustrates the imaging system according to the present embodiment, as block configurations corresponding to each functional operation. In FIG. 18, the digital still camera includes an imaging block 61, a composition determination block 62, a pan/tilt/zoom control block 63, and a communication control processing block 64.

The imaging block 61 is a portion for outputting an image obtained by imaging as image signal data (imaged image data), and includes an optical system for imaging, and imaging device (image sensor), a signal processing circuit for generating imaged image data from signals output form the imaging device, and so forth.

The composition determination block 62 inputs the imaged image data output from the imaging block 61, and executing processing for composition determination based on the imaged image data. Any of the composition determination blocks 200 shown in FIGS. 4 through 9 earlier can be applied for this composition determination block 62. That is to say, the composition determination block 62 can execute composition determination with only real subjects as the object by eliminating unreal subjects coexisting in an image of imaged image data.

The pan/tilt/zoom control block 63 executes pan/tilt/zoom control (composition control) for obtaining an imaging view angle to obtain an imaged image composition indicated by the information of composition determination results input from the composition determination block 62. That is to say, an amount of movement is obtained for the pan/tilt mechanism of the platform 10 over which the digital still camera 1 has to move such that the imaging direction agrees with the composition indicated by the determination results, and pan/tilt/zoom control signals are generated for instructing the movement in accordance with the obtained amount of movement. Also, a zoom position is obtained for obtaining a field angle to obtain the imaged image composition indicated by the determination results, and a zoom mechanism of the imaging block 61 is controlled so as to achieve this zoom position.

The communication control processing block 64 is a portion for executing communication with a communication control block 71 provided to the platform 10 side. The pan/tilt/zoom control signals generated by the pan/tilt/zoom control block 63 are transmitted to the communication control block 71 of the platform 10 by communication performed by the communication control processing block 64.

The platform 10 has this communication control block 71 and a pan/tilt control processing block 72, as shown in FIG. 8, for example. The communication control block 71 is a portion for communicating with the communication control processing block 64 of the digital still camera 1 side, and in the event of receiving the above pan/tilt/zoom control signals, outputs the pan/tilt/zoom control signals to the pan/tilt control processing block 72.

The pan/tilt control processing block 72 corresponds to a mechanism for executing processing relating to pan/tilt control, of the control processing executed by a microcomputer or the like at the platform 10 side (not shown). The pan/tilt control processing block 72 controls an unshown pan driving mechanism unit and tilt driving mechanism unit, which are not shown here, in accordance with the input pan/tilt control signals. Accordingly, panning and titling for obtaining a horizontal view angle and vertical view angle in accordance with the determined composition is performed.

Also, in the event that no subject is detected by the composition determination block 62, the pan/tilt/zoom control block 63 can perform panning/tilting/zooming for searching for subjects, in accordance with commands, for example.

With the imaging system made up of the digital still camera 1 and platform 10 of the configuration shown in FIG. 18, an arrangement may be made where, handling a person as a subjective subject (hereinafter referred to simply as "subject"), a subject is searched, and in the event that existence of a subject is detected, the pan/tilt mechanism of the platform 10 is activated so as to obtain (frame) a composition optimal for an image with the subject being included therein (optimal composition). At the timing that the optimal composition is obtained, the imaged image data at that time can be recorded (imaging recording) in the storage medium. Note that with the configuration shown in FIG. 18 for example, instruction of imaging recording (instruction of a release operation) can be performed from the pan/tilt/zoom control block 63 as to an appropriate portion such as the imaging block 61 for example, at a timing at which the pan/tilt/zoom control for composition is completed. Alternatively, a release instruction may be made with the composition determination block 62, at a timing where determination is made that the similarity between the actual composition obtained in the image of the imaged image data and the determined optional composition is a certain level or higher.

In this way, with the imaging system in FIG. 18, at the time of performing photography with a digital still camera, first, an optimal composition is decided (determined) regarding a searched subject, and photography and recording is performed, automatically. Accordingly, reasonably high-quality images can be obtained even if the user does not determined a composition and shoot pictures. Also, with such a system, no one person has to hold the camera and shoot, so all who are at that place can be subjects. Also, photographs with all subjects in the picture can be obtained even without all of the subjects trying to be in the view angle range of the camera. That is to say, there will be greater opportunities to shoot the people at the place where photography is being performed in a more natural state, so many photographs of a nature which were not readily obtained heretofore can be obtained.

Also, optimal compositions differ depending on the directions the subjects are facing, and with cases where there are multiple subjects, different optimal compositions can be determined in accordance with the relation between the direction of the subjects, so the user of the device having a configuration according to the present embodiment can obtain optimal configurations without troublesome procedures.

In addition, the imaging system as described above performs composition determination as described above, and accordingly can performing imaging recording of images having appropriate compositions, with only real people (real subjects) being taken as objects, without erroneously reacting to people in posters or the like for example (unreal subjects).

Figure 19:
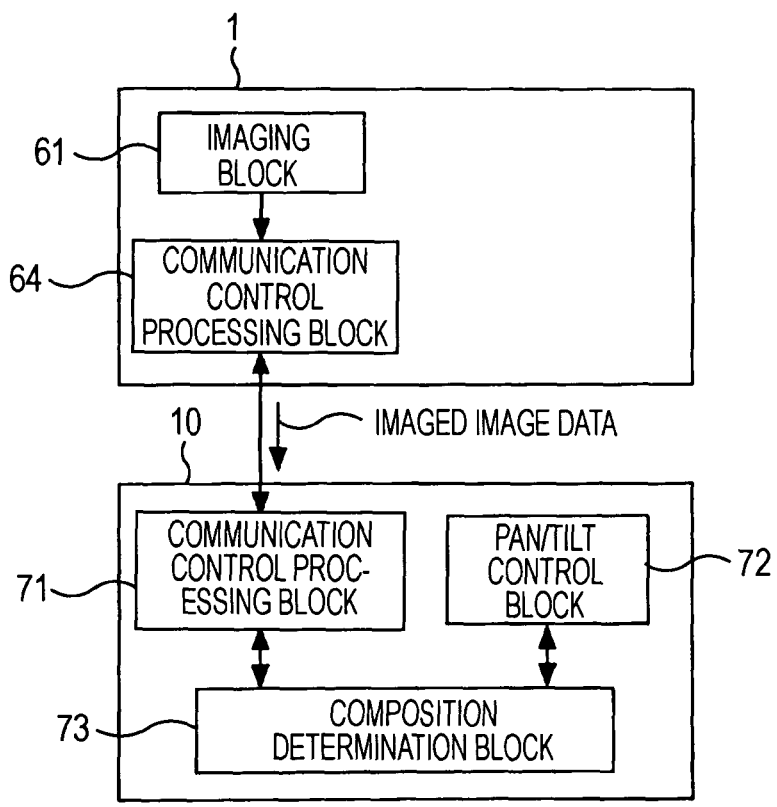
FIG. 19 is a block diagram illustrating another internal system configuration example regarding the imaging system according to an embodiment.

FIG. 19 illustrates a modification of the imaging system according to the present embodiment shown in FIG. 18. In FIG. 19, at the digital still camera 1, imaged image data obtained by the imaging block 61 is transmitted from the communication control processing block 64 to the communication control block 71 of the platform 10. The platform 10 is shown here including the communication control block 71, pan/tilt control processing block 72, and a composition determination block 73.

The imaged image data received by the communication control block 71 is output to the composition determination block 73. Any of the composition determination blocks 200 shown in FIGS. 4 through 9 earlier can be applied for this composition determination block 73, so as to be able to execute composition determination with only real subjects based on the input imaged image data.

In this case, the amount of movement is obtained for the pan mechanism unit and tilt mechanism unit such that the shooting direction matches the determined composition, as with the case of the pan/tilt/zoom control block 63 in FIG. 18, for example, and pan/tilt/zoom control signals for instructing the movement in accordance with the obtained amount of movement are generated and output to the pan/tilt control processing block 72. Accordingly, panning and tilting is performed such that the composition determined at the composition determination block 73 can be obtained.

Thus, the imaging system shown in FIG. 19 is configured such that imaged image data is transmitted from the digital still camera 1 to the platform 10 where the acquired imaged image data is used to perform composition determination, and corresponding pan/tilt control (composition control) is also executed. Also, with the configuration shown in FIG. 19, no zoom (field angle) control is performed in control of the imaging view angle (composition control), indicating that with the present embodiment, control of each of pan/tilt/zoom is not indispensable for composition control. For example, depending on conditions or situations, composition control in accordance with the determined composition may be realized by pan control alone, tilt control alone, or zoom control alone.

Figure 20:
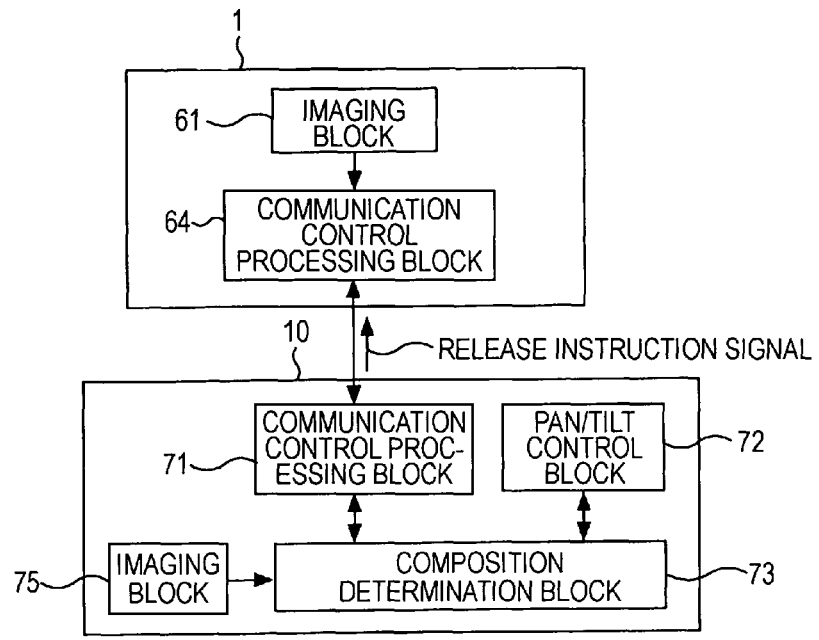
FIG. 20 is a block diagram illustrating another internal system configuration example regarding the imaging system according to an embodiment.

FIG. 20 illustrates another modification of the imaging system according to the present embodiment. Note that some of the components in FIG. 20 are denoted with the same reference numerals as with FIG. 19, and description thereof omitted.

This system has an imaging block 75 at the platform 10 side. The imaging block 75 is configured of an optical system and imaging device (image sensor) for imaging, and a signal processing unit for generating imaged image data from the imaged signals, in the same way as the imaging block shown in FIGS. 18 and 19, for example. The imaged image data generated by the imaging block 75 is output to the composition determination block 73. Note that a preferable arrangement is to have the direction of the imaging block 75 inputting imaging light (imaging direction) matching the imaging direction of the digital still camera 1 mounted on the platform 10, as much as possible. The composition determination block 73 and pan/tilt control processing block 72 in this case execute composition determination in the same way as with FIG. 19, and driving control of the pan/tilt mechanism in accordance with the composition determination results.

It should be noted that the composition determination block 73 in this case transmits a release instruction signal to the digital still camera 1 via the communication control block 71 in accordance with a timing at which the release action is to be executed (the timing at which the determined composition has been obtained with regard to the image of the imaged image data from the imaging block 75). The digital still camera 1 executes a release operation in response to reception of the release instruction signal, and executes imaging recording of image data based on the imaged image data obtained by the imaging block 6 at that time. With this other embodiment, all control and processing relating to composition determination and composition control, other than that relating to the release operation itself, can be completed at the platform 10 side.

Note that with the above description, pan control and tilt control is performed by controlling movement of the pan/tilt mechanism of the platform 10, but another configuration can be conceived, wherein, instead of the platform 10, imaging light reflected off of a reflecting mirror is input to an optical system 21 of the digital still camera 1 for example, and the reflecting mirror is moved such that panning/tilting results are obtained regarding the image acquired based on the imaging light.

Also, results equivalent to performing panning/tilting can be obtained by shifting the pixel region for acquiring valid imaging signals as an image from the imaging device (image sensor 22) of the digital still camera 1 in the horizontal direction and vertical direction. In this case, a device for panning/tilting other than the digital still camera 1, such as the platform 10 or an equivalent device, does not have to be prepared, and composition control according to the present embodiment can be completed within the digital still camera 1 alone.

Also, with regard to field angle control (zoom control) as well, an arrangement may be made wherein this can be realized by cropping out a partial image region of the imaged image data, instead of driving a zoom lens. Further, the digital still camera 1 may be provided with a mechanism capable of changing the optical axis of the optical system in the horizontal and vertical directions, such that panning and tilting can be performed by controlling the movement of this mechanism.

Figure 21:
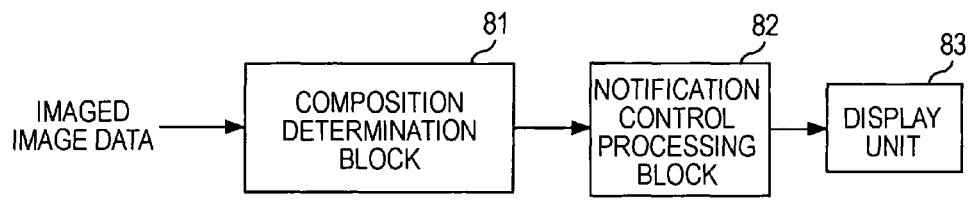
FIG. 21 is a block diagram illustrating an application example for a composition determination block according to an embodiment, other than to an imaging system.

Next, examples of applying a configuration for composition determination according to the present embodiment to other than the above-described imaging system will be described. First, FIG. 21 illustrates an application of composition determination according to the present embodiment to a stand-alone imaging apparatus such as a digital still camera or the like, with the user being notified at a point in time that the image being imaged by the imaging apparatus in a photographing mode attaining a suitable composition in accordance with detection results, for example.

Shown here is a configuration which the imaging apparatus should have to this end, including a composition determination block 81, a notification control processing block 82, and a display unit 83. Any of the composition determination blocks 200 shown in FIGS. 4 through 9 earlier can be applied for this composition determination block 81.

For example, let us say that a user has set the imaging apparatus to the photography mode, has held the imaging apparatus in hand, and is in a state where the release operation (shutter button operation) can be performed at any time to record the imaged image. In this state, the composition determination block 81 first acquires the imaged image data obtained at that time by imaging, executes the series of composition determination processing described earlier, and determines an optimal composition.

Furthermore, the composition determination block 81 at that time obtains the degree of matching and/or the degree of similarity between the composition of the image contents of the imaged image data being actually obtained at that time with the determined optimal composition. If the similarity, for example, reaches a certain level of higher, determination is made that the composition of the image contents of the imaged image data being actually obtained at that time has attained the optimal composition. In actual practice, an arrangement can be conceived where an algorithms is prepared so as to be determined that the optimal composition has been attained at the point that similarity of a certain level or higher is reached, such that the composition of the image contents of the imaged image data and the optimal composition can be viewed as having matched. A wide variety and range of algorithms for determining degree of matching or degree of similarity can be conceived, so specific examples thereof will not be discussed in particular here.

Information of the determination results to the effect that the image contents of the imaged image data have attained the optimal composition are output to the notification control processing block 82. The notification control processing block 82 executes display control in accordance with the input of information so as to notify the user that the image being currently imaged is an optimal configuration, by performing display control of a predetermined form on the display unit 83.

Note that the notification control processing block 82 is realized by display control function of a microcomputer (CPU) and so forth of the imaging apparatus, and a display image processing function for realizing image display as to the display unit 83 and so forth. Notification to the user to the effect that the optimal composition has been achieved may also be performed audibly, such as electronic sound, synthesized voice, or any other sort of sound.

Also, the display unit 83 corresponds to a display unit 33 of the digital still camera 1 according to the present embodiment for example, which is often provided such that the display panel is shown at a predetermined location on the imaging apparatus with an image being imaged at that time being display thereupon. Such an image in photography mode is also called a "through image". Accordingly, in actual practice, with the imaging apparatus, an image to the effect that the composition is optimal is displayed superimposed on the through image on the display unit 83. The user performs a release operation when this display notifying the optimal composition comes up. Accordingly, even users who are not highly knowledgeable about photography or highly skilled can easily take photographs with good composition.

Figure 22:
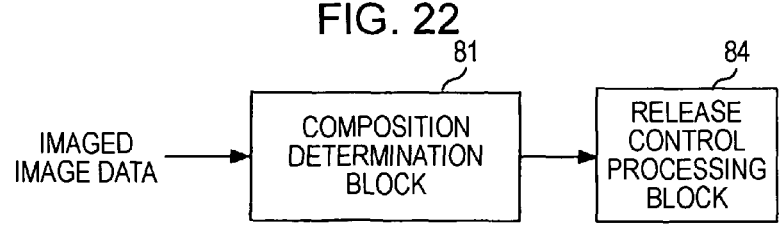
FIG. 22 is a block diagram illustrating an application example for a composition determination block according to an embodiment, other than to an imaging system.

Also, FIG. 22 shows a configuration for composition determination according to the present embodiment, applied to a stand-alone imaging apparatus such as a digital still camera 1, as with the case of FIG. 21 described above. First with the configuration shown in FIG. 22, processing is executed by the composition determination block 81 for determining an optimal composition based on the input imaged image data, and determination is made regarding whether or not the image contents of imaged image data obtained at a later timing are the optimal composition. Upon determination being made that the composition is the optimal composition, notification is made to this effect to a release control processing block 84.

The release control processing block 84 is a portion which executes control for recording the imaged image data, and is realized by control executed by a microcomputer of the imaging apparatus, for example. The release control processing block 84 which has received the above notification executes image signal processing and recording control processing such that the imaged image data is recorded in the recording medium, for example. With such a configuration, an imaging apparatus can be provided wherein, when an image according to the optimal composition is imaged for example, recording thereof is performed automatically.

The configurations shown in FIGS. 21 and 22 are applicable to not only digital still cameras of a configuration such as shown in FIG. 1 for example, but all cameras falling within the scope of still cameras for example, including so-called silver-salt cameras which record imaged images on silver-salt film or the like, but providing an image sensor for splitting imaged light obtained by the optical system, a digital image signal processing unit for inputting and processing signals from the image sensor, for example.

Figure 23:
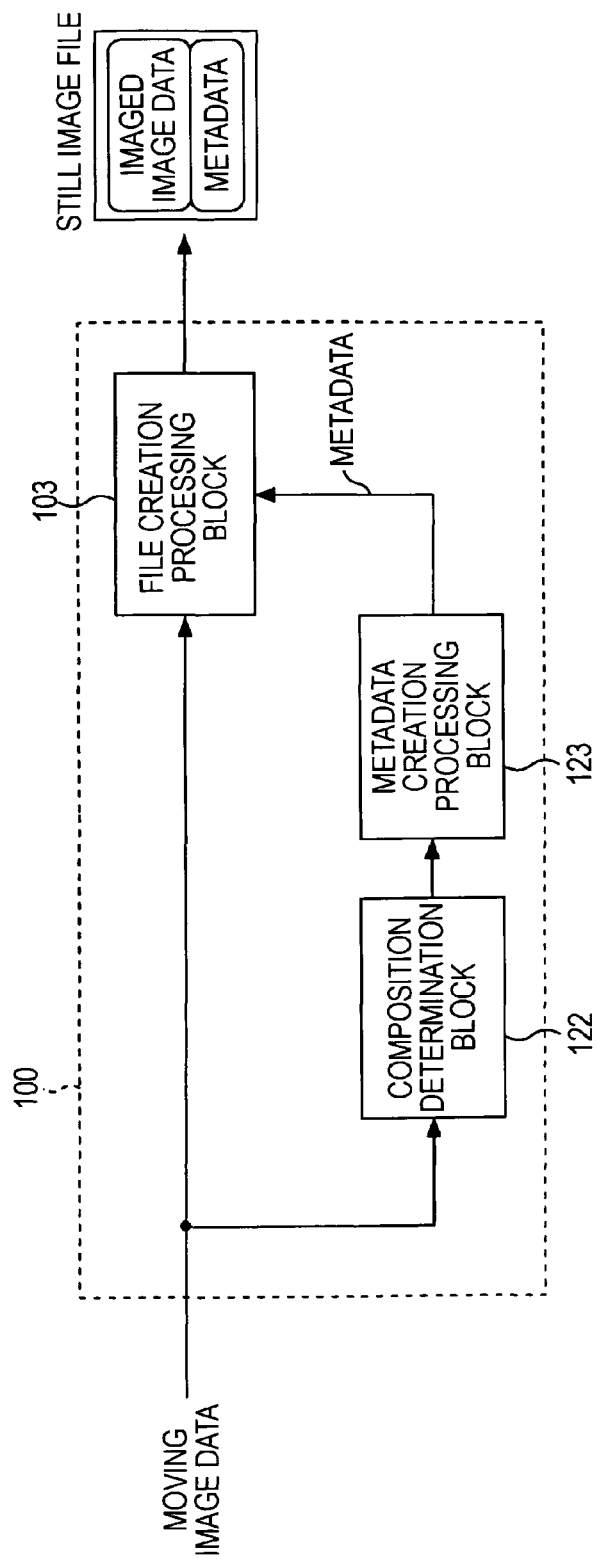
FIG. 23 is a block diagram illustrating an application example for a composition determination block according to an embodiment, other than to an imaging system.

FIG. 23 is an example of a configuration wherein the configuration of the composition determination according to the present embodiment has been applied to an imaging apparatus such as a digital still camera. The imaging apparatus 100 shown in FIG. 23 has a composition determination block 101, a metadata creation processing block 102, and a file creation processing block 103. We will say that the composition determination block 101 has a configuration illustrated in any one of FIGS. 4 through 9.

Imaged image data obtained by imaging with an unshown imaging block is input to the composition determination block 101 and the file creation processing block 103 of the imaging apparatus 100. Note that the imaged image data input to the imaging apparatus 100 is imaged image data which is to be recorded in the recording medium due to a release operation or the like, and is generated based on imaging signals obtained by imaging with an unshown imaging block.

First, the composition determination block 101 performs composition determination with real subjects as the objects, with unreal subjects (still subjects) having been eliminated. Further, the composition determination processing in this case includes executing processing, performed thereupon, for determining what portion of the entire image region of the input imaged image data is the image portion where the determined optimal composition is obtained, in accordance with a predetermined vertical-horizontal ratio (image portion of optimal composition), based on the composition determination results. Information indicating the identified image portion of the optimal composition is then output to the metadata creation processing block 102.

At the metadata creation processing block 102, metadata made up of information for obtaining an optimal composition from the corresponding imaged image data (composition editing metadata) is created based on the input information, and this is output to the file creation processing block 103. The contents of the composition editing metadata are, for example, positional information which may indicate which image region portion of the corresponding imaged image data to trim, and so forth.

With the imaging apparatus 100 shown in FIG. 23, the imaged image data is recorded in the recording medium so as to be managed as a still image file according to a predetermined format. Accordingly, the file creation processing block 103 converts the imaged image data into the still image format (i.e., creates a still image file according to the format).

The file creation processing block 103 first performs image compression encoding corresponding to the image file format with regard to the input imaged image data, and creates a file main portion made up of the imaged image data. Also, the composition editing metadata input from the metadata creation processing block 102 is stored in a predetermined storing position, so as to create a data portion made up of a header, added information block, and so forth. The file main portion, header, added information block, and so forth, are used to create a still image file, which is then output. As shown in FIG. 23, the still image file to be recorded in the recording medium has a structure including the imaged image data and the metadata (composition editing metadata).

Figure 24:
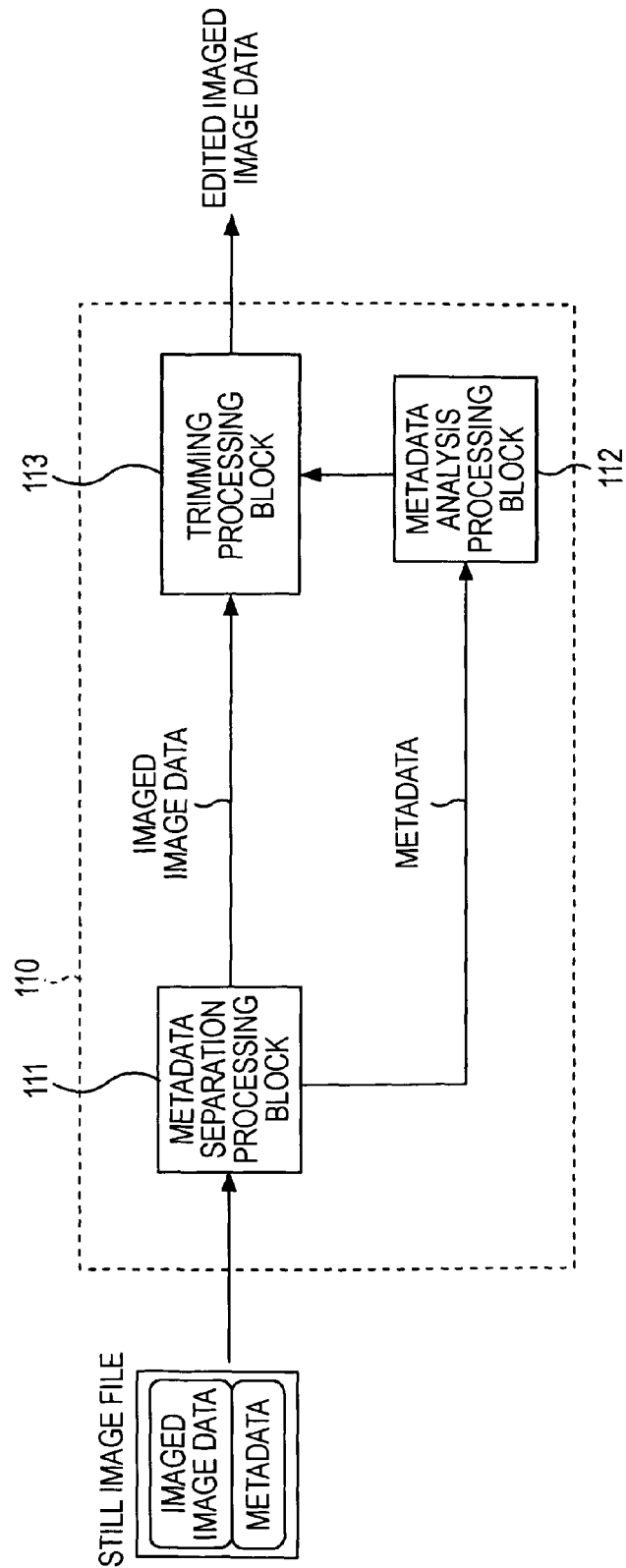
FIG. 24 is a block diagram illustrating an application example for a composition determination block according to an embodiment, other than to an imaging system.

FIG. 24 illustrates a configuration example of an editing device for performing editing with regard to the still image file created by the device shown in FIG. 23. The editing device 110 shown in FIG. 24 acquires the data of the still image file, and first inputs this to a metadata separation processing block 111. The metadata separation processing block 111 separates the imaged image data which is the file main portion, and the metadata, from the still image file. The metadata separation processing block 111 then outputs the metadata obtained by separation to a metadata analysis processing block 112, and outputs the imaged image data to a trimming processing block 113.

The metadata analysis processing block 112 is a portion which executes processing for analyzing the input metadata. Analyzing processing performed therein regarding the composition editing metadata involves at least identifying an image region regarding which trimming is to preformed on the corresponding imaged image data, from the information for obtaining an optimal composition, which is the contents of the composition editing metadata. Trimming instruction information for instructing trimming of the identified image region is then output to the trimming processing block 113.

The trimming processing block 113 executes image processing for cropping the image portion indicated by the trimming instruction information input from the metadata analysis processing block 112, from the imaged image data input from the metadata separation processing block 111 side, and outputs the cropped image portion as edited imaged image data, which is independent image data.

With a system configured of the imaging apparatus and editing device shown in FIGS. 23 and 24, original still image data obtained by photography for example (imaged image data) can be saved without image processing, and editing to crop out an image which is the optimal composition can be performed using the metadata from this original still image data. Also, deciding which image portion to crop corresponding to such an optimal composition is performed automatically, making editing very easy for the user.

Note that arrangements may be conceived wherein the functions of the editing device shown in FIG. 24 are realized by, for example, an application installed in a personal computer for editing image data, an image editing function in an application for managing image data, and so forth.

Figure 25:
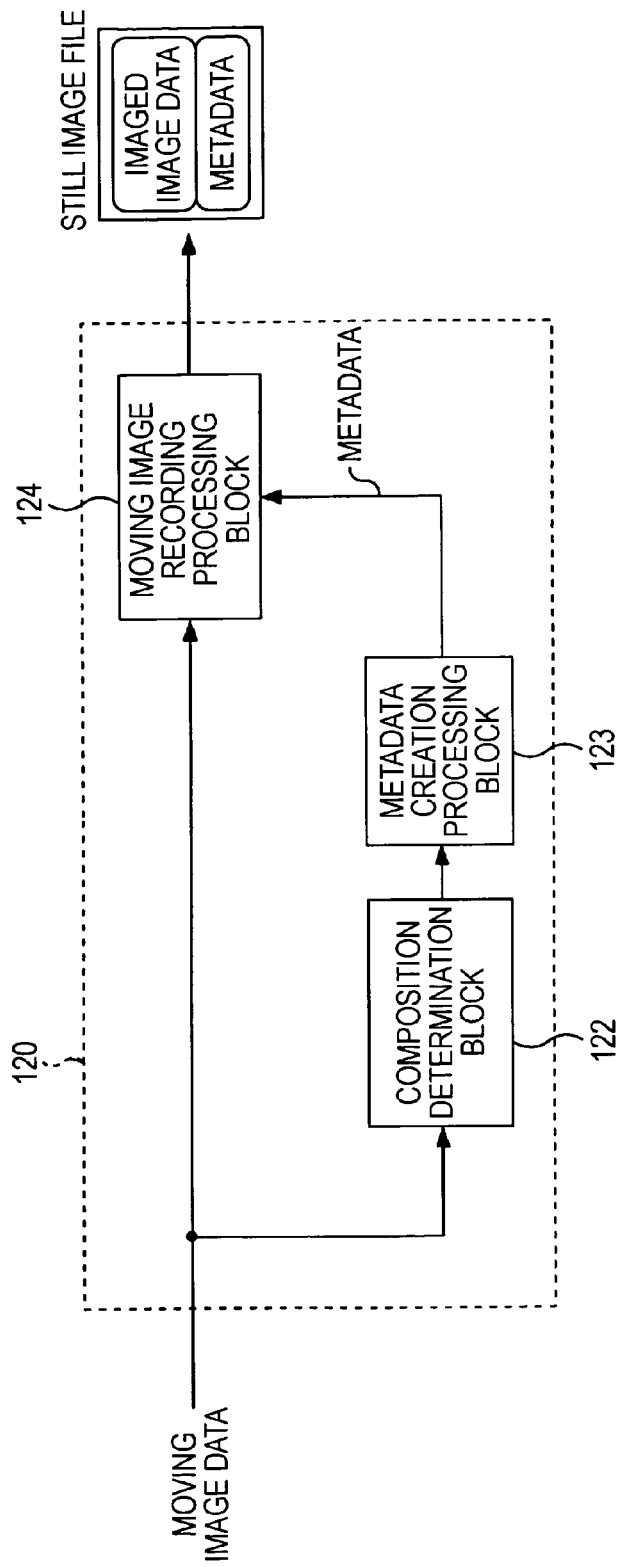
FIG. 25 is a block diagram illustrating an application example for a composition determination block according to an embodiment, other than to an imaging system.

FIG. 25 illustrates an example of applying the configuration of composition determination according to the present embodiment to an imaging apparatus capable of shooting and recording moving images, such as a video camera for example. Moving image data is input to an imaging apparatus 120 shown in FIG. 25. The moving image data is generated based on imaging signals obtained by an imaging unit which the imaging apparatus 120 has, performing imaging. The moving image data is input to a composition determination block 122 and a moving image recording processing block 124 which the imaging apparatus 120 includes.

The composition determination block 122 in this case obtains an optimal composition by performing composition determination regarding only real subjects in the image of moving image data that is input thereof, based on a configuration illustrated in any one of FIGS. 4 through 9. Thereupon, the composition determination block 122 inspects by comparison the difference between the actual composition of the image of the moving image data, and the determined optimal composition. In the handling performed in a specific example of composition determination described later for example, parameters corresponding to the optimal composition, such as the percentage which the object individual subjects occupy within the image (size), distance between subjects, and so forth, are obtained by the composition determination. Accordingly, all that has to be done in actual comparison is to compare these parameters corresponding to the optimal composition with parameters currently manifested in the image of the moving image data. In the event that the parameters both are determined to have similarity of a certain level or high as a result of the comparison, determination is made that the composition is good, and in the event that the similarity is below the certain level, determination is made that the composition is not good.

In the event that the composition determination block 122 has determined that a good composition has been obtained regarding the moving image data as described above, the composition determination block 122 outputs information to a metadata creation processing block 123 regarding where the image section regarding which determination has been made above that a good composition has been obtained (good composition image section) is (good composition image section instruction information). This "good composition image section" is, for example, information indicating such as the starting position and ending position of the good composition image section in the moving image data, and so forth.

The metadata creation processing unit 123 in this case generates metadata to be used by the later-described moving image recording processing block 124 to record moving image data as a file in the recoding medium. Upon good composition image section instruction information being input from the composition determination block 122, the metadata creation processing unit 123 generates metadata indicating that the image section indicated by the input good composition image section instruction information is a good composition, and outputs this to the moving image recording processing block 124.

The moving image recording processing block 124 executes control for recording the input moving image data in the recording medium so as to be managed as a moving image file according to a predetermined format. In the event that metadata is output from the metadata creation processing block 123, the moving image recording processing block 204 executes control such that this metadata is included in the metadata attached to the moving image file. Accordingly, the moving image file recorded in the recording medium has contents where metadata, indicating the image section where a good composition has been obtained, is attached to the moving image data obtained by imaging.

Note that the imaging section where a good composition has been obtained, as indicated by the metadata as described above, may be an image section in the moving image having a time span of a certain degree, or may be in a still image extracted from the moving image data. Another arrangement which can be conceived is to generate moving image data or still image data of the image section where a good composition has been obtained, instead of the above metadata, and recording thus as secondary image data to be attached to the moving image file (or as a file independent from the moving image file).

Also, with the configuration where the imaging apparatus 120 has the composition determination block 122 as shown in FIG. 25, a configuration can be conceived wherein only sections of moving images determined by the composition determination block 122 to be good composition image sections are recorded as moving image files. Further, an arrangement may be conceived wherein image data corresponding to image section as determined by the composition determination block 122 to be good compositions are externally output to an external device by way of a data interface or the like.

Figure 26:
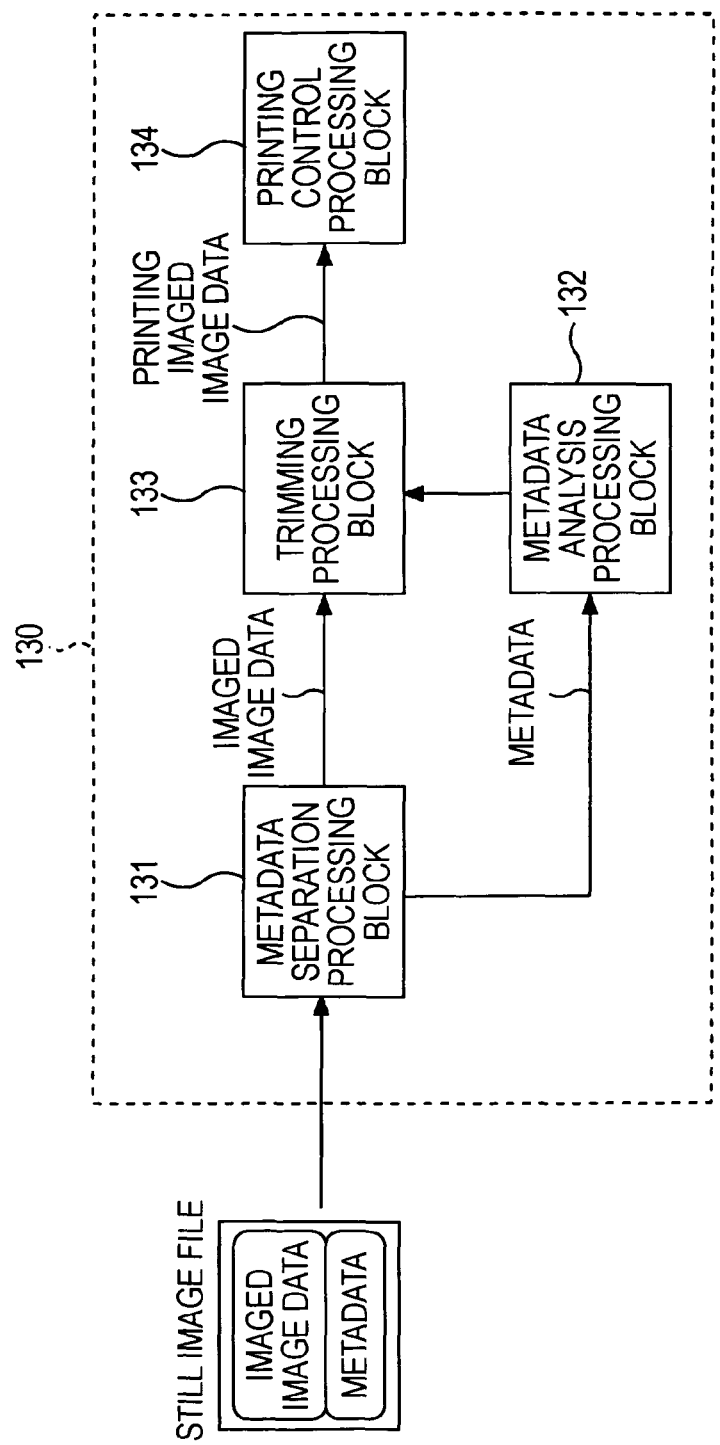
FIG. 26 is a block diagram illustrating an application example for a composition determination block according to an embodiment, other than to an imaging system.

A printing device 130 shown in FIG. 26 can be conceived as an example of a device corresponding to the imaging apparatus 100 shown in FIG. 23 besides the editing device shown in FIG. 24. In this case, the printing device 130 is arranged to acquire still image files as images to be printed. The still image files include still image files generated by the imaging apparatus 100 for example, and have a structure of including the actual image data which is the still image, and the metadata. Accordingly, this metadata includes the composition editing metadata of equivalent contents to the still image files shown in FIGS. 23 and 24.

Files thus input acquired are input to a metadata separation processing block 131. The metadata separation processing block 111 separates image data equivalent to the file main portion, from the metadata attached thereto, out of the still image file data, in the same way as with the metadata separation processing block 131. The separated and obtained metadata is output to a metadata analysis processing block 132, and the image data is output to a trimming processing block 133.

The metadata analysis processing block 132 executes analysis processing on the input metadata in the same way as with the metadata separation processing block 111 in FIG. 24, and outputs trimming instruction information to the trimming processing block 133.

The trimming processing block 133 performs image processing for cropping out the image portion from the image data input from the metadata separation processing block 131, indicated by the trimming instruction information input from the metadata analysis processing block 132, and outputs image data of a printing format generated from this cropped image portion to a printing control processing block 134, as printing image data.

The printing control processing block 134 uses the input printing image data to execute control for causing an unshown printing device to operate. Due to such operations, with the printing device 130, an image portion where an optimal composition is obtained is automatically cropped out of the image contents of the input image data, and printed as a single image.

Next, a more specific configuration example of a device and system to which the composition determination according to the present embodiment has been applied will be described. An example will be given here regarding the imaging system made up of the digital still camera 1 and the platform 10 having the system configuration illustrated and described by way of FIGS. 16 through 18 earlier.

Figure 27:
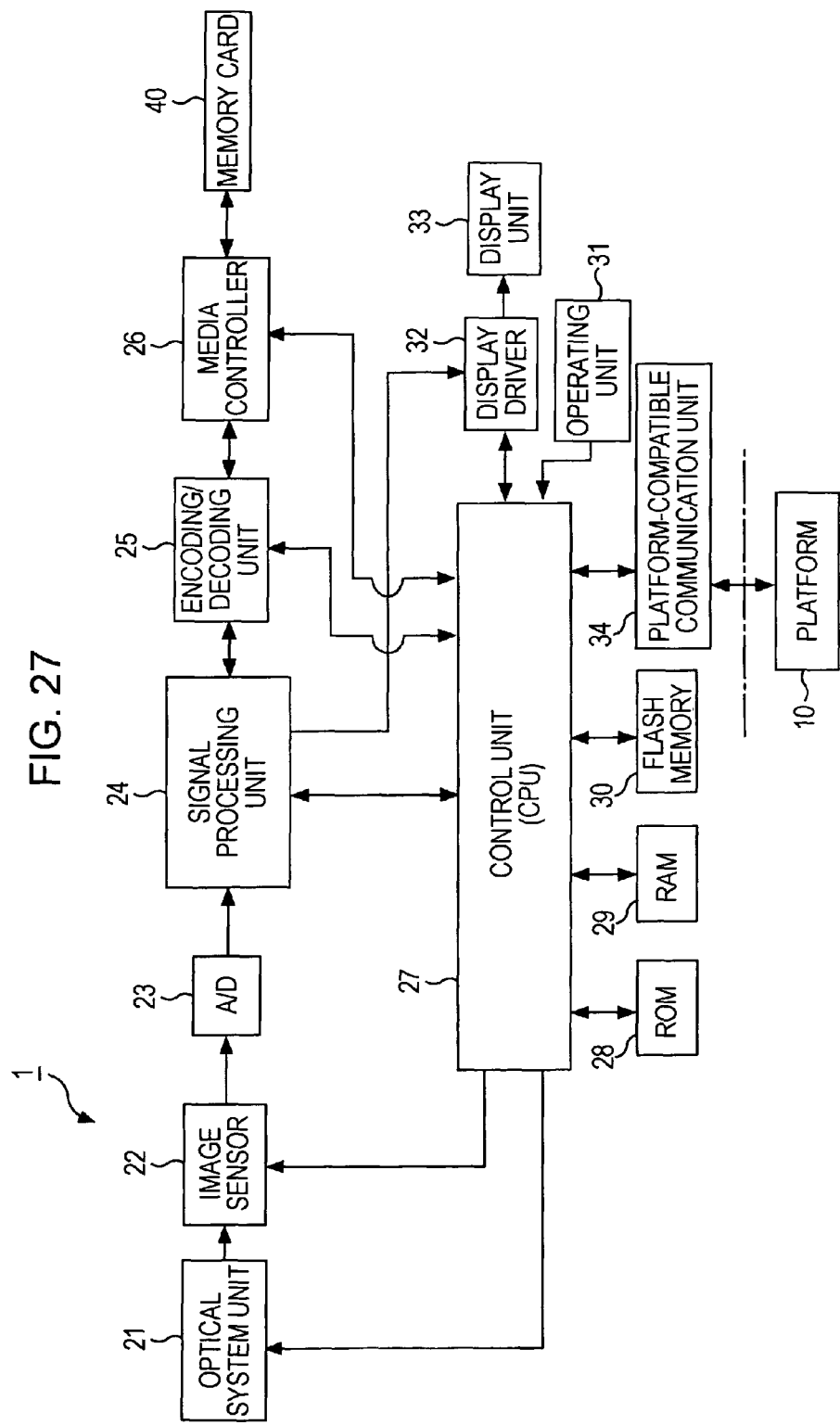
FIG. 27 is a block diagram illustrating an internal configuration example of the digital still camera making up the imaging system according to an embodiment.

First, a block illustration is shown in FIG. 27 of an actual internal configuration example regarding the digital still camera 1. In FIG. 27, an optical system 21 is made up of for example, an imaging lens group including multiple imaging lenses such as a focus lens and the like, and a diaphragm and the like, and images incident light as imaging light on a photoreception face of an image sensor 22. The optical system 21 also has a driving mechanism for driving the zoom lens, focus lens, diaphragm, and so on. The operations of the driving mechanism, are controlled by so-called camera control executed by a control unit 27 for example, such as zoom (field angle) control, auto focus adjustment control, automatic exposure control, and so forth.

The image sensor 22 performs so-called photoelectric conversion wherein imaging light obtained at the optical system 21 is converted into electric signals. Accordingly, the image sensor 22 is configured so as to receive imaging light from the optical system 21 at the photoreception face at a photoelectric conversion device, and sequentially output signal changes accumulated in accordance with the intensity of the received light at predetermined timings. This outputs electric signals (imaging signals) corresponding to the imaged light. Note that examples of photoelectric conversion devices (imaging devices) employed as the image sensor 22 may include, at the current state, CMOS sensor or CCD (Charge Coupled Device) or the like, though not restricted in particular. Also, in the case of using a CMOS sensor, an A/D converter equivalent to a later-described A/D converter 23 may be included in the structure as a device (part) equivalent to the image sensor 22.

Image signals output from the image sensor 22 are input to the A/D converter 23, and thus converted into digital signals and input a signal processing unit 24. The signal processing unit 24 inputs the digital imaging signals output from the A/D converter 23 in increments equivalent to single still images (frame images) for example, and subjects the input image signals in increments of still image to predetermined signal processing, thereby generating imaged image data (imaged still image data) which is image signal data equivalent to a single still image.

In the event of recording imaged image data generated at the signal processing unit 24 as image information in a memory card 40 which is a recording medium (recording medium device), imaged image data corresponding to a single still image for example is output from the signal processing unit 24 to an encoding/decoding unit 25. The encoding/decoding unit 25 subjects the imaged image data output from the signal processing unit 24 in increments of still images to compression encoding according to a predetermined still image compression encoding method, adds a header in accordance with control of the control unit 27 for example, and converts into an imaged image data format compressed according to the predetermined format. The imaged image data generated in this way is transferred to a media controller 26. The media controller 26 follows the control of the control unit 27 to write and record the imaged image data transferred thereto in the memory card 40. The memory card 40 in this case is a storage medium having an external shape of a card, in accordance with a predetermined standard for example, and having a non-volatile semiconductor storage device such as flash memory within. Note that storage media for storing image data is not restricted to the above memory card, and may be of other types, formats, and so forth.

Also, the signal processing unit 24 according to the present embodiment can use the imaged image data acquired as described above to execute image processing of subject detection. What the subject detection processing according to the present embodiment is will be described later.

Also, the digital still camera 1 can use the imaged image data obtained by the signal processing unit 24 and displays an image on the display unit 33, so as to display a so-called "through image", which is an image currently being imaged. For example, the signal processing unit 24 acquires the imaging signals output from the A/D converter 23 and generates imaged image data of one still image worth as described earlier, a process which is continuously performed, thereby sequentially generating imaged image data equivalent to frame images of the moving image. The imaged image data thus sequentially generated is transmitted to a display driver 32 under control of the control unit 27. Thus, a through image is displayed.

At the display driver 32, driving signals for driving the display unit 33 are generated based on the imaged image data input from the signal processing unit 24 as described above, and output to the display unit 33. Accordingly, images based on the imaged image data in increments of the sill images are sequentially displayed on the display unit 33. The user can thus dynamically view the images being imaged at that time on the display unit 33, i.e., a monitor image is displayed.

Also, the digital still camera 1 can play imaged image data recorded in the memory card 40 and display the image on the display unit 33. For this, the control unit 27 specifies the imaged image data and commands the media controller 26 to read out the data from the memory card 40. In response to this command, the media controller 26 accesses the address of the memory card 40 where the specified imaged image data is recorded and reads out the data, and transfers the data which has been read out to the encoding/decoding unit 25.

The encoding/decoding unit 25 extracts the actual data which is compressed still image data from the imaged image data transferred from the media controller 26, under control of the control unit 27 for example, executes decoding processing on the compression encoded data with regard to the compressed still image data, and obtains imaged image data corresponding to a single still image. The imaged image data is then transmitted to the display driver 32. Accordingly, the image of the imaged image data recorded in the memory card 40 is played by being displayed on the display unit 33.

Also, a user interface image can be displayed on the display unit 33 along with the above-described monitor image or played image of imaged image data. In this case, the display image data serving as an interface image is generated by the control unit 27 in accordance with the operating state at that time for example, and output to the display driver 32. Accordingly, a user interface image is displayed on the display unit 33. Note that the user interface image can be displayed on the display screen of the display unit 33 separately from the monitor image or played image of imaged image data, as with the case of a particular menu screen, for example, or may be displayed so as to be partially superimpose on or synthesized with a part of the monitor image or played image of imaged image data.

In actual practice, the control unit 27 includes a CPU (Central Processing Unit) for example, and along with ROM 28, RAM 29, and so forth, make up a microcomputer. The ROM 28 stores programs of the CPU serving as the control unit 27 to execute for example, and also various types of setting information or the like relating to the operations of the digital still camera 1. The RAM 29 is a main storage device for the CPU.

Also, flash memory 30 in this case is provided as a non-volatile storage region to be used for storing various types of setting information and so forth which are to be updated (rewritten) in accordance with user operations, operation history, and so forth, for example. Note that in the case of employing non-volatile memory such as flash memory or the like for the ROM 28, a partial storage region of the ROM 28 may be used instead of the flash memory 30.

The operating unit 31 encompasses various types of operating elements provided to the digital still camera 1, and operation information signal output parts for generating operation information signals in accordance with operations performed at the operating elements and outputting to the CPU. The control unit 27 executes predetermined processing in accordance with the operation information signals input from the operating unit 31. Thus, the digital still camera 1 executes operations in accordance with user operations.

A platform-compatible communication unit 34 is a portion for executing communication between the platform 10 side and the digital still camera 1 side following a predetermined communication format, and is made up of a physical layer configuration enabling cable or wireless communication signals to be exchanged between the digital still camera 1 and the platform 10 in a state where the digital still camera 1 is mounted to the platform 10, and an upper-layer configuration for realizing communication processing corresponding thereto.

Figure 28:
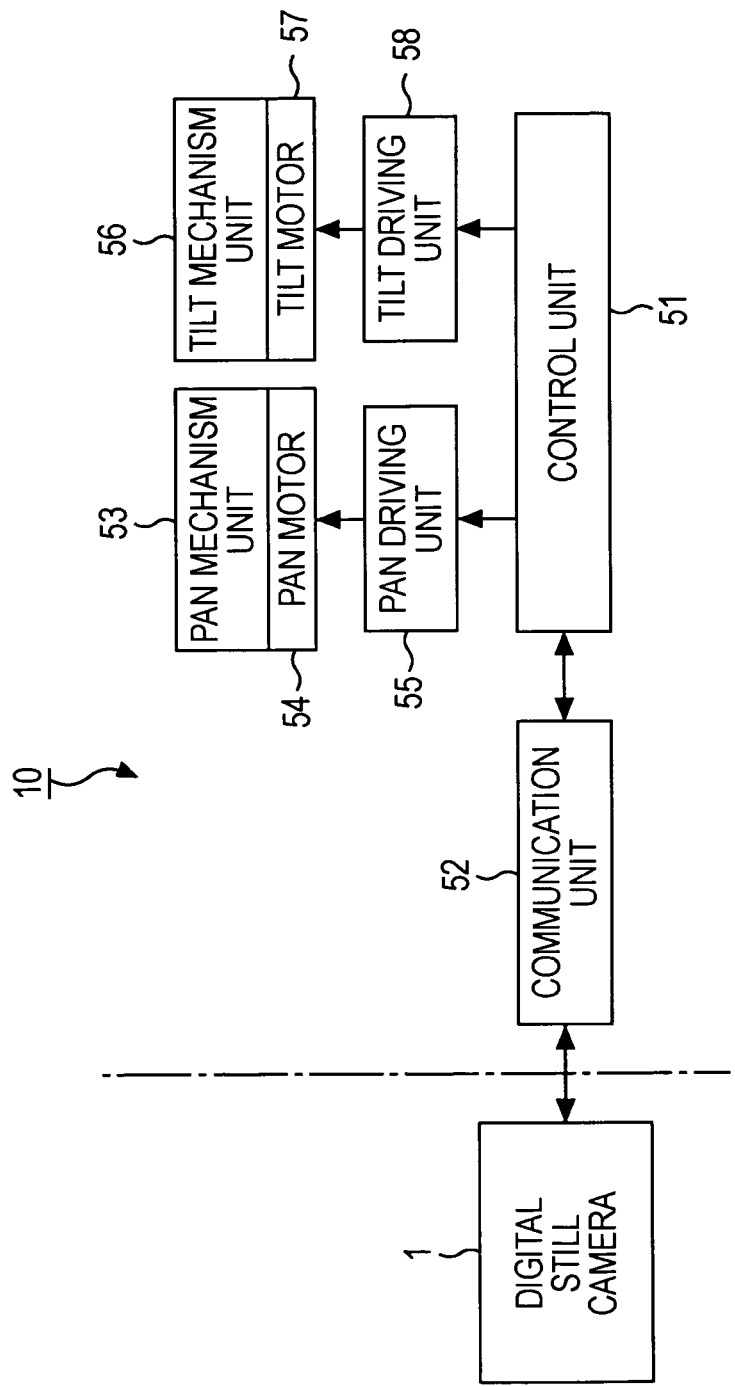
FIG. 28 is a block diagram illustrating an internal configuration example of the platform making up the imaging system according to an embodiment.

FIG. 28 is a block diagram illustrating a configuration of the platform 10. As described earlier, the platform 10 has a pan/tilt mechanism, to which a pan mechanism unit 53, pan motor 54, tilt mechanism unit 56, and tilt motor 57, correspond.

The pan mechanism unit 53 is of a configuration having a mechanism for providing the digital still camera 1 mounted to the platform 10 with movement in the panning (horizontal) direction shown in FIG. 17A, and the movement is obtained by rotating the pan motor 54 in the forward and reverse directions. In the same way, the tilt mechanism unit 56 is of a configuration having a mechanism for providing the digital still camera 1 mounted to the platform 10 with movement in the tilting (vertical) direction shown in FIG. 17B, and the movement is obtained by rotating the tilt motor 57 in the forward and reverse directions.

A control unit 51 is configured having a microcomputer formed of a combination of a CPU, ROM, RAM, and so forth, for example, and controls the movement of the pan mechanism unit 53 and tilt mechanism unit 56. At the time of the control unit 51 controlling the movement of the pan mechanism unit 53, control signals corresponding to the amount of movement and direction of movement for the pan mechanism unit 53 are output to the pan driving unit 55. The pan driving unit 55 generates motor driving signals corresponding to the input control signals, and outputs the generated motor driving signals to the pan motor 54. The motor driving signals cause the pan motor 54 to be rotated in a predetermined rotation direction at a predetermined rotation angle, and consequently, the pan mechanism unit 53 is also driving so as to be moved in the corresponding movement direction by the corresponding movement amount.

In the same way, at the time of the control unit 51 controlling the movement of the tilt mechanism unit 56, control signals corresponding to the amount of moment and direction of movement for the tilt mechanism unit 56 are output to the tilt driving unit 58. The tilt driving unit 58 generates motor driving signals corresponding to the input control signals, and outputs the generated motor driving signals to the tilt motor 57. The motor driving signals cause the tilt motor 57 to be rotated in a predetermined rotation direction at a predetermined rotation angle, and consequently, the tilt driving unit 56 is also driving so as to be moved in the corresponding movement direction by the corresponding movement amount.

A communication unit 52 is provided to perform communication with the platform-compatible communication unit 34 provided within the digital still camera 1 mounted to the platform 10, and in the same way as with the platform-compatible communication unit 34, is made up of a physical layer configuration enabling cable or wireless communication signals to be exchanged with the platform-compatible communication unit 34, and an upper-layer configuration for realizing communication processing corresponding thereto.

Now, the correlation between the configuration of the imaging system shown in FIG. 18 and the configuration of the digital still camera 1 and platform 10 shown in FIGS. 27 and 28 is as follows, for example. Note that the correlation described below should be understood to be only one straightforwardly conceived example, and other correlations can be conceived and employed.

The imaging block 61 of the digital still camera 1 in FIG. 18 corresponds to the portions of the optical system 21, image sensor 22, A/D converter 23, and signal processing unit 24 in FIG. 27, for example, up to the stage of obtaining imaged image data.

The composition determination block 62 in the digital still camera 1 in FIG. 18 corresponds to image signal processing functions corresponding to predetermined processing such as subject detection, still detection subject distinguishing, masking, and so forth, and the signal processing unit 24 in FIG. 27 for example, and relevant processing functions relating to composition determination which the control unit (CPU) 27 thereof executes.

The pan/tilt/zoom control block 63 of the digital still camera 1 in FIG. 18 corresponds to the processing functions which the control unit 27 in FIG. 27 for example executes for pan/tilt/zoom control.

The communication control processing block 64 of the digital still camera 1 in FIG. 18 corresponds to the platform-compatible communication unit 34 in FIG. 27 for example, and to the processing functions which the control unit 27 in FIG. 27 for example executes for communication using the platform-compatible communication unit 34.

The communication control block 71 of the platform 10 in FIG. 18 corresponds to the communication unit 52 in FIG. 28 for example, and to the processing which the control unit 51 executes for communication using the communication unit 52.

The pan/tilt control processing block 72 of the platform 10 in FIG. 18 corresponds to the execution functions for processing relating to pan/tilt control which the control unit 51 in FIG. 28 for example executes, and outputs signals to the pan driving unit 55 and tilt driving unit 58, for controlling movement of the pan mechanism unit 53 and tilt mechanism unit 56 in accordance with input control signals.

Now, with the basic composition determination configuration according to the present embodiment described with reference to FIGS. 14 and 15 (composition determination block 200), still detection processing is constantly running. Depending on how the composition determination according to the present embodiment is applied, there may be cases wherein there is no problem in having the still detection processing running at all times, or even indispensable in some applications.

However, with the imaging system exemplified here, a subject is searched while moving the pan/tilt mechanism of the platform 10, and if a subject is detected the composition determination according to the embodiment is executed, composition matching is performed by pan/tilt/zoom control in accordance with the determination results, and image recording is performed.

However, with the case of this imaging system, the digital still camera 1 performs panning, tilting, and further zooming, on a fixed platform 10, wherein the imaging direction and imaging view angle change. Accordingly, the range which can be searched for subjects is decided depending on the placement of the imaging system at that time. In the event that an unreal subject such as a face in a poster or the like exists within the range which can be searched for subjects, each time this unreal subject is detected as an individual subject, it has to be subjected for processing for elimination due to being a still object by still detection processing.

In this case, an unreal subject exists at a fixed position around the imaging system, and in this point, the position thereof is not indeterminate. An arrangement wherein still detection processing has to be performed each time the unreal subject is detected as a detected individual subject to eliminate it as an unreal subject, even though the position thereof is a fixed position, is not efficient. Accordingly, with the present embodiment, in addition to the above-described composition determination, a configuration is made with a function such that subjects once determined to be unreal subjects can be eliminated from being an object individual subject, without having to perform processing again equivalent to determination whether or not the subject is an unreal subject using still detection processing (redundant detection avoidance function). This point will be described now.

Figure 29A:
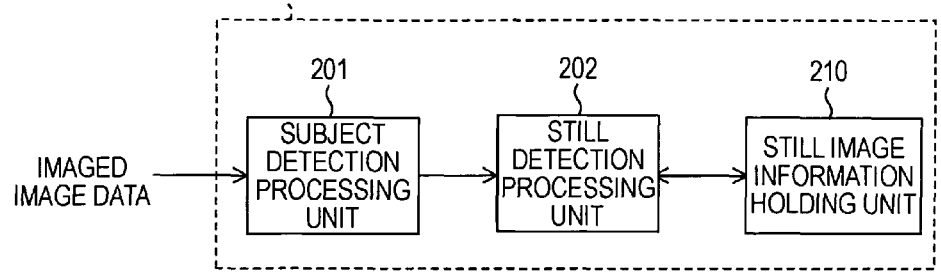
FIGS. 29A and 29B are block diagrams illustrating a configuration example of a composition determination block having a duplicate detection avoidance function, which can be applied to the imaging system (digital still camera) according to an embodiment.
Figure 29B:
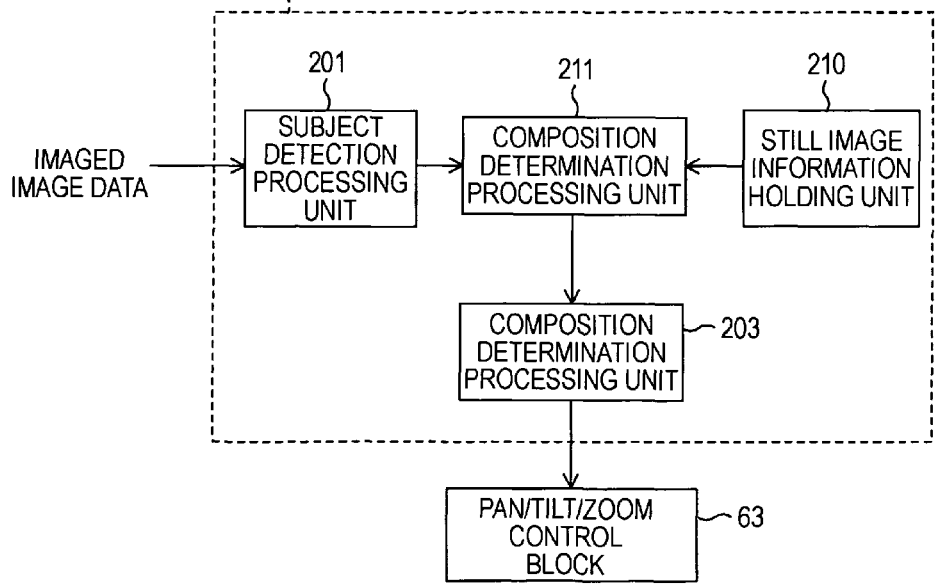

FIGS. 29A and 29B illustrate a configuration example of the composition determination block 62 to which the aforementioned redundant detection avoidance function has been provided. Note that the composition determination block 62 in FIGS. 29A and 29B is based on the fourth example shown in FIG. 7, with the redundant detection avoidance function provided thereto, as will become clear from the following description.

FIG. 29A illustrates a configuration corresponding to still detection processing in an extracted form, as the composition determination block 62. At the time of still detection processing, first the subject detection processing unit 201 inputs the imaged image data and performs subject detection processing in the same way as with the case in FIG. 7, with detected subject information made up of detected individual subject information for each detected individual subject being output to the still detection processing unit 202.

The still detection processing unit 202 executes still detection for each detected individual subject based on the detected subject information, and obtains still subject information which is the detection result thereof. In this case, the still subject information obtained in this way is saved in a still subject information holding unit 210. Note that the still subject information holding unit 210 is a region set in the RAM 29 connected to the control unit 27 for holding still subject information, for example. Thus, detected individual subject information regarding still subjects, i.e., unreal subjects, is held in the still subject information holding unit 210.

Thereupon, when performing still subject detection, the still detection processing unit 202 shown in FIG. 29A compares the detected individual subject information of still subjects held in the still subject information holding unit 210 at that time with detected individual subject information making up the detected subject information input from the subject detection processing unit 201, and eliminates individual subjects detected by the subject detection processing unit 201 (detected individual subject information) that is already held in the still subject information holding unit 210 from being an object of still detection, and performs still detection regarding only the subjects not held in the still subject information holding unit 210. Thus, in the still detection processing, due to the still detection processing unit 202 first performing still detection processing using detected individual subject information held in the still subject information holding unit 210, still detection does not have to be performed again regarding detected individual subjects which have been already detected as being a still subject at one point. Accordingly, a duplicate detection avoidance function is realized.

In order to correctly perform subject distinguishing processing by the detected individual subject information which is the detection result of the subject detection processing unit 201, and the detected individual subject information hold in the still subject information holding unit 210, information included in the detected individual subject information which the subject detection processing unit 201 generates has to include, regarding the detected individual subject information obtained each time the same still subject is detected, information which is unique and unchanging for at least that still subject. The reason is that determining whether or not a subject matches such information unchanged for a still subject, as an object of comparison, enables subject distinguishing.

One example of such an object of comparison is position information of the still subject. However, since with the imaging system according to the present embodiment, the imaging view angle fitting into the image frame changes according to panning/tilting/zooming performed, so simply taking the position information as indicating the position of a still subject in an imaged image will result in change of the positional state due to panning/tilting/zooming. Accordingly, information which can indicate absolute position of the still subject in the state in which the imaging system is set (absolute position information) is used as the position information to serve as an object of comparison. An example of a technique for obtaining absolute position information will be described later.

FIG. 29B illustrates a configuration corresponding to composition determination processing including subject distinguishing in an extracted form, as the same composition determination block 62. This configuration is made up of the subject detection processing unit 201, composition determination processing unit 203, still subject information holding unit 210, and a subject distinguishing processing unit 211. Also, with this drawing, the pan/tilt/zoom control block 63 is shown along with the composition determination block 62 for the purpose of description.

The subject detection processing unit 201 here is the same as with FIG. 29A, and performs subject detection processing and outputs detected subject information.

The detected subject information is input to the subject distinguishing processing unit 211. The subject distinguishing processing unit 211 basically executes processing for subject distinguishing using a detection algorithm similar to that in the case of FIG. 7, but in this case, the subject distinguishing processing unit 211 dies not directly use the detection results from the still detection processing unit 202 (detected individual subject information of still subjects) at the time of distinguishing processing, but rather uses detected individual subject information of still subjects held in the still subject information holding unit 210, as described below.

The still subject information holding unit 210 in FIG. 29B is the same as that shown in FIG. 29A. Thus, the still subject information holding unit 210 holds the detected individual subject information of still subjects detected by the still detection processing performed by the still detection processing unit 202 so far. Accordingly, the subject distinguishing processing unit 211 inputs and uses detected individual subject information of still subject held in the still subject information holding unit 210 at the time of executing subject distinguishing processing with the detection algorithm as with the case in FIG. 7.

For example, the detected individual subject information of still subjects from the still detection processing unit 202 is information regarding still objects obtained in real-time in the imaged image data at that time. Accordingly, in the case of directly using the detected individual subject information of still subjects from the still detection processing unit 202 to perform subject distinguishing processing, even subjects which have been distinguished as being unreal subjects once are subsequently detected as still subjects (unreal subjects) by still detection processing when the subject is detected again, as described earlier.

Conversely, the detected individual subject information of still subjects that is held in the still subject information holding unit 210 is information regarding subjects which have been detected as being still subjects so far. Due to the subject distinguishing processing unit 211 in FIG. 29B performing subject distinguishing processing with this detected individual subject information of still subjects, all subjects which have been detected as being still subjects so far up to the current timing are eliminated as being unreal subjects, and only the remaining subjects are distinguished as being real subjects. That is to say, those having been detected as being a still subject in the past are distinguished as being eliminated, resulting in only real subjects of the currently detected subjects being distinguished.

The composition determination processing unit 203 in FIG. 29B executes composition determination processing based on the detected individual subject information for each distinguished individual subject output from the subject distinguishing processing unit 211 in the same way as with the case in FIG. 7, and outputs information of the determination results thereof. The pan/tilt/zoom control block 63 then executes pan/tilt/zoom control (composition control) for obtaining the imaging view angle yielding the composition of the imaged image indicated by the composition determination result from the composition determination block 62 (composition determination processing unit 203) in the same way as with FIG. 18.

It was mentioned earlier that the configuration in FIGS. 29A and 29B is based on the fourth example shown in FIG. 7. If we view the still detection processing unit 202 and still subject information holding unit 210 in FIGS. 29A and 29B as being the still detection processing unit 202 in FIG. 7, the configuration in FIGS. 29A and 29B corresponds to the fourth example shown in FIG. 7.

Also, while the still detection processing and the subject distinguishing/composition determination processing are shown separated between FIGS. 29A and 29B as the composition determination block 62, this is to show that the still detection processing and the subject distinguishing/composition determination processing can be performed independently at the composition determination block 62. Accordingly, the configuration of FIGS. 29A and 29B can be shown as one. In this case, the configuration in FIG. 29B is provided with the still detection processing unit 202, so as to divide the input from the subject detection processing unit 201 to the subject distinguishing processing unit 211 and the still detection processing unit 202. Also, the still detection processing unit 202 is connected so as to be capable of accessing the still subject information holding unit 210 and reading/writing still subject information (individual subject information of still subjects).

The flowchart shown in FIG. 30 illustrates an example of the procedures of still detection processing executed by the configuration shown in FIG. 29A.

First, in step S701, the subject detection processing unit 201 inputs the imaged image data, and in step S702 executes subject detection processing.

The subject detection processing unit 201 is arranged to make determination in step S703 regarding whether or not at least one individual image has been detected as the result of detection processing in step S702, and in the event that a negative determination result is obtained to the effect that not even one individual subject has been obtained, the flow returns to step S701, thereby repeating imaged image data acquisition and subject detection processing.

In the event that a positive determination result is obtained in step S703 to the effect that an individual subject has been obtained, the flow proceeds to step S704. The procedures from step S704 on are performed by the still detection processing unit 202. In step S704, initialization is performed for substituting "1" into a variable n indicating a number to be assigned to the individual subject detected in step S702 the final time the loop is repeated. Note that the maximum value of the variable n is the number of individual subjects detected in step S702 the final time the loop is repeated (number of information of detected individual subjects).

In step S705, setting processing is performed for setting the n'th individual subject (detected individual subject) as an object of detection processing. In step S706 the detected individual subject information of the still subjects held in the still subject information holding unit 210 is read in. In step S707, determination is made regarding whether or not detected individual subject information indicating a subject matching the detected individual subject information of the n'th individual subject exists in the detected individual subject of still subjects read in step S706.

In the event that a negative result is obtained in step S707, this means that this n'th individual subject has at least not been detected as a still subject up to now. At this state, no determination is made regarding whether the n'th individual subject is a still subject (unreal subject) or a real subject. In step S708, the still detection processing unit 202 executes still detection processing with the n'th individual subject as the object, based on the detected individual subject information corresponding to the n'th individual subject output from the subject detection processing unit 201.

In step S709, determination is made regarding whether or not a detection result of a still state has been obtained as the detection result in step S708. In the event that a negative result is obtained here, this means that the n'th individual subject is not a still object but a real subject, and the processing skips step S710 and advances to step S711.

On the other hand, in the event that a positive determination result is obtained in step S709, this means that the n'th subject is a still subject detected for the first time. In this case, the flow proceeds to step S710, and detected individual subject information of this n'th subject is written and held in the still subject information holding unit 210. Thus, one still image has been newly registered in the still subject information holding unit 210.

In the event that a positive determination result is obtained in step S707, this means that the n'th individual subject is a still image which has been already registered in the still subject information holding unit 210. In this case, the procedures of steps S708 through S710 are skipped and the flow proceeds to step S711.

In step S711, determination is made regarding whether the current variable n is at or above the maximum value, and in the event that a negative result is obtained here, the variable is incremented in step S712 following which the flow reruns to step S705, thereby repeating the processing with the next individual subject (detected individual subject) as the object of still detection.

In the event that a positive detection result is obtained in step S711 that still detection processing has been performed on all detected individual subjects, the flow returns to step S701.

Figure 31:
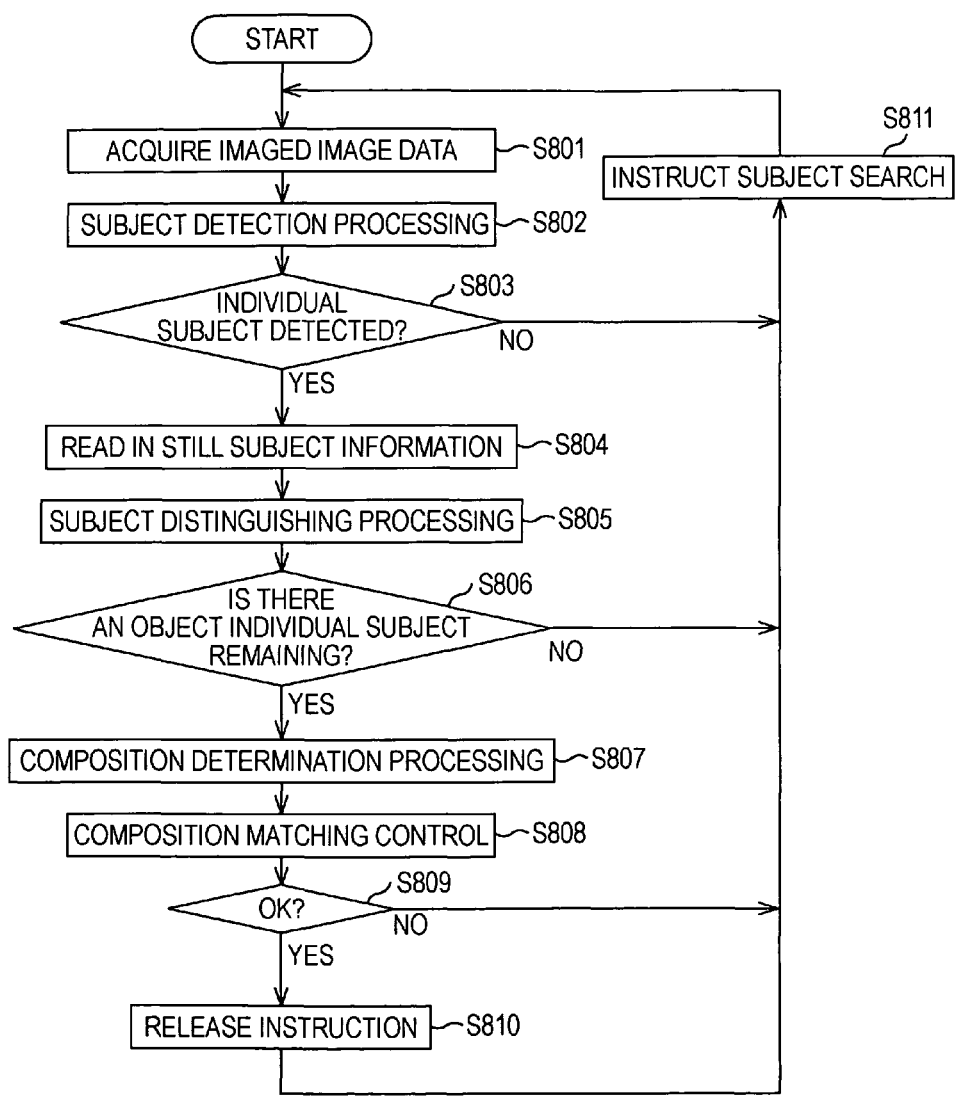
FIG. 31 is a flowchart illustrating an example of processing procedures for subject distinguishing and composition determination with the composition determination block shown in FIG. 29.

The flowchart in FIG. 31 illustrates an example of procedures for still detection processing executed by the configuration shown in FIG. 29B. In FIG. 29B, first, in steps S801 through S803 the subject detection processing unit 201 inputs imaged image data, performs subject detection processing, and determines whether or not individual subjects are detected, in the same way as with steps S701 through S703 in FIG. 30.

In the event that a negative result is obtained in step S803, the flow returns to step S801, but in this case, the subject detection processing unit 201 returns to step S801 after having instructed pan/tilt/zoom control in step S811. That is to say, the procedures of steps S801 through S803 in this case execute subject detection as a subject search. In the event that a positive detection result has been obtained in step S803 that at least one individual subject has been detected, the flow proceeds to the procedures of step S804 on.

Steps S804 and S805 are processing executed by the subject distinguishing processing unit 211, for example. In step S804, still subject information is read in from the still subject information holding unit 210. In step S805, subject distinguishing processing is executed using the detected individual subject information for each still image making up the still subject information, and the detected individual subject information making up the detected subject information from the subject detection processing unit 201. As described earlier with reference to FIG. 29B, all individual subjects detected by the subject detection processing unit 201 which have already been detected as being still subjects are eliminated in the subject distinguishing processing executed here.

Step S806 is executed by the composition determination processing unit 203, for example. In step S806, determination is made regarding whether or not there are any object individual subjects, i.e., real subjects, remaining of the individual subjects detected by the subject detection processing unit 201 this time. The composition determination processing unit 203 reads in detected individual subject information of detected individual subjects distinguished by the distinguishing processing in step S805, and if the result thereof is that there is no valid detected individual subject information existing, this means that there is no object individual subject (real subject) remaining. On the other hand, if there is valid detected individual subject information existing, this means that there is an object individual subject remaining. Now, in the event that a negative result is obtained that no object individual subject is remaining, the flow returns to step S801 after having instructed pan/tilt/zoom control in step S811. On the other hand, in the event that a positive determination result is obtained in step S806, the flow proceeds to step S807.

In step S807, composition determination processing is executed based on the detected individual subject information of the object individual subjects which the composition determination processing unit 203 has input from the subject distinguishing processing unit 211, and the determination result thereof is transmitted to the pan/tilt/zoom control block 63.

Step S808 is processing executed by the pan/tilt/zoom control block 63. That is to say, the pan/tilt/zoom control block 63 executes pan/tilt/zoom control for enabling an imaging view field in accordance with the composition determination result to be obtained, i.e., for composition matching.

After the composition matching processing in step S808 is started, determination is made in step S809 regarding whether or not the composition actually obtained as the image of the imaged image data at that time can be considered to be in a state which is the same as the composition determined in step S807 (e.g., whether at a certain level of similarity or higher, i.e., whether the composition is OK or not). Note that this determination can be realized by detecting chance in position information of the detected individual subject information of object individual subjects obtained following outputting the composition determination result at the composition determination processing unit 203, for example.

Now, in the event that due to one reason or another, the composition is not OK despite have performed sufficient pan/tilt/zoom moving and driving, a negative determination result is output in step S809. In this case, the flow returns to step S801 via step S811, thereby resuming subject searching.

Conversely, in the event that a determination result is obtained in step S809 that the composition is OK, a release operation, i.e., execution of an operation for recording the imaged image data obtained at that time as a still image, is instructed in step S810. This release instruction can also be understood as being executed by the composition determination processing unit 203 here, for example.

Now, with the imaging system according to the present embodiment, there is a possibility that the user might move the platform 10 and digital still camera 1 together during user to a different position. Also, description has been made above that in the configuration wherein the still subject information (detected individual subject information of still subjects) held in the still subject information holding unit 210 is used for the still detection processing and subject distinguishing processing as described above, the position information for individual subject information is absolute position information based on the placement position of the digital still camera 1 at that time.

Giving thought to the above, at the point that the position of the digital still camera 1 is moved along with the platform 10, the absolute position information of the still subject information (individual subject information of still subjects) held in the still subject information holding unit 210 is erroneous, so usage of this absolute position information thereafter has to be avoided. A conceivable arrangement to deal with this is for the user to perform a certain operation at the digital still camera 1 or platform 10 after moving and repositioning the digital still camera 1 and platform 10 for example, thereby clearing the still subject information which the still subject information holding unit 210 had held so far, and start registration processing of still subjects to the still subject information holding unit 210, a process that would involve still detection.

A further development of this idea would be to arrange for still subject information in the still subject information holding unit 210 to be automatically cleared in accordance with the digital still camera 1 and platform 10 having been moved, since doing away with the user having to perform this operation would increase handiness for the user.

Figure 32:
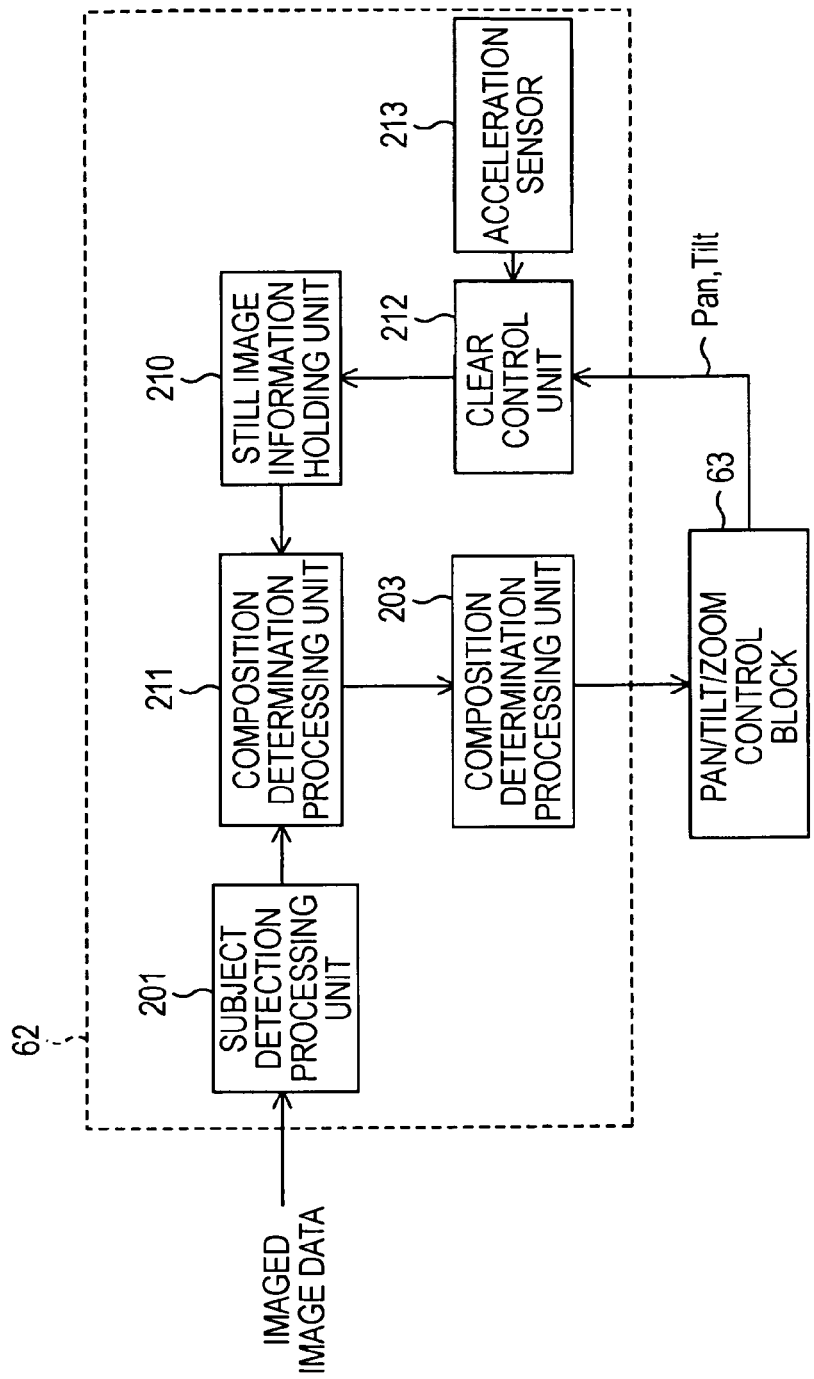
FIG. 32 is a block diagram illustrating a configuration example of a composition determination block having a duplicate detection avoidance function and a still subject information clearing function, which can be applied to the imaging system (digital still camera) according to an embodiment.

FIG. 32 illustrates a configuration for automatically clearing still subject information in the still subject information holding unit 210. In FIG. 32, an arrangement is shown wherein a configuration for automatically clearing the still subject information has been added to the composition determination block 62 based on the configuration shown in FIGS. 29A and 29B, taking into consideration the flow of description so far. Components which are the same as those in FIG. 29B are denoted with the same reference numerals, and description thereof will be omitted. The configuration for still detection in this case may be the same as with that shown in FIG. 29A.

In FIG. 32, the configuration in FIGS. 29A and 29B is further provided with a clear control unit 212 and an acceleration sensor 213. The acceleration sensor 213 in actual practice is fixedly attached to a predetermined position on the digital still camera 1, and detects acceleration applied to itself, i.e., motion due to force applied to the digital still camera 1 itself. The clear control unit 212 executes processing for clearing the still subject information held in the still subject information holding unit 210, based on the pan/tilt control signals output from the pan/tilt/zoom control block 63 and acceleration values detected from the acceleration sensor 213.

Figure 33:
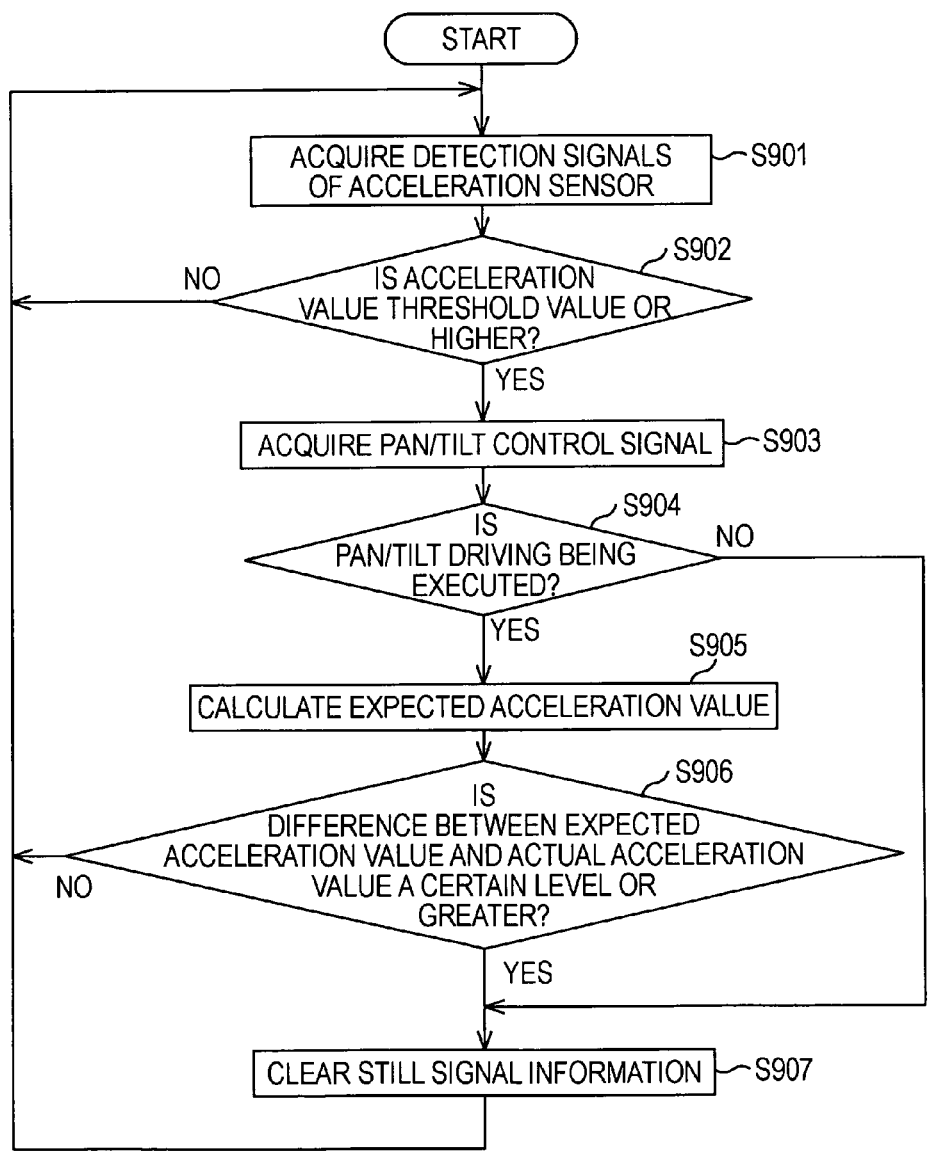
FIG. 33 is a flowchart illustrating an example of processing procedures executed upon execution of a portion corresponding to the still subject information clearing function shown in FIG. 32.

The flowchart in FIG. 33 illustrates an example of processing procedures which the clear control unit 212 shown in FIG. 32 executes. First, in step s901, the clear control unit 212 inputs detection signals which are being output form the acceleration sensor 213, and in step S902 determines whether or not the acceleration value indicated by the input detecting signals is at or above a predetermined threshold value. The threshold value set for this step S902 is set based on a general and average acceleration value detected by the acceleration sensor 213 when a person moves the digital still camera 1, for example. That is to say, step S901 is for determining whether or not the state of the digital still camera 1 at that time is movement of a level of a person holding and moving it.

In the event that a negative result is obtained in step S902, this can be viewed that the digital still camera 1 is in a motionless state, including movement in the pan/tilt directions as well. In this case, the flow returns to step S901.

In the other hand, in the event that a positive result is obtained in step S902, the flow proceeds to step S903 and subsequent steps.

In step S903, processing is executed to input pan/tilt control signals from the pan/tilt/zoom control block 63, and in step S904, determination is made regarding whether or not pan/tilt driving is currently being performed, i.e., whether or not the platform 10 is driving in the pan direction and/or tilt direction. For example, in the event that no valid pan/tilt control signals were input in step S903, this means that the pan/tilt/zoom control block 63 is not performing pan/tilt control, and accordingly the digital still camera 1 is not being moved due to the platform 10, so the determination results in step S904 would be negative. On the other hand, in the event that valid pan/tilt control signals are input in step S903, this means that the pan/tilt/zoom control block 63 is performing pan/tilt control, and the digital still camera 1 is being moved due to the platform 10, so the determination results in step S904 are positive.

In the event that negative determination results are obtained in step S904, the flow skips steps S905 and S906 and proceeds to step S907, but in the event that positive determination results are obtained in step S904, the processing of steps S905 and S906 is performed.

At the stage of step S905, we know that the digital still camera 1 is being panned and/or tilted by the platform 10, but we do not know whether or not the digital still camera 1 and platform 10 are being moved by a person while panning/tilting. Steps S905 and S906 are for this determination.

To this end, in step S905, an anticipated acceleration value is calculated. This anticipated acceleration value is an acceleration value which is estimated and expected to be obtained when the platform 10 on which the digital still camera 1 is mounted is not moved by a person but is sitting still at its position, and in this state is undergoing panning/tilting. This anticipated acceleration value can be obtained by performing computation using the amount of movement the pan/tilt control signals obtained in step S903, and a predetermined function with the movement speed of panning/tilting as a parameter. The acceleration value obtained by the amount of movement indicated by the pan/tilt control signals and the acceleration value detected by the acceleration sensor 123 in correspondence with the movement speed of panning/tilting can be viewed as being approximately accurate. Note that the movement speed of panning/tilting can be singularly obtained based on the structure of the pan mechanism unit and tilt mechanism unit used in the platform 10, the voltage and current for driving the motors of the mechanisms, and so forth.

In step S906, the anticipated acceleration value calculated in step S905 and the actual acceleration value which the detection signals input in step S901 earlier are compared, and determination is made regarding whether the difference between the two is at or above a certain level. Note that an arrangement may be made wherein not the difference between the anticipated acceleration value and actual acceleration value, but rather the ratio of the anticipated acceleration value to the actual acceleration value is obtained, with determination being made regarding whether this ratio is at or above a certain level.

In the event that a negative determination result is obtained in step S906, this means that the platform 10 is not being moved by a person but is sitting still, and in this state is undergoing panning/tilting. In this case, the flow returns directly to step S901. On the other hand, in the event that a positive determination result is obtained in step S906, this means that the platform 10 is undergoing panning/tilting, and also is being moved by a person. In this case, the flow proceeds to step S907. Thus, with the present embodiment, whether or not the platform 10 and the digital still camera 1 fixed thereto are being moved by a force other than the pan/tilt mechanism (movable mechanism units) of the platform 10 can be determined in an accurate manner, even if panning/tilting operations are being performed.

As can be understood from the description so far, a case wherein step S907 is reached is a state wherein the platform 10 and the digital still camera 1 fixed thereto are being moved by a person, regardless of whether or not the platform 10 is undergoing panning/tilting. In step S907, processing is executing for clearing the still subject information held in the still subject information holding unit 210.

Note that description has been made above regarding an arrangement appropriate for the imaging system according to the present embodiment made up of the digital still camera 1 and the platform 10, but the configuration for automatically clearing the still subject information held in the still subject information holding unit 210 is not restricted to the above particular arrangement, and may be applied to devices and systems other than the imaging system according to the present embodiment as suitable.

Figure 34:
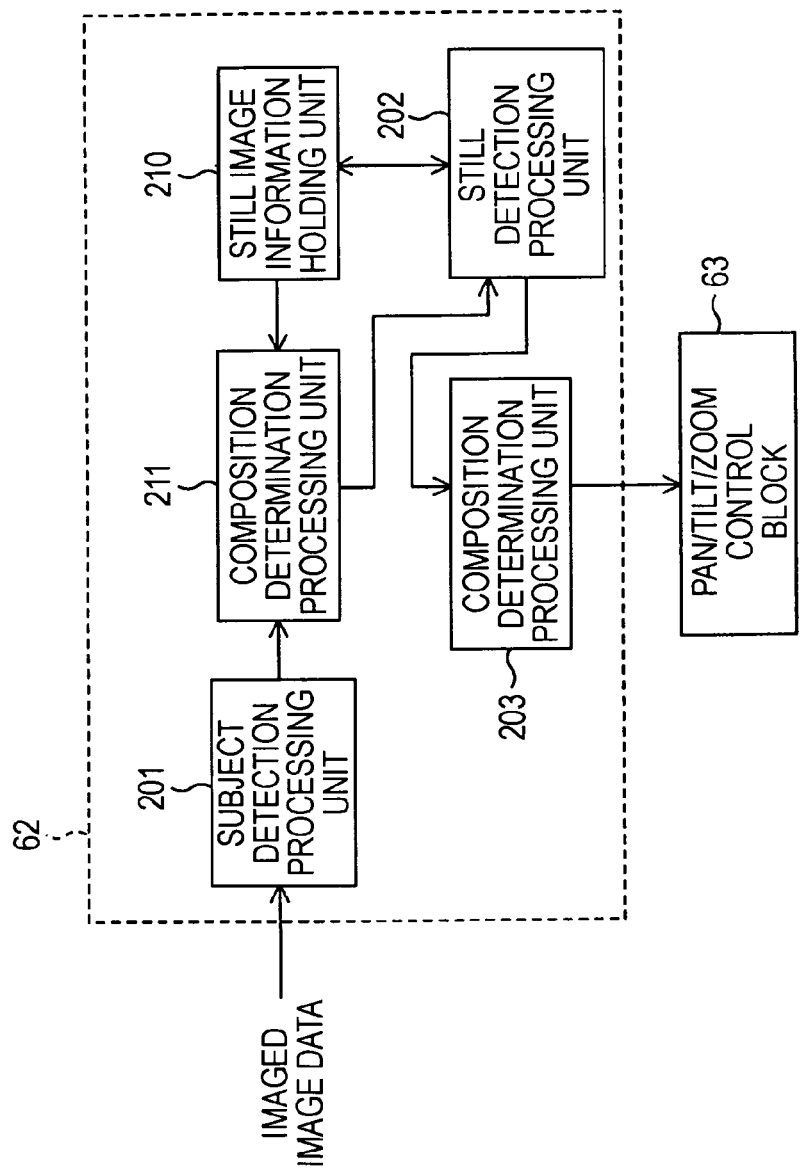
FIG. 34 is a block diagram illustrating another configuration example of a composition determination block having a duplicate detection avoidance function, which can be applied to the imaging system (digital still camera) according to an embodiment.

Also, in the case of a configuration wherein the subject distinguishing unit 211 performs subject distinguishing based on the still subject information held in the still subject information holding unit 210, the composition determination block 62 may assume the configuration shown in FIG. 34, besides those shown in FIG. 29 (and FIG. 32). Note that in FIG. 34, components which are the same as those in FIG. 29 are denoted with the same reference numerals and description thereof will be omitted. Also, the configuration for automatically clearing the still subject information held in the still subject information holding unit 210 is omitted here, as a configuration according to that described with reference to FIGS. 32 and 33 can be applied.

The configuration shown in FIG. 34 is such that the still detection processing unit 202 is inserted between the subject distinguishing unit 211 and the composition determination processing unit 203. Also, the still detection processing unit 202 can access the still subject information holding unit 210. The still detection processing unit 202 here performs still detection processing, which can also be viewed as subject distinguishing processing, as will be understood from the following description.

The flowchart shown in FIG. 35 illustrates an example of procedures of processing executed by the composition determination block 62 (and pan/tilt/zoom control block 63) of the configuration shown in FIG. 34.

First, in steps S1001 and S1002, the subject detection processing unit 201 inputs imaged image data and performs subject detection processing, in the same way as with steps S801 and S802 in FIG. 31.

The following steps S1003 through S1005 are executed by the subject distinguishing unit 211. The subject distinguishing unit 211 reads in the still subject information currently held in the still subject information holding unit 210 in step S1003. Next, in step S1004, subject distinguishing processing the same as that in step S805 in FIG. 31 is performed, using the detected individual subject information making up the detected subject information input from the subject detection processing unit 201 and the individual subject information making up the still subject information that has been read in.

Also, in step S1005, the composition determination processing unit 203 performs determination regarding whether or not there are distinguished individual subjects remaining, as its own subject distinguishing processing results. In the event that a negatives determination result is obtained here, in step S1018 pan/tilt/zoom control is instructed for subject searching, and the flow returns to step S1001. The subject searching instruction in step S1018 may also be configured to be performed by the subject distinguishing unit 211 as well.

On the other hand, in the event that a positive result is obtained in step S1005, the flow proceeds to step S1006 and subsequent steps.

Note that in this case, the detected subject information which the subject distinguishing unit 211 inputs from the subject detection processing unit 201 for subject distinguishing processing in step S1004, is the last subject distinguishing processing which the subject detection processing unit 201 has executed, for example. On the other hand, the still subject information held in the still subject information holding unit 210 has been obtained by the last still detection processing executed at a timing earlier than the above last subject selection processing, and still detection processing performed earlier yet. Such offset in processing timing between this subject selection processing and still detection processing occurs due to the still detection processing unit 202 in this case performing still subject detection on the distinguished detected individual subject information obtained as the subject distinguishing processing results of the subject distinguishing unit 211, as can be understood from the description above.

Accordingly, as for the individual subjects distinguished by the subject distinguishing processing which the subject distinguishing unit 211 has distinguished in this case, still subjects detected in still detection processing performed at a timing earlier than the subject detection processing for obtaining the detected individual subject information input for subject distinguishing processing this time (i.e., still subjects registered in the still subject information holding unit 210) have been eliminated, but unreal subjects which first appeared in the imaged image data which was last subjected to subject detection processing and have yet to be registered in the still subject information holding unit 210 may remain distinguished without being eliminated.

Accordingly, as described next, the still subject information holding unit 210 executes detection of still subjects and corresponding registration processing to the still subject information holding unit 210, and also eliminates again unreal subjects remaining not eliminated at the stage of passing through the subject distinguishing unit 211, using the still subject detection results.

The processing which the still detection processing unit 202 executes where is steps S1006 through S1012.

First, in step S1006, initialization is performed for substituting "1" into a variable n which is a number of assign to individual subjects (real subject candidates) distinguished at the subject distinguishing unit 211.

Next, in step S1007, still detection processing is performed regarding the n'th individual subject. At this time, the still detection processing is performed such that change is detected in the detected individual subject information regarding the n'th individual subject input from the subject distinguishing unit 211 (e.g., change in absolute position information) within a predetermined detection period for example, and detection is made regarding whether or not the n'th individual subject is a still subject, based on the amount of change.

In step S1008, whether or not the n'th individual subject has been detected as a still subject, as the results of still detection processing in step S1007, is determined. In the event that a positive determination result is obtained in step S1008, the flow proceeds to step S1009, the detected individual subject information corresponding to the n'th individual subject is registered in the still subject information holding unit 210, and the flow proceeds to step S1011.

On the other hand, in the event that a negative determination result is obtained in step S1008, the flow proceeds to step S1010, the n'th individual subject is set as an object individual subject for later composition determination processing, and the flow proceeds to step S1011.

In step S1011, determination is made regarding whether the current variable n is at or above the maximum value, and as long as a negative determination result is obtained, the variable n is incremented in step S1012 since there are individual subjects yet remaining to be taken as object of still detection processing, and the flow returns to step S1007.

Conversely, in the event that a positive determination result is obtained in step S1011, this means that still detection processing has been completed regarding all individual subjects to be the object of still detection processing, so the flow proceeds to the following step S1013 and on.

Step S1013 can be viewed as being executed by the composition determination processing unit 203, for example.

At the state that a positive determination result has been obtained in step S1011, the detected individual subject information for the individual subject set as an object individual subject is in a state of having been input to the composition determination processing unit 203 due to the procedures up to step S1010 having been performed. Accordingly, in step S1013, the composition determination processing unit 203 determines whether or not an object individual subject exists, from the state of input of detected individual subject information. If the composition determination processing unit 203 has not input a single valid detected individual subject information as an object individual subject at this time, a negative determination result is obtained in step S1013, and if the composition determination processing unit 203 has input even one at this time, a positive determination result is obtained.

In the event that a negative determination result is obtained in step S1013, there is no composition determination processing to be performed. Accordingly, in this case, subject searching is instructed in step S1018, following which the flow returns to step S1001. This step S1018 can be viewed as being executed by the composition determination processing unit 203, for example.

On the other hand, in the event that a positive determination result is obtained in step S1013, the procedures for step S1014 and on are executed. Steps S1014 through S1017 are the same as with the steps S807 through S810 in FIG. 31. That is to say, the composition determination processing unit 203 executes composition determination processing based on the detected individual subject information for the object individual subject, and pan/tilt/zoom control is performed for composition matching with the pan/tilt/zoom control block 63. In the event that the composition has been determined to be OK as a result of the imaging view field having been changed by this pan/tilt/zoom control, the release operation is instructed, and still image data is extracted from the imaged image data at that time and recorded.

Now, as described earlier, with the present embodiment, in order to enable subject distinguishing processing to be accurately performed using the still subject information held in the still subject information holding unit 210, with the present embodiment, position information indicating the position of the individual subject in the detected individual subject information is absolute position information. Several examples of techniques for obtaining such absolute position information will be discussed next.

Figure 36A:
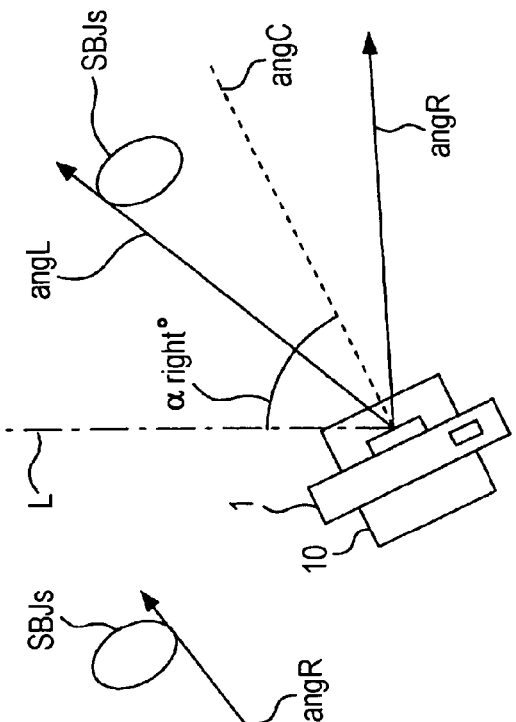
FIGS. 36A through 36C are diagrams for describing an example of a technique for obtaining absolute position information of a subject.

FIG. 36A is a planar view of the platform 10 and the digital still camera 1 attached thereto. Also, in this drawing, the digital still camera 1 is situated at a position set as a reference within the movable range in the panning direction (horizontal direction) by the pan mechanism unit 53 of the platform 10. This reference position is an intermediate position within the movable range, for example. A reference line L is a line which matches and is parallel with the optical axis (imaging light axis) of the lens unit 3 (optical system 21) of the digital still camera 1 when the digital still camera 1 is at the reference position in this panning direction.

Also, the field angle (zoom angle) that is set here is expressed by field angle center angC, field angle left angL, and field angle right angR. Note that the field angle center angC agrees with the imaging light axis of the digital still camera 1, and the angle from the field angle center angC to the field angle left angL, and the angle from the field angle center angC to the field angle right angR, are the same angle.

Note that the field angle set here is the field angle set at the time of performing subject searching operations. At the time of subject searching, a certain field angle which is somewhat wide is set so that subjects can be searched (detected) as efficiently as possible.

Also, let us say that a single subject SBJs exists around where the digital still camera 1 and platform 10 exist, so as to be toward the right from the digital still camera 1 in the drawing.

Figure 36B:
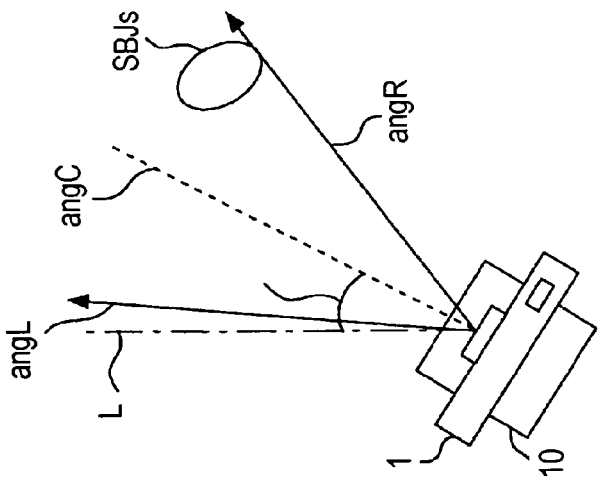

Let us say that the digital still camera 1 is panned in the clockwise direction in the drawing from the state shown in FIG. 36A to search for subjects. As a result, a state is realized wherein the subject SBJs comes to be within the limit position within a field angle corresponding to the field angle right angR, as shown in FIG. 36B. The pan angle at this time, i.e., the angle between the reference line L to the imaging light axis (field angle center angC) is expressed as αleft°. In the imaged image actually obtained at this time, the subject SBJs is at the far right of the image frame.

Figure 36C:
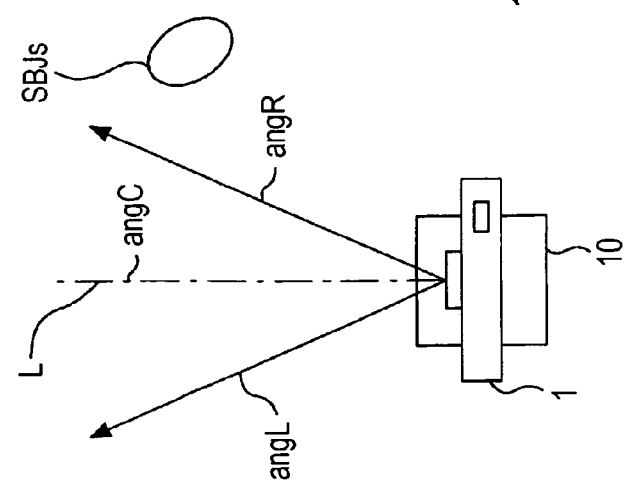

Also, if we say that the digital still camera 1 is further panned to the right in the clockwise direction in the drawing from the state shown in FIG. 36B, a state is realized wherein the subject SBJs comes to be at the limit position within a field angle corresponding to the field angle left angL, as shown in FIG. 36C. The pan angle at this time, is expressed as αright°. In the imaged image actually obtained at this time, the subject SBJs is at the far left of the image frame.

Such a situation is bound to naturally occur when searching for subjects, and based on this, the following can be conceived as a technique for obtaining absolute position information.

For example, still detection is executed at the timing that the subject SBJs first appears in the image frame of the imaged image for the first time and this is detected as being a subject, as indicated by the transition from FIG. 36A to FIG. 36B, and determination is made regarding whether or not the subject SBJs is a still subject based on the still detection results. Here, we will say that the subject SBJs is an unreal subject, and accordingly will be determined as being a still subject. Upon determination being thus made as a still subject, the αleft°, which is where the subject SBJs has first appeared in the image frame, is included in the detected individual subject information regarding the subject SBJs. This detected individual subject is registered in the still subject information holding unit 210. Thereafter, in the subject distinguishing processing, an individual subject first entering the image frame at the time that the pan angle indicated in the still subject information is obtained, this is eliminated from being an object of distinguishing. With an arrangement wherein this subject distinguishing processing is only executed at the time of subject searching, subject selection will be performed properly, since the pan angle has also been obtained under the field angle at the time of subject searching.

Thus, with the above-described processing, a pan angle (pan position) where the individual subject detected as a still subject is first contained in the image frame of the imaged image is handled as absolute position information.

Note that with the above subject distinguishing processing, the pan angle at that time has to be configured, which can be done by receiving information equivalent to the pan position from the platform 10, for example. Information of the pan position (pan rotation angle) can be obtained based on the number of input driving pulse signals if the pan motor 57 is a stepping motor, for example. Also, even if the pan motor 57 is not a stepping motor, information of the pan position can be obtained using the amount of time driving signals have been applied, information from sensors attached to the motor, information obtained by feedback control of the motor, and so forth.

Also, in a state wherein a different field angle is set as to the pan angle obtained as the absolute position information regarding the subject SBJs at the time of subject distinguishing processing, the pan angle at which the subject SBJs will first appear in the field angle can be obtained based on the ratio between the field angle set at that time and the field angle at the time of having obtained the pan angle of the absolute position information. In the event that processing for obtaining the pan angle of the absolute portion information is only performed at the time of subject searching, for example, a predetermined angle set at the time of subject searching can be used for the field angle at the time of having obtained the pan angle of the absolute position information. Also, if there is a possibility that processing for obtaining the pan angle of the absolute position information in other than subject searching, or the field angle may be changed during subject searching, the field angle information at that time may be included along with the pan angle serving as the absolute position information.

Also, if the digital still camera 1 is at a pan angle exceeding the pan angle αright° and is rotated in the counterclockwise direction in the drawing, the state shown in FIG. 36C is attained, with the subject SBJs at the far left of the image frame of the imaged image. The absolute position information of the still subject SBJs is thus pan angle αright°.

Also, the following can be conceived as absolute position information. In FIGS. 36A through 36C, the subject SBJs is imaged within the pan position range of pan angle αleft° to αright° without loosing sight thereof within the image frame of the imaged image. Accordingly, an arrangement may be made wherein the absolute position information of the subject SBJs is not taken as point information such as described above, like pan angles αleft° or αright°, but as information indicating an angle range of pan angle αleft° to αright°.

The absolute position information described with FIGS. 36A through 36C is also held regarding the tilt direction, as well. That is to say, the tilt angle (tilt position) is obtained in the same way as with FIGS. 36A through 36C. Thus, in actual practice, information of the pan angle and information of the tilt angle (pan/tilt position information) is obtained as the absolute position information.

However, there may be cases wherein the platform 10 is of a configuration capable of change in only one of the pan direction and tilt direction. In this case, the one of the pan direction and tilt direction which is the changeable direction can be set as the absolute position information. This also holds true for the following description regarding absolute position information as well.

Further, absolute position information can also be obtained as follows. FIG. 37A illustrates a state wherein the digital still camera 1 is at a position rotated by a pan angle of αx° in the clockwise direction as to the reference line L, with the subject SBJs being imaged within the horizontal field angle. In this case, the horizontal angle is expressed by θx°, and also the subject SBJs is situated on a line corresponding to an angle rotated in the counterclockwise direction from the center field angle angC by an angle βx°, on which the center position (center of gravity) in the horizontal direction corresponds.

Also, with the reference line L as the reference in FIG. 37A, it can be said that the subject SBJs in the horizontal direction is situated on the line corresponding to the position rotated by the angle γx° from the reference, at which the center position (center of gravity) in the horizontal direction corresponds.

Now, the reference line L is an absolute item, determined in accordance with the placement state of the platform 10 at that time. Accordingly, the position of the subject SBJs indicated by the angle γx° is absolute based on the reference line L, i.e., can be handled as absolute position information. Hereinafter, angles which can indicated the absolute position of a subject as with this angle γx° will be referred to as an "absolute position correlation angle". Also, the angle βx° indicates the position of the subject SBJs determined based on the center field angle angC under the pan angle αx° at that time, and accordingly will be referred to as a "relative position correlation angle".

An absolute position correlation angle can be obtained as follows. FIG. 37B illustrates an imaged image obtained by imaging with the digital still camera 1 in the placement state shown in FIG. 37A. Here, Cx represents the horizontal image frame size (can be expressed in terms of number of pixels, for example) in the image frame 300 of the imaged image, and M represents a vertical line passing through the center point in this horizontal image frame size, with the vertical line M serving as the reference of the horizontal direction in the image frame of the imaged image (reference for X-axial coordinate, X=0). With the X-axial coordinate in the horizontal direction, the region to the right of the vertical line M is positive, and the left region is negative. The coordinate value of the subject SBJs existing within the image frame 300 of the imaged image in the horizontal direction is expressed as X=a. Note that the X coordinate value a in FIG. 37B is a negative value.

Now, the relation (ratio) between the coordinate value a of the X coordinate up to the center of gravity of the subject SBJs and the horizontal image frame size Cx in FIG. 37B is equivalent to the relation (ratio) between the relative position corresponding angle βx° and the horizontal field angle θx° in FIG. 37A.

Accordingly, the relative position corresponding angle βx° is expressed by the following expression.

$$\beta x° = (a/Cx) \times \theta x \qquad \text{(Expression 1)}$$

Also, with FIG. 37B, the relation between the pan angle αx°, relative position corresponding angle βx°, and absolute position corresponding angle γx° is expressed by the following expression.

$$\alpha x° = \gamma x° - \beta x° \qquad \text{(Expression 2)}$$

Accordingly, the absolute position corresponding angle γx° can be obtained by the following expression.

$$\gamma x° = (a/Cx) \times \theta x° + \alpha x° \qquad \text{(Expression 3)}$$

That is to say, the absolute position corresponding angle γx° is obtained by the parameters of the X-coordinate value a of the subject SBJs in the image frame of the imaged image, the horizontal angle θx°, and pan angle αx°.

Now, of the above parameters, the horizontal image frame size Cx is a known value, and the X-coordinate value β of the subject SBJs in the image frame of the imaged image is none other than the image position in the horizontal direction of the subjected detected in the imaged image, and accordingly can be obtained by the subject detection processing according to the present embodiment. Also, information of the horizontal angle θx° can be obtained based on the field angle (zoom) control information. More specifically, with information of a standard field angle with the zoom power of the zoom lens of the optical system 21 set to 1x and held, information of the horizontal angle θx° can be obtained using the zoom position obtained in accordance with the zoom control and the above standard field angle. Also, the pan angle αx° can be obtained as information of control. Thus, the absolute position corresponding angle γx° can be obtained easily with no problem in particular.

Also, obtaining of such an absolute position corresponding angle is not restricted to around limit positions corresponding to the edges of the image frame 300, and can be obtained accurately even in cases wherein a subject is detected at a region further inwards of the image frame 300, as long as the above parameters can be obtained. Accordingly, real subjects with movement can be sequentially tracked and the absolute position corresponding angle thereof obtained.

At the time of actual subject searching for example, upon a still subject being detected from the detected individual subjects, the detected still subject can be handled as the subject SBJs in FIG. 37, so as to obtain the absolute position corresponding angle γx° based on the horizontal image frame size Cx, the X-coordinate value a of the subject SBJs in the image frame of the imaged image, the horizontal angle θx°, and pan angle αx°.

Also, in actual practice, the absolute position corresponding angle γy° in the vertical direction is also obtained in the same way. That is to say, the absolute position corresponding angle γy° in the vertical direction can be obtained by the expression $$\gamma y° = (b/Cy) \times \theta y° + \alpha y° \qquad \text{(Expression 4)}$$

based on the parameters of the vertical image frame size Cy, the Y-coordinate value b of the subject SBJs in the image frame of the imaged image, the vertical angle θy°, and tilt angle αy°.

Next, a configuration example for subject distinguishing processing using the absolute position information obtained as described above will be described with reference to FIG. 38. It should be noted that this processing can be applied to any composition determination block 62 described earlier with reference to FIGS. 29, 32, and 34. Also, the absolute position information serving as absolute position corresponding angle, described with reference to FIG. 38, will be used for description here.

Figure 38:
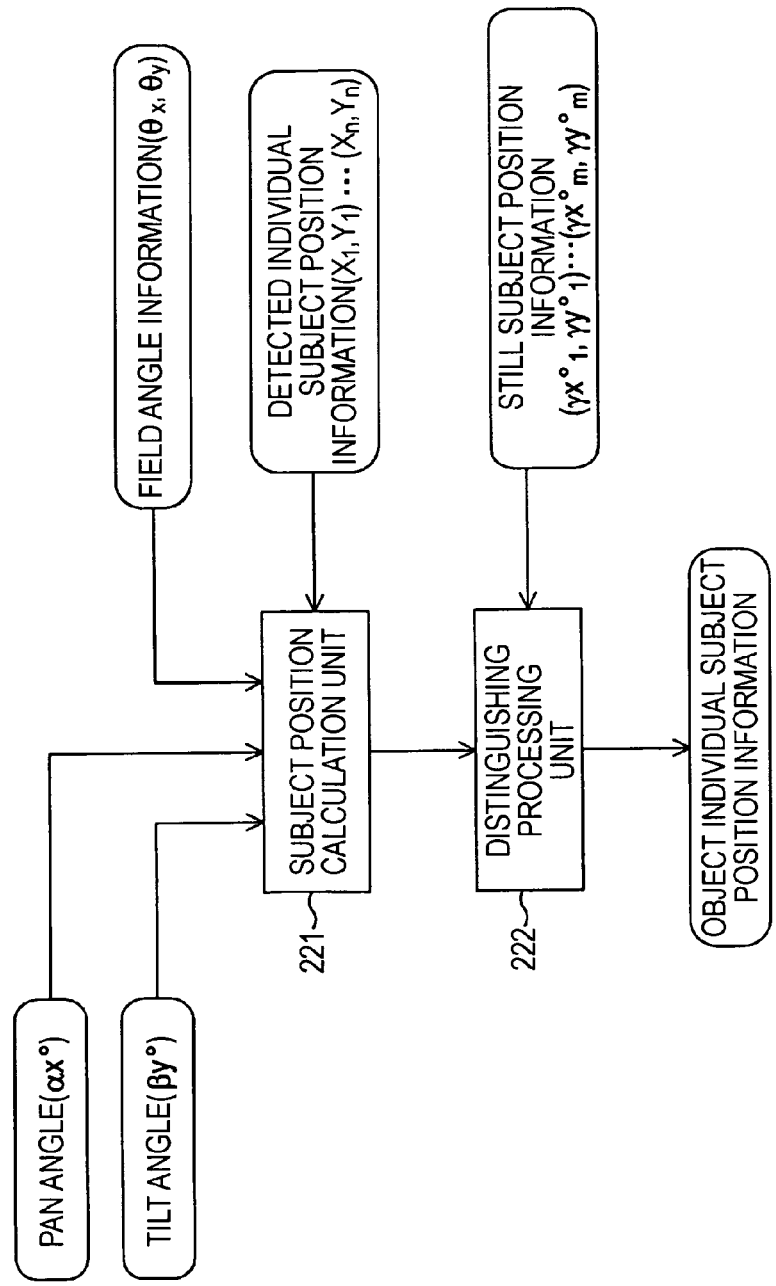
FIG. 38 is a block diagram illustrating a configuration example for subject distinguishing processing using absolute position information.

The subject distinguishing unit 211 shown in FIG. 38 is configured of a subject position calculation unit 221 and a distinguishing processing unit 222. Note that with correspondence to FIGS. 29, 32, and 34, the subject position calculation unit 221 for example can be viewed as being included in the subject detection processing unit 201, and the distinguishing processing unit 222 in the subject distinguishing unit 211.

At the subject position calculation unit 221, position information within the imaged image (in-imaged-image position information) is first obtained as position information in the detected individual subject information for each detected individual subject (detected individual subject position information), by subject detection processing performed on the imaged image data. This in-imaged-image position information is expressed by X-coordinate value and Y-coordinate value within the image frame of the imaged image. Accordingly, the in-imaged-image position information is expressed as, for example, (X1, Y1), (x2, Y2), and so on through (Xn, Yn), in accordance with detected individual subjects 1 through n.

The subject position calculation unit 221 inputs the in-imaged-image position information as position information for each detected individual subject. Also, the subject position calculation unit 221 inputs the pan angle αx° and tilt angle αy° at that time, and horizontal angle θx° and vertical angle θy° as field angle information. This information can be obtained as described with reference to FIG. 38.

The subject position calculation unit 221 uses these information (parameters) to execute processing for computing the absolute position corresponding angle in the horizontal (pan) direction (horizontal absolute position corresponding angle γx°) and the absolute position corresponding angle in the vertical (tilt) direction (vertical absolute position corresponding angle γy°), as absolute position information for each detected individual subject, as described with FIG. 38. The absolute position information (horizontal/vertical absolute position corresponding angle) for each detected individual subject obtaining in this way is handed to the distinguishing processing unit 222 in the subject distinguishing unit 211.

The distinguishing processing unit 222 inputs the position information (stills subject position information) from the individual subject information for each still subject making up the still subject information, the still subject information being held in the still subject information holding unit 210.

Now, each of the still subject position information is not expressed in terms of X-Y coordinates in the field angle, but rather expressed by absolute position information (horizontal/vertical absolute position corresponding angle). This works as follows, for example. Looking at the configuration in FIG. 29A for example, at the subject detection processing unit 201, the absolute position information (horizontal/vertical absolute position corresponding angle) calculated at the subject position calculation unit 221 is included in the detected individual subject information position information to be handed to the still detection processing unit 202. The still detection processing unit 202 includes the absolute position information in the individual subject information at the time of causing the individual subject information for each detected still subject to be held in the still subject information holding unit 210. Accordingly, the distinguishing processing unit 222 in FIG. 38 can input absolute position information from the still subject information holding unit 210 as position information of each subject registered as a still subject.

The distinguishing processing unit 222 compares the horizontal/vertical absolute position corresponding angles (γx°1, γy°1), (γx°2, γy°2), and so on through (γx°m, γy°m), which are M sets of still subject position information for m still subjects held in the still subject information holding unit 210, with the horizontal/vertical absolute position corresponding angles which are absolute position information for each detected individual subject detected from the imaged image data. Detected individual subjects which have absolute position information which can be viewed as being the same as a still subject as the result of the comparison are eliminated from being an object, and detected individual subjects which have absolute position information which can be viewed as being different from a still subject are distinguished as object individual subjects. The object individual subject position information distinguished in this way is handed to the composition determination processing unit 203. The position information to be handed to the composition determination processing unit 203 at this time may be absolute position information, but since it will be used for composition determination within the image frame, so in-imaged-image position information is preferable, due to being easier to handle in composition determination processing. In correlation with the configuration shown in FIG. 29A, if the distinguishing processing unit 222 receives in-imaged-image position information from the subject position calculation unit 221 for example, the in-imaged-image position information can be handed to the composition determination processing unit 203.

Figure 39:
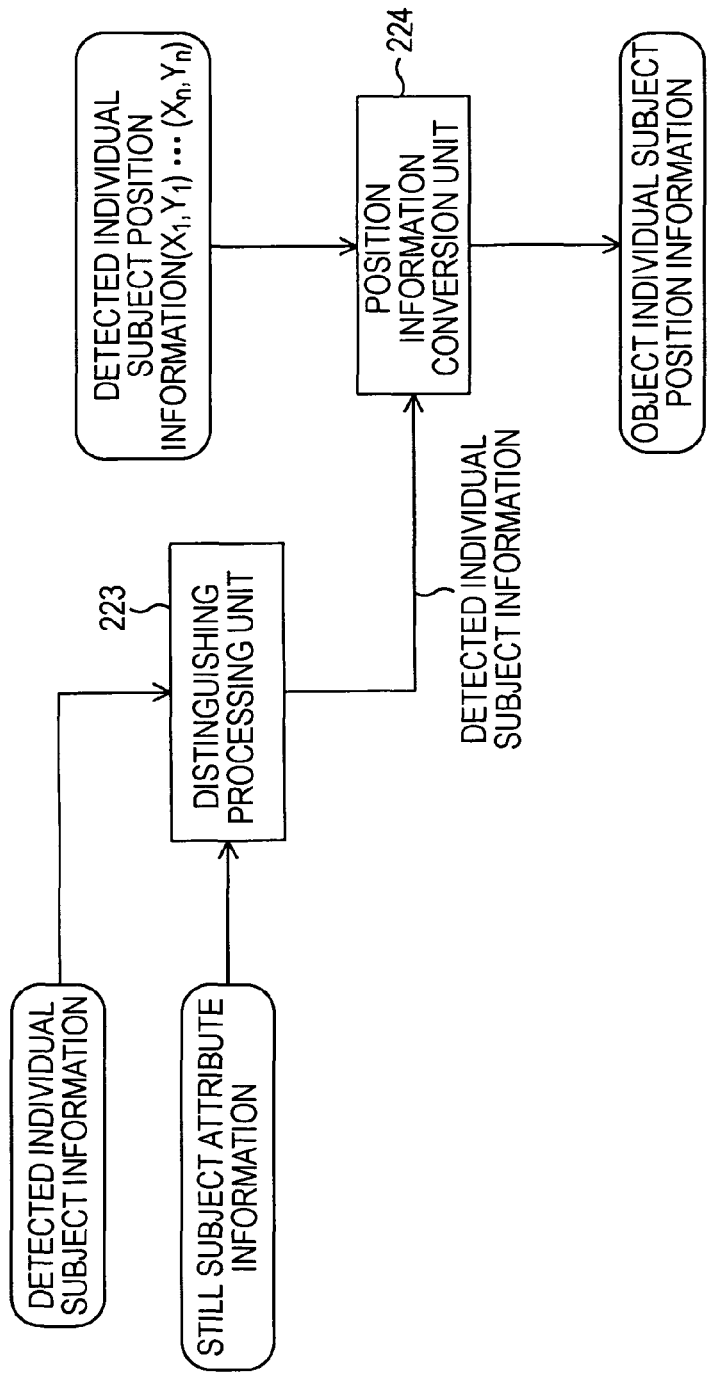
FIG. 39 is a block diagram illustrating a configuration example for subject distinguishing processing, corresponding to a case wherein subject detection processing, capable of individual recognition, is performed.

Also, as a modification of this subject distinguishing processing, FIG. 39 shows a configuration example of a case wherein individual recognition for each subject (person recognition, individual recognition) can be performed by detecting facial features in subject detection processing. Note that the configuration shown in FIG. 39 can be viewed as being included in the subject distinguishing unit 211 for example.

In this case, the subject detection processing unit 201 is arranged to perform individual recognition by detecting image features for each detected individual subject, as the subject detection processing such as described above. The technique for individual recognition is not restricted in particular, and any according to the related art may be applied.

Detected individual subject information obtained by such subject detection processing includes, in addition to information such as position information as described above, attribute information enabling individual recognition (e.g., information representing image features of the individual subject).

Accordingly, a distinguishing processing unit 223 shown in FIG. 39 inputs, from the subject distinguishing unit 211, attribute information for each detected individual subject (detected individual subject attribute information) described above, as detected individual subject information for each detected individual subject.

Also, in this case, an arrangement is made wherein the afore-mentioned attribute information is also included in the individual subject information for each still subject which the still subject information holding unit 210 holds. This arrangement may be made in accordance with a configuration wherein the detected individual subject information for each still subject, described with reference to FIG. 38, includes absolute position information.

The distinguishing processing unit 223 inputs attribute information (still subject attribute information) included in the individual subject information for each still subject from the still subject information holding unit 210, along with the detected individual subject attribute information.

The distinguishing processing unit 223 compares the attribute information which the detected individual subjects have with still subject attribute information, detected individual subjects which can be viewed as being the same as still subject attribute information are eliminated, and detected individual subjects which can be viewed as being different from still subject attribute information are distinguished. Detected individual subject attribute information corresponding to selected detected individual subjects are output to a position information conversion unit 224.

Now, let us say that the detected individual subject attribute information includes information functioning as a tag or ID which can be correlated with information included in the same detected individual subject information (correlation data). The position information conversion unit 224 inputs the detected individual subject attribute information output from the distinguishing processing unit 223, and the detected individual subject position information for all detected individual subjects, and then selects from the input detected individual subject position information, that correlated with the detected individual subject attribute information input from the distinguishing processing unit 223. The selected detected individual subject position information is output to the composition determination processing unit 203 as object individual subject position information.

Next, a more specific example of composition determination processing and composition matching (composition control) by the imaging system (digital still camera 1 and platform 10) according to the embodiment so far, will be described. It should be noted that the examples given here are only examples, and that a wide variety of specific examples of composition control can be conceived, as long as real subjects alone are object, with still subjects (unreal subjects) eliminated, for example.

First, a specific example of subject detection processing which the subject detection processing unit 201 performs will be described with reference to FIGS. 40A and 40B. Note that subject detection will be performed here based on face detection.

Figure 40A:
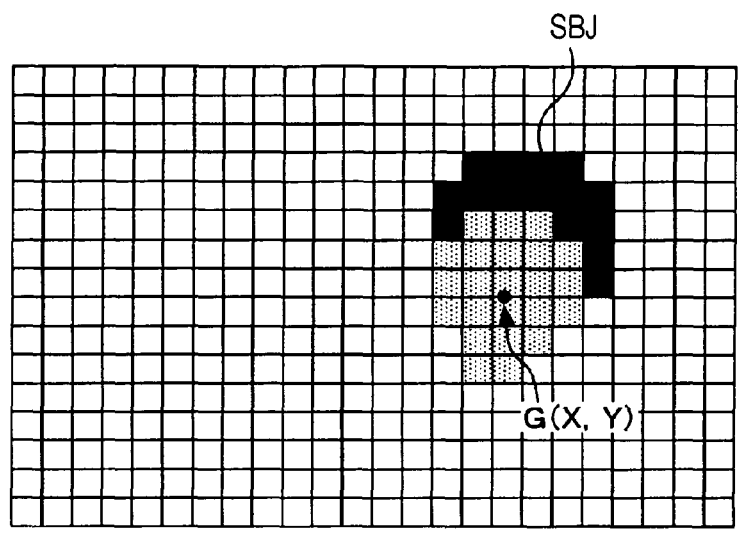
FIGS. 40A and 40B are diagrams describing an example of how to obtain the center of gravity of a detected individual subject and the total subject center of gravity of multiple individual subject, along with a specific method of how to detect individual subjects.

Now, let us say that the subject detection processing unit 201 has input imaged image data of the image contents shown in FIG. 40A. The image contents of the imaged image data here is a single person subject existing in the image which has been imaged. Note that FIGS. 40A and 40B are shown as the images having been sectioned into matrix form, schematically illustrating that images serving as imaged image data are made up of a predetermined number of horizontal and vertical pixels.

By the image contents of the imaged image data shown in FIG. 40A being subjected to subject detection (face detection), the face of the one individual subject SBJ shown in FIG. 40A is detected. That is to say, one face being detected by face detection processing means that one individual subject has been detected. Further, information of the number of individual subjects, orientation, and size, is obtained as the results of having detected the individual subject.

The number of individual subjects can be obtained in accordance with the number of faces detected by face detection, for example. With the case in FIG. 40A, the number of detected faces is one, thereby yielding the result that the number of individual subjects is also one.

Position information of each individual subject is either in-imaged-image position information or absolute position information as described above, with the position information specifically indicating the center of gravity of the individual subject SBJ.

For example, the center of gravity G of the individual subject SBJ in the image frame of the imaged image is expressed by (X, Y), as described earlier. The origin coordinate P (0, 0) on the X, Y coordinates system of the screen of imaged image data, which serves as a reference for the center of gravity G (X, Y) in this case, is for example, the intersection of the center point of the width (horizontal image size) Cx in the X-axial direction (horizontal direction) corresponding to the image size, and the height (vertical image size) Cy in the Y-axial direction (vertical direction) corresponding to the image size.

Also, subject center-of-gravity detection methods according to the related art can be applied to definition of position within the image of the individual subject with regard to the center of gravity G.

Also, the size of each individual subject can be obtained as the number of pixels in a region identified and detected as being a face portion, by face detection processing, for example.

Also, as described earlier, face orientation for each individual subject is detected as being facing one of the left or right, for example, based on face detection information.

Figure 40B:
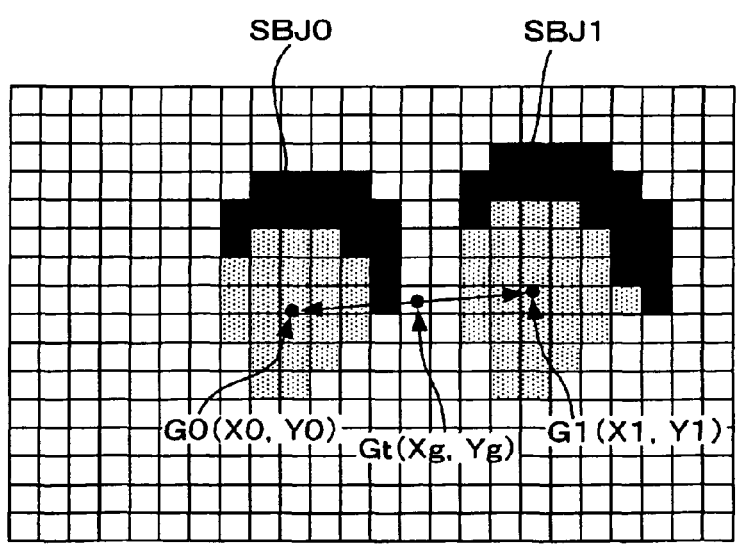

Also, upon the imaged image data shown in FIG. 40B is input and the subject detection processing unit 201 has executed subject detection processing, first, the face detection processing identifies that there are two faces, yielding results that there are two individual subjects. Here, of the two individual subjects, the one to the left will be identified as individual subject SBJ0 and the one to the right as individual subject SBJ1, so as to be identifiable. Also, the coordinates of center of gravity determined for the individual subjects SBJ0 and SBJ1 are G0 (X0, Y0), and G1 (x1, Y1). Further, in the event that multiple individual subjects are detected in this way, a total subject center of gravity Gt (Xg, Yg), which is the center of gravity of the group of multiple individual subjects (total subject), is obtained.

While various arrangements can be conceived as how to set the total subject center of gravity Gt, the simplest example thereof is illustrated where, wherein a line is drawn between the center of gravity of the leftmost subject and the center of gravity of the rightmost subject, and the center point of this line is taken as the total subject center of gravity Gt. The total subject center of gravity Gt is information which can be used in composition control as described later for example, and is information which can be obtained by computation as long as center of gravity information is obtained for each individual subject. Accordingly, while the total subject center of gravity Gt may be obtained by the subject detection processing unit 201 and output as detected information, an arrangement may be made wherein the composition determination block 62 obtains the total subject center of gravity Gt using the information relating to center of gravity of the leftmost and rightmost subjects having information indicating the position of the center of gravity of the individual subject, obtained as detection information.

Another example of a setting method which can be conceived is to provide each of the multiple individual subjects with weighting coefficients in accordance with the sizes thereof, and use the weighting coefficients to obtain the total subject center of gravity Gt, such that the total subject center of gravity Gt is closer to individual subjects large in size, for example. Also, the sizes of the individual subjects can be obtained as the number of pixels for each of the individual subjects SBJ0 and SBJ1 in accordance with the area that each face occupies.

This can be carried out by distinguishing being performed between real subjects and unreal subjects (still subjects) with regard to the individual subjects detected as described above, in accordance with the technique described above, with those distinguished as real subjects being set as object individual subjects to serve as objects of composition determination.

Next, description will be made regarding composition obtained by composition according to a first example of the present embodiment, with reference to FIGS. 42 through 44. It should be noted that "composition control" is a term referring to control processing wherein composition determination processing, and composition processing for realizing the optimal composition determined by the composition determination processing, are performed.

Figure 42:
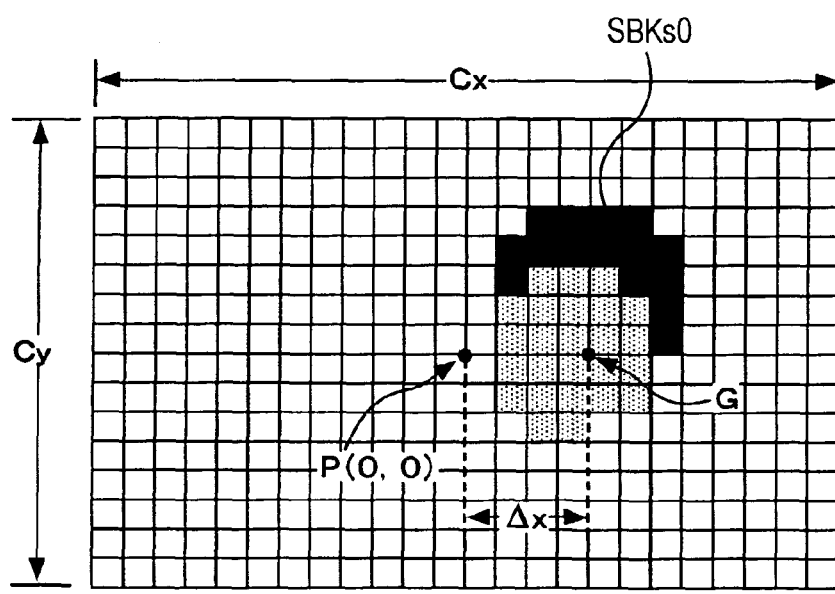
FIG. 42 is a diagram schematically illustrating an example of composition control, with a first example of composition control, in a case wherein the number of individual subjects detected is one.

FIG. 42 illustrates a case in which a single object individual subject SBJs0 has been detected within the image frame of the imaged image data, as a result of the subject detection processing and subject distinguishing processing. Note that other individual subjects detected as being unreal subjects may actually being existing within the image frame shown in FIG. 42, but unreal subjects have been omitted from the drawing here to facilitate understanding of the drawing.

Also, with the present embodiment, in an arrangement wherein the digital still camera 1 is mounted to the platform 10 in a normal state, the orientation of the digital still camera 1 is set such that a landscape screen is imaged, not a portrait screen. Accordingly, with this first example and a later-described second example of composition control, we will assume that a landscape screen is obtained by imaging.

In the event that a single object individual subject has been detected as shown in FIG. 42, first, the size of the object individual subject is changed such that the percentage which the object individual subject SBJs0 occupies in the screen of the imaged image data is a predetermined value which is viewed as being optimal. For example, at the point that the object individual subject has been detected, if the percentage which the object individual subject occupies in the screen is smaller than the above predetermined value, the field angle is narrowed by performing zoom control such that the percentage of the object individual subject is the predetermined value, and if the percentage which the object individual subject occupies in the screen is greater than the above predetermined value, the field angle is widened by performing zoom control such that the percentage of the object individual subject is the predetermined value. Such zoom control optimizes the subject size with regard to composition, in the event here that there is one object individual subject. That is to say, an optimal size is determined for the subject, and composition matching is performed such that the subject is this optimal size.

Next, adjustment of the position of the subject on the screen (subject position) in the event that there is one object individual subject is performed as follows. As for determination of subject position in the composition determination, the detected face direction information is used. In the case in FIG. 42, the direction of the face of the object individual subject SBJs0 has been detected as facing the left. It should be noted that the direction "left" as used here is as viewed from the photographer facing the object individual subject SBJs0, so the object individual subject SBJs0 himself/herself will be actually facing the right with the imaging apparatus taking the picture in the front.

Also, an imaginary image region division line Ld to serve as a reference for subject position adjustment is set. The image region division line Ld is a straight line matching a vertical line passing through the origin coordinates P (0, 0) in the image, i.e., matching a Y-axial line.

Once the direction of the face has been detected as being toward the left as in this case, the optimal composition is determined in the form of the center of gravity G of the object individual subject SBJs having been moved from a position corresponding to the image region division line Ld (X=0) to the right by a movement expressed in terms of horizontal offset amount $\Delta x$. Composition matching is performed such that the center of gravity G is situated at this position. Accordingly, control is executed to drive the pan mechanism of the platform 10 such that the center of gravity G is situated at the horizontal shift position.

Generally, a composition where the subject is situated at the center is considered to be a typical poor composition, and a composition wherein the position of the subject is shifted away from the center in accordance with a certain rule, of which the Rule of Thirds and Golden Section rule are particularly commonly used, for example, is considered to be a good composition. With the present embodiment, the position of the individual subject SBJ (center of gravity G) in the horizontal direction of the screen is first moved by a certain amount (horizontal offset amount $\Delta x$) as to the center of the screen.

Thereupon, with the present embodiment, if the direction in which the face of the object individual subject is facing is the left as with FIG. 42, the position of the center of gravity G in the horizontal direction is situated in right image region of the two image regions (division regions) obtained by the screen being divided into two regions by the image region division line Ld along the Y-axial line, such that the face is situated in the "right" region which is opposite to the "left" direction in which the face is facing, thereby obtaining space at the left side which the face of the individual subject SBJ is facing. Such a composition enables a better composition to be obtained as compared to compositions wherein the center of gravity G of the individual subject SBJs of which the face is facing left, for example, is at a subject position corresponding to (matching) the center of the screen in the horizontal direction, or in the image region to the left of the image region division line Ld.

Various algorithms can be conceived for determining the actual value of the horizontal offset amount $\Delta x$ with the present embodiment. Here, the so-called "Rule of Thirds" will used as a base. The Rule of Thirds is one of the most basic composition setting techniques, and aims to obtain a good composition dividing the screen into threes vertically, by two vertical imaginary lines equally dividing the screen into three regions horizontally and two horizontal imaginary lines equally dividing the screen into three regions vertically, so as to obtain nine equal regions with four imaginary lines, and situating the subject upon one of these four lines.

For example, in FIG. 42, the horizontal offset amount $\Delta x$ has been set such that the center of gravity G is situated on the imaginary line to the right, out of the two vertical imaginary lines equally dividing the horizontal image frame size Cx into three. Accordingly, one composition can be obtained, which is optimal for the subject position in the horizontal direction in accordance with the face direction of the individual subject.

Also, although not shown in the drawings, in the event that the direction of the face of the one object individual subject SBJs is detected to be in the right direction, the position of the center of gravity G of the object individual subject SBJs in the horizontal direction is situated so as to be linearly symmetrical across the image region division line Ld as to the position shown in FIG. 42. That is to say, the horizontal offset amount Δx in this case is set with an inverted sign for the actual value of that shown in FIG. 42, and pan control is performed based on this horizontal offset amount Δx.

Figure 43A:
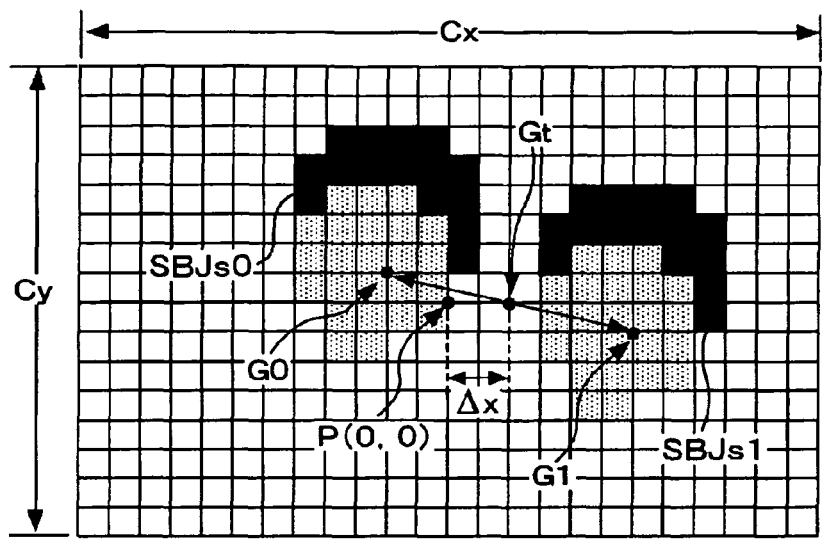
FIG. 43 is a diagram schematically illustrating an example of composition control, with the first example of composition control, in a case wherein the number of individual subjects detected is two.

Also, in the event that two object individual subjects SBJs0 and SBJs1 are detected as in FIG. 43A, the first thing performed in the composition control is to perform adjustment (zoom control) regarding the size of the total subject image portion made up of the group of image portions of the object individual subjects SBJ0 and SBJ1 (this can also be understood as the percentage which the subject image portions occupy in the entire image, for example), so as to be set (determined) to a size optimal in accordance with the number of object individual subjects being two.

While several ways can be conceived to define the total subject image portions and obtain the size thereof, one way would be to add the size of the image portions for each of the multiple detected object individual subjects, for example. Another would be to obtain the size of an image portion within an imaginary line drawn so as to encompass all of the multiple detected object individual subjects.

Information regarding the face direction of the two object individual subjects SBJs0 and SBJs1 is used in determining the subject position of the two object individual subjects SBJ0 and SBJ1 in the horizontal direction.

FIG. 43A shows a case wherein the face directions of the two object individual subjects SBJs0 and SBJs1 have been detected to both be toward the left. That is to say, the face directions of the two object individual subjects are all the same, which is left. In this case, the total subject image portion made up of the object individual subjects SBJ0 and SBJ1 is positioned to the right of the image region division line Ld, which is opposite to the left direction in which the faces are facing, such that space is formed at the left side of the screen in the same way as with the case of the single object individual subject SBJs shown in FIG. 42, since in this case, this subject placement is determined to be the optimal composition.

To this end, a horizontal offset amount Δx is set for shifting to the right side, as shown in FIG. 43A. Thereupon, pan control is performed such that the total subject center of gravity Gt, i.e., the center of gravity of the total subject image portion made up of the two object individual subjects SBJ0 and SBJ1, is situated at a position shifted from the vertical line (Y-axial line) passing through the origin coordinates P (0, 0), which is the image region division line Ld, by the horizontal offset amount Δx. Also, while not shown in the drawings, in the event that the face directions of the two object individual subjects SBJs0 and SBJs1 are both toward the right, the total subject center of gravity Gt of the two object individual subjects SBJs0 and SBJs1 is situated so as to be linearly symmetrical across the image region division line Ld as to the position shown in FIG. 43A. That is to say, the total subject center of gravity Gt is situated at a position shifted to the left of the Y axial line serving as the reference by an amount corresponding to the absolute value of the horizontal offset amount Δx, which is determined to be the optimal composition in this case, and pan control is performed so as to achieve this state.

It should be noted in this case though, that an horizontal offset amount Δx obtained in the case that the object individual subject is one tends to lead to the subjects being too far to the right (or left) if applied to a case such as this wherein there are multiple object individual subjects. Accordingly, in a case wherein there are two object individual subjects as shown in FIG. 43A, the horizontal offset amount Δx is set (determined) to be a smaller value (absolute value) than that in the case in FIG. 42 where the number of object individual subjects in one, in accordance with a predetermined rule.

Figure 43B:
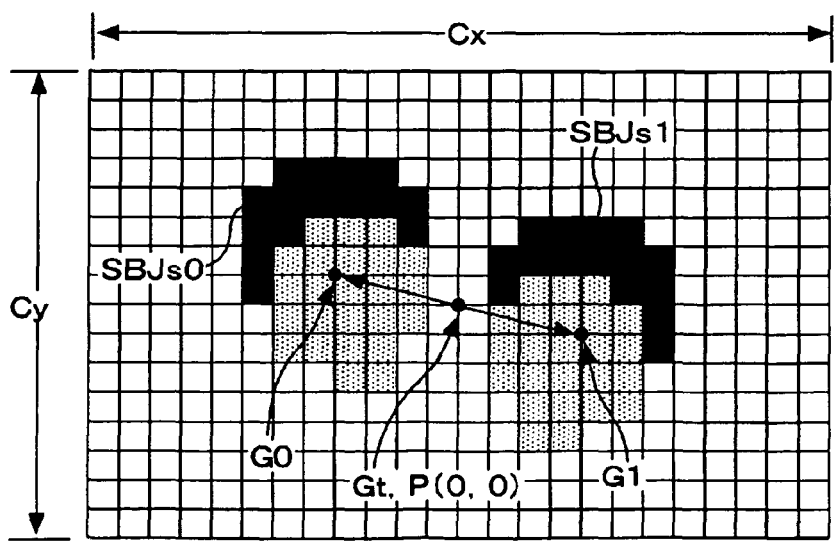

Also, FIG. 43B shows a case wherein the face directions of the two object individual subjects SBJs0 and SBJs1 are different, i.e., one to the right and one to the left. This is an example of a case wherein the number of object individual subjects is two and the direction of faces is not the same. In this case, determination is made that an optimal composition is a state wherein the total center of gravity Gt of the two object individual subjects SBJs0 and SBJs1 is positioned on the image region division line Ld as shown in FIG. 43B, and adjustment (pan control) is performed to achieve this state.

With the configuration which can be obtained thereby, the total subject image portion made up of the two object individual subjects SBJs0 and SBJs1 is positioned at the approximate middle of the screen in the horizontal direction. However, in the event that there are multiple subjects and these subjects are not facing in the same direction, the composition thereof is suitable even of the total subject image portion is at the middle.

Figure 44:
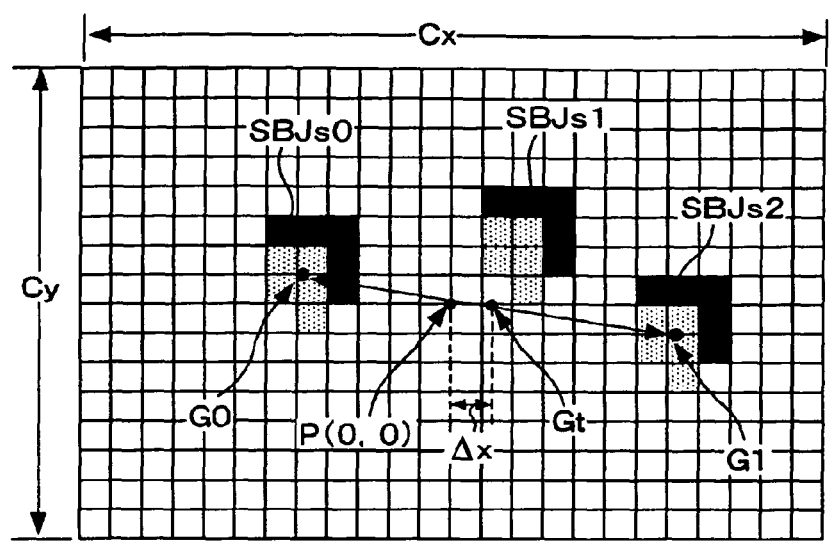
FIG. 44 is a diagram schematically illustrating an example of composition control, with the first example of composition control, in a case wherein the number of individual subjects detected is three.

Also, FIG. 44 shows a case wherein three object individual subjects, SBJs0, SBJs1, and SBJs2, have been detected. With the composition control in this case as well, the first thing performed in the composition control is to perform adjustment (zoom control) regarding the size of the total subject image portion made up of the group of image portions of the object individual subjects SBJs0, SBJs1, and SBJs2, so as to be set to a size optimal in accordance with the number of object individual subjects being three.

In this case as well, information regarding the face direction of the object individual subjects SBJs0, SBJs1, and SBJs2, is used in determining the subject position of the total subject image portion in the horizontal direction. FIG. 44 shows a case wherein the face directions of the three object individual subjects SBJs0, SBJs1, and SBJs2, have been detected to both be toward the left. In this case, as with the case of FIG. 43A, the total subject image portion made up of the object individual subjects SBJs0, SBJs1, and SBJs2, is positioned to the right of the image region division line Ld, to which end a horizontal offset amount Δx is set for shifting to the right side, and pan control is performed such that the total subject center of gravity Gt is situated at a certain position determined thereby. Also, in the event that the face directions of the three object individual subjects SBJs0, SBJs1, and SBJs2, are all toward the right, the total subject center of gravity Gt is situated so as to be linearly symmetrical across the image region division line Ld as to the position shown in FIG. 44.

It should also be noted in this case, the horizontal offset amount Δx is set to be a smaller absolute value than that in the case in FIG. 43A where the number of object individual subjects is two. Accordingly, the subject position in the horizontal direction is optimal in accordance with the case wherein the number of object individual subjects is three for example, and a good composition can be obtained.

Also, in the composition control according to this first example, in the event that the face directions of the three object individual subjects SBJs0, SBJs1, and SBJs2, are not all the same, a composition is obtained wherein the total subject center of gravity Gt is situated at a position upon the image region division line Ld (Y-axial line).

With the description so far, it can be understood that position adjustment in the horizontal direction in the composition control according to the first example is first correlated with the face direction detected for each object individual subject. That is to say, as the most basic control, in the event that the number of object individual subjects is one, the center of gravity G is situated so as to be shifted by a predetermined amount to the right side region or left side region of the image region division line Ld (Y-axial line) in accordance to whether the face direction detected for the object individual subject is toward the right or the left, i.e., horizontal offset is performed with regard to the center of gravity G, so as to form space in the direction in which the subject is facing in the screen.

In the event that the number of object individual subjects is two or more with the composition control, and the face direction of all of the object individual subjects is the same, horizontal offset of the total subject center of gravity Gt is performed in the same way as with the above position adjustment, but if not all the same, horizontal offset is not performed but rather the total subject center of gravity Gt is provided with an X coordinate corresponding to the image region division line Ld, such that the total subject image region is around the middle of the screen.

Thereupon, at the time of performing horizontal offset of the total subject center of gravity Gt (or the center of gravity G in the case that the number of individual subjects is one), the horizontal offset amount Δx is changed according to the number of object individual subjects, as described with reference to FIGS. 42 through 44. Accordingly, consideration is given regarding the horizontal position of the total subject image portion in the image such that an optimal position can be obtained in accordance with the number of object individual subjects.

Figures 45, 45A, 45B:
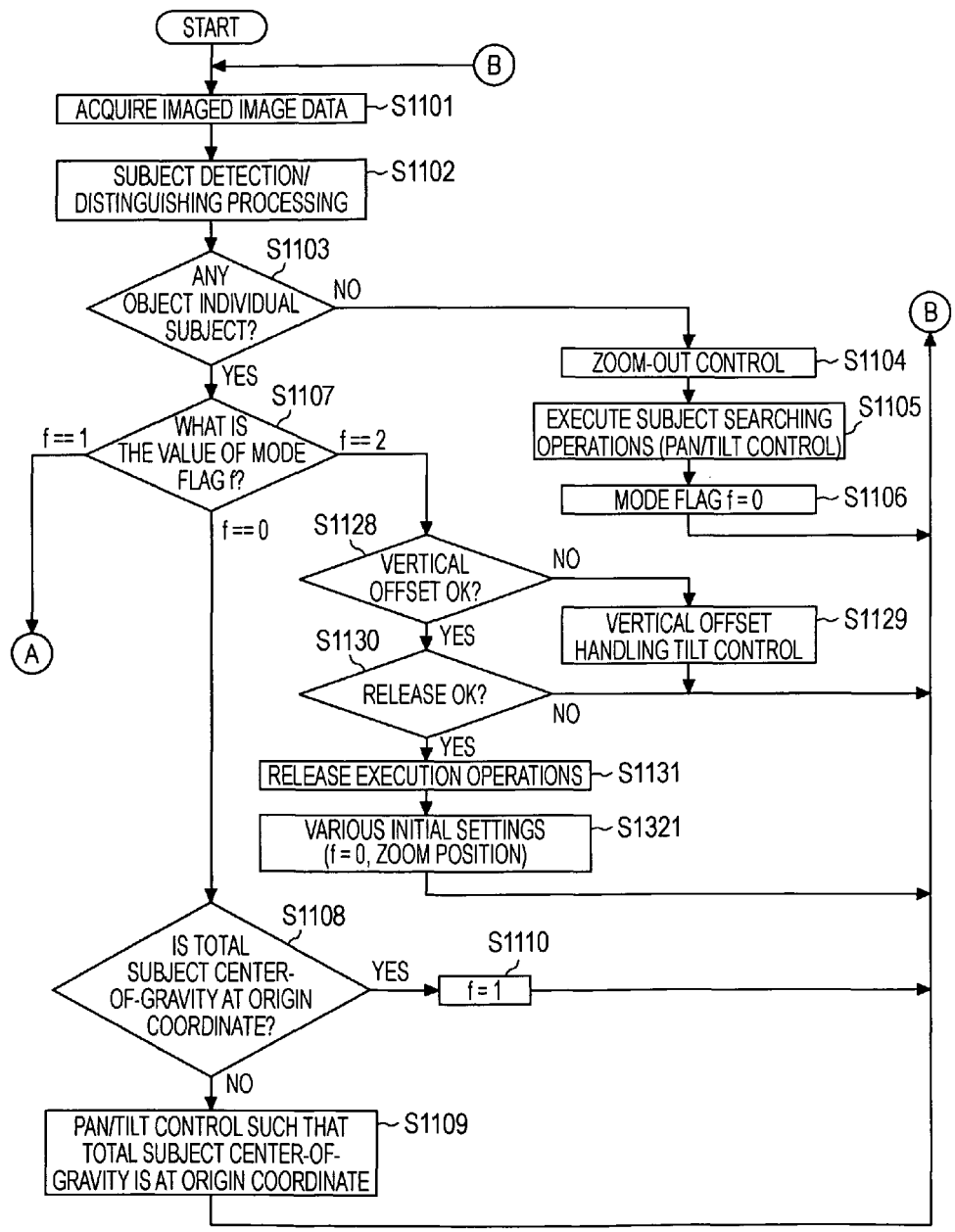
FIG. 45 is a flowchart illustrating an example of processing procedures for the first example of composition control.
Figure 45B:
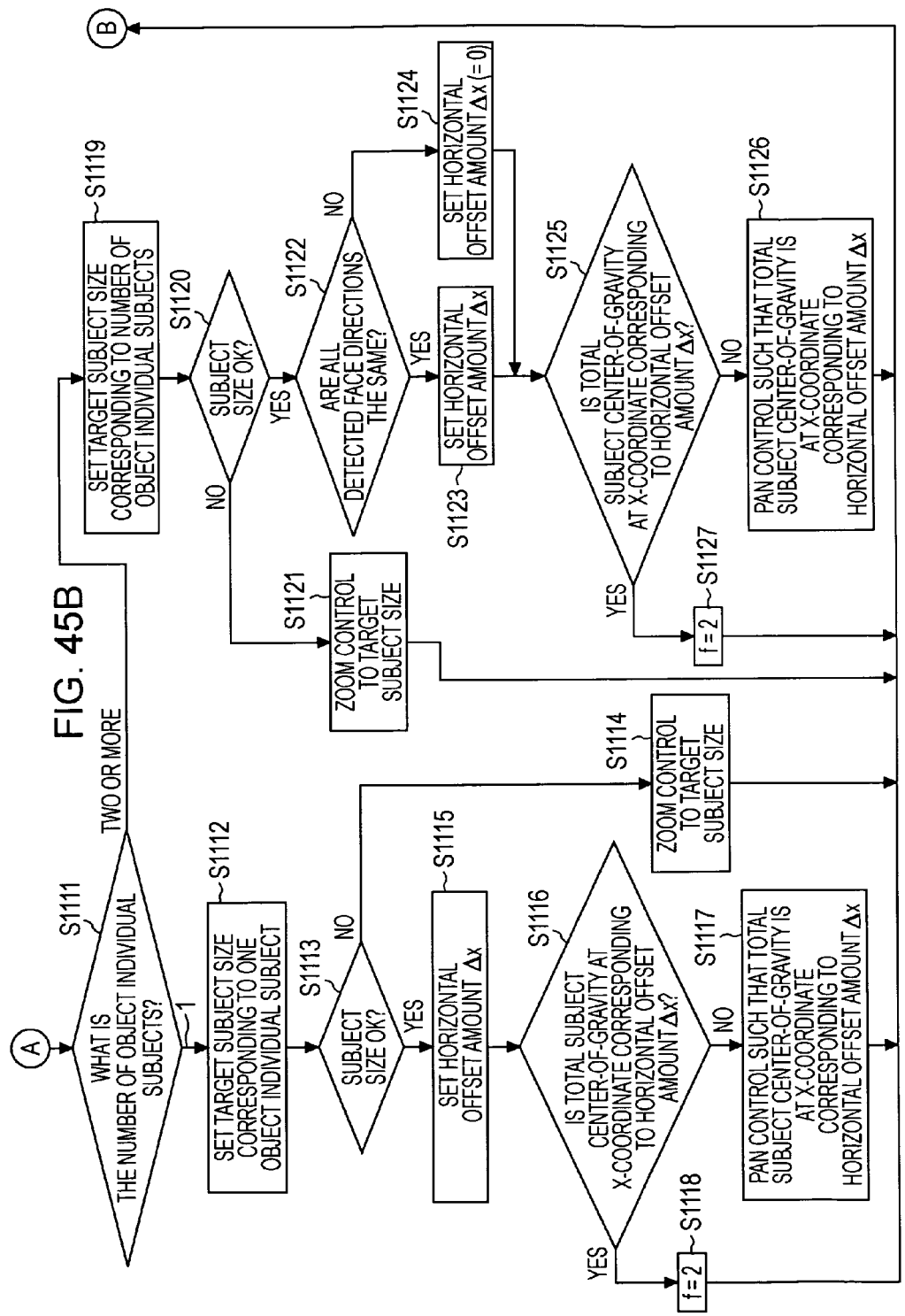

FIG. 45 illustrates an example of procedures, executed by the composition determination block 62 and the pan/tilt/zoom control block 63 in accordance with the configuration control according to the first example described with reference to FIGS. 42 through 44 above. It should be noticed that the procedures shown in FIG. 45 can be applied to any of the configurations shown in FIGS. 29, 32, and 34.

The processing shown in FIG. 45 can be viewed as being realized by a program being executed by the signal processing unit 24 serving as a DSP and a CPU in the control unit 27.

Also, in the following flowcharts, the terms "total subject center of gravity (Gt)" and "total subject image portion" will no longer be applied to only cases wherein the number of detected individual subjects is two or more, but also to the case wherein the number of detected individual subjects is one. That is, the center of gravity G shown in FIG. 42 might be referred to as the "individual subject center of gravity Gt in a case that the number of detected individual subjects is one", for example, and the image portion made up of the individual subject SBJ alone in FIG. 42 might be referred to as the "total subject image portion in a case that the number of detected individual subjects is one".

First, steps S1101 through S1106 are procedures for searching and detecting subjects, and performing subject distinguishing, primarily executed by the subject detection processing unit 201.

In step S1101, imaged image data based on the imaging signals from the image sensor 22 is input and acquired.

In step S1102, subject detection processing and subject distinguishing processing are executed using the imaged image data acquired in step S1101. The subject detection processing here is executed by the subject detection processing unit 201 as described earlier. Also, the subject detection processing involves also detecting the face direction for each detected individual subject, and obtaining the information thereof, as described earlier. Also, subject distinguishing processing is executed by the subject distinguishing unit 211 in accordance with the described made earlier.

In step S1103, determination is made regarding whether or not a real subject to take as an object of composition determination exists, i.e., whether an object individual subject exists (has been distinguished), as the result of the subject detection processing and subject distinguishing processing in step S1102. In the event that a negative determination result is obtained here to the effect that no object individual subject exists, i.e., the number of distinguished object individual subjects is zero, the flow proceeds to step S1104, and zoom lens moving control (zoom-out control) for widening the field angle to a predetermined field angle (horizontal/vertical angle) in accordance with subject searching. Thus widening the field angle allows a wider range to be imaged, meaning that subjects are that much easier to capture. Also, in step S1105, pan/tilt control is executed for moving the pan/tilt mechanism of the platform 10 for subject searching. This control is performed by the subject detection processing unit 201 handling the communication control processing block 64 the control signals for pan/tilt control, which are transmitted to the communication unit 52 of the platform 10. The pan/tilt mechanism of the platform 10 should be moved in a pattern which allows searching to be effectively performed for example, as the pan/tilt control for the subject searching.

Also, in step S1106, 0 is set for the mode flag (f=0), and the flow returns to step S1101.

Thus, the procedures for the steps S1101 through S1106 are repeated until at least one individual subject is detected in the image contents of the imaged image data. At this time, the system made up of the detected individual subject and the platform 10 is in a state wherein the detected individual subject is moved in the pan direction and tilt direction for subject searching.

In the event that a positive determination result is given in step S1103 to the effect that an object individual subject exists, the flow proceeds to the procedures of step S1107 and on.

In step S1107, determination is made as to the value currently set to the mode flag f.

In the event that determination is made that f=0 holds, this indicates that an initial rough subject capturing mode should be executed as composition control, and procedures starting from step S1108 are executed as shown in FIG. 45.

In step S1108, determination is made regarding whether or not the total subject center of gravity Gt is situated at the origin coordinates P (0, 0) (see FIG. 41) in the screen of the imaged image data (screen obtained when showing the screen contents of the imaged image data). Now, in the event that a negative determination result is obtained to the effect that the total subject center of gravity Gt is not yet situated at the origin coordinates, control is executed in step S1109 to move the pan/tilt mechanism of the platform 10 such that the total subject center of gravity Gt is situated at the origin coordinates, and the flow returns to step S1101. Thus, in the capturing mode which is the initial composition control procedure in a state wherein the presence of an individual subject has been detected, the pan/tilt mechanism of the platform 10 is controlled such that the total subject center of gravity Gt is situated at the origin coordinates which is the initial reference position, so as to display the image region in which a detected object individual subject is shown in the middle of the screen.

An example of an algorithm for performing the pan/tilt control in step S1109 will now be shown. In the state wherein an individual subject has been detected in the state of mode flag f=0, the subject detection processing unit 201 performs computation shown in the following Expression 5, so as to obtain the pan-direction movement amount $S_{pan}$ and tilt-direction movement amount $S_{tilt}$, which are movement amounts of movement that has to be made.

$$(S_{pan}, S_{tilt}) = \frac{\sum_{i=0}^{n-1} p(x_i, y_i)}{n}$$

Figure 41:
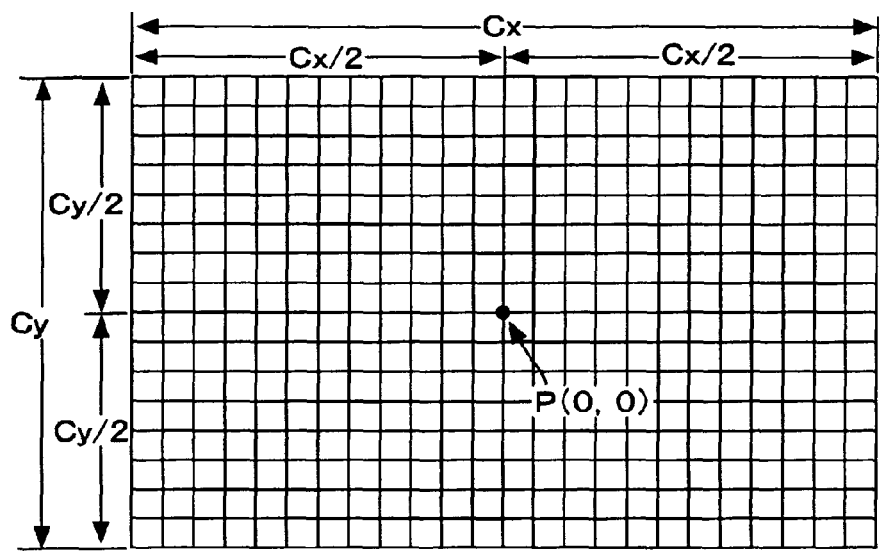
FIG. 41 is a diagram for describing an origin coordinate set within the image frame of the imaged image data.

Here, n represents the number of object individual subjects distinguished, and p(Xi,Yi) represents the X-Y coordinates to the center of gravity if the i'th object individual subject out of the 0'th through n−1' th object individual subjects, or more specifically, the object individual subjects to which the Nos. of 0 through n−1 have been assigned. As shown in FIG. 41, the origin coordinates (0, 0) in this case is the intersection between the center point in the horizontal direction of the screen and the center point in the vertical direction thereof.

In step S1108 for example, determination is made regarding whether or not the absolute value of the movement amount $S_{pan}$, $S_{tilt}$ is within a predetermined value (more precisely is zero, but may be a value greater than zero), whereby determination can be made regarding whether or not the total subject center of gravity Gt is equivalent to being at the origin coordinates P.

In step S1109, pan/tilt control is executed so that the absolute value of the movement amount $S_{pan}$, $S_{tilt}$ is within the predetermined value. The speed of the pan mechanism unit 53 and tilt mechanism unit 56 at the time of the pan/tilt control may be a constant speed, or may be arranged to move faster if the movement amount $S_{pan}$ $S_{tilt}$ is greater, for example. This arrangement would allow the total subject center of gravity Gt to be brought close to the origin coordinates in a relatively short time even if the amount of panning or tilting movement is great.

In the event that a positive determination result is made in step S1108 that the total subject center of gravity Gt is situated at the original coordinates, in step S1110 the mode flag is set to 1 (f=1) and the flow returns to step S1101. The state wherein the mode flag f has been set to 1 in step S1110 indicates that the capturing mode which is the initial procedure in composition control has ended, and the next first adjustment control (composition adjustment mode) should be executed.

In the event that the mode flag is f=1 and the first composition adjustment mode should be executed, the flow proceeds from step S1107 to step S1111. The first composition adjustment mode is for performing zoom (field angle) adjustment and pan for obtaining an optimal composition in accordance with the number of detected individual subjects and the combination of face directions of the individual subjects. Note that the field angle adjustment and pan control results in change in the size of individual subjects in the screen and in the position of the individual subjects.

In step S1111, determination is made regarding how many object individual subjects are currently set, and in the event that this is one, procedures starting from step S1112 are executed.

In step S1112, a target subject size is set in accordance with the number of detected object individual subjects being one. The target subject size here is a size wherein the total subject image portion size in the screen is viewed as being compositionally optimal, and in correspondence with FIG. 42 for example, is equivalent to "a predetermined range of values of occupancy percentage of the (one) object individual subject SBJs in the imaged image data which is taken to be optimal".

In step S1113, determination is made regarding whether or not the size of the object individual subject is OK. A state wherein the size of the object individual subject is OK is a state wherein the size of the object individual subject matches target subject size set in step S1112. In the event that a negative determination result is obtained in step S1113, the flow proceeds to step S1114, zoom lens driving control (zoom control) is executed such that the size of the object individual subject is the target subject size, and the flow returns to step S1101.

Note that at this time, zoom control is executed so that a position corresponding to the X coordinate set in step S1109 (X=0) is maintained with regard to the position of the total subject center of gravity Gt in the horizontal direction (left-right direction). Accordingly, a state wherein the object individual subject is positioned around the middle in the horizontal direction can be maintained. Also, at the time of executing subject search operations, zoom-out control is performed in step S1104, so it is likely that zoom-in control will be performed for the zoom control in step S1114. However, in the event that the size of the individual subject detected at that time is larger than the target subject size for some reason, and accordingly a negative determination result is obtained in step S1113, zoom-out is executed in step S1114 to execute control such that the actual object individual subject size becomes the target subject size.

In the event that a positive determination result is obtained in step S1113, the flow proceeds to the procedures of steps 1115 and on.

In step S1115, the horizontal offset amount Δx is set. Here, in the composition control according to the first example of the present embodiment, the horizontal offset amount Δx is obtained by the following Expression 6.

$$\Delta x = D \times (Cx/6)/n \qquad \text{(Expression 6)}$$

In this Expression 6, D represents a coefficient to which one of +1, −1, or 0 has been set based on the face direction or combination (relation) of multiple face directions. Cx represents the horizontal image size. The term Cx/6 corresponds to the X coordinates of imaginary lines in the vertical direction, obtained based on the Rule of Thirds, and n indicates the number of object individual subjects that have been distinguished (set).

In the event that the flow reaches step S1115, here, n=1, since the detected object individual subject is one. Also, the face direction is either left or right. The coefficient D is +1 if the face direction is toward the left, and is −1 if toward the right.

Accordingly, in the event that the face direction of the one object individual subject which has been distinguished is to the left, $$\Delta x = -Cx/6$$

holds, indicating a position of a vertical line moved to the left by an amount Cx/6 from a vertical line passing through the origin coordinate P (0, 0) which is the image region division line Ld (Y-axial line). The position of the vertical line is the same of the right imaginary line of the two imaginary lines in the Rule of Thirds.

On the other hand, in the event that the face direction of the one object individual subject which has been distinguished is to the right, horizontal offset amount $\Delta x = Cx/6$ holds, indicating a position of a vertical line moved to the right by an amount Cx/6 from a vertical line passing through the origin coordinate P (0, 0) which is the image region division line Ld (Y-axial line). The position of the vertical line is the same of the left imaginary line of the two imaginary lines in the Rule of Thirds.

In step S1116, determination is made regarding whether or not the total subject center of gravity Gt (in this case the center of gravity G in FIG. 42 is the same as the total subject center of gravity Gt since there is only one object individual subject) is positioned on the X coordinate corresponding to the horizontal offset amount Δx set in step S1115 above. In the event that a negative determination result is obtained here, the flow proceeds to step S1117.

In step S1117, pan control is executed such that the total subject center of gravity Gt is positioned at the X coordinate corresponding to the horizontal offset amount Δx, and the flow returns to step S1101.

In the event that the total subject center of gravity Gt is positioned at the X coordinate corresponding to the horizontal offset amount Δx, due to the control in step S01117, a positive determination result is obtained in step S1116. In the event that a positive determination result is thus obtained in step S1116, the center of gravity of the object individual subject (SBJ) is at a position moved to the left or right from the image region division line Ld by the horizontal offset amount Δx in accordance with the face direction thereof, as shown in FIG. 42.

In the event that a positive determination result is obtained in step S1116, the flow proceeds to step S1118, the mode flag is set to 2, and the flow returns to step S1101. A state wherein the mode flag is f=2 is a state wherein the first composition adjustment has ended, so the next second composition adjustment mode should be executed and then a release operation should be executed, as will become apparent from later description.

Also, in the event that determination is made in step S1111 that the number of object individual subjects is two or more, the procedures starting from step S1119 are executed. In step S1119, processing is performed for setting the target subject size. In the event that the number of object individual subjects is two or more, the target subject size of obtaining an optimal composition differs in accordance with the number of object individual subjects, for example. Accordingly, in step S1119, a predetermined target subject size in accordance with the number of object individual subjects detected in step S1102 is set. Also, it should be noted that the target subject size in the event that the number of object individual subjects is two or more deals with the total subject image portion made up of all detected individual subjects.

In step S1120, determination is made regarding whether or not the size of the object individual subject is OK. That is to say, here, determination is made regarding whether or not the size of the total subject mage portion obtained from the detected information regarding the object individual subjects is the same as the target subject size set in the above step S1120.

In the event that a negative determination result is obtained in step S1120, the flow proceeds to step S1121. In step S1121, zoom lens driving control (zoom control) is executed such that the size of the total subject image portion of the object individual subjects detected at this time is the target subject size, set in step S1119, in the same way as with step S1114, and the flow returns to step S1101.

On the other hand, in the event that a positive determination result is obtained in step S1120, the flow proceeds to step S1122.

In step S1122, determination processing is performed regarding whether or not the face directions detected for each of the multiple object individual subjects are all the same. In the event that a positive determination result is obtained in step S1122, the procedures of step S1123 and on are executed. In step S1123, the horizontal offset amount Δx is executed with the above-described Expression 6.

In this case, either +1 or −1 is substituted into the coefficient D in Expression 6 in accordance with whether the same face direction that has been detected is either left or right. Also, a numeral of 2 or greater is substituted into n, in accordance with the number of object individual subjects detected.

As can be understood from this, with Expression 6, the greater the number of object individual subjects, the smaller the absolute value of the horizontal offset amount Δx is. That is to say, as described with reference to FIGS. 42, 43A, and 44, the offset amount of the total subject image portion from the image region division line Ld toward the left or right is smaller as the number of object individual subjects increases.

On the other hand, in the event that a negative detection result is obtained in step S1122, the horizontal offset amount Δx is set in step S1124. It should also be noted that Δx=0 can also be set here in step S1124 by performing the computation of Expression 6. That is to say, in the event that a negative determination result is obtained in step S1122, i.e., in the event that the multiple face directions are not all the same, the algorithm is configured such that 0 is substituted in to the coefficient D whereupon the computation of Expression 6 is carried out.

After executing the procedures of step S1123 or step S1124, the flow proceeds to the procedures of step S1125 and on.

In steps S1125 through S1127, pan control is performed until the total subject center of gravity Gt is positioned at the X coordinate corresponding to the horizontal offset amount Δx set in step S1123 or S1124, in the same way as with the processing in steps S1116 through S1118. In the event that the face directions of the multiple object individual subjects are all the same as a result of this control, this means that a state has been achieved wherein the total subject image portion (total subject center of gravity Gt) has been moved to the left or right direction by the horizontal offset amount Δx corresponding to the number of object individual subjects. Upon this state being achieved, a positive determination result is obtained in step S1125, the mode flag f is set to 2 in step S1127, and the flow returns to step S1101.

In this state wherein the mode flag f has been set to 2, the procedures of size adjustment in accordance with the number of object individual subjects, and position adjustment in the horizontal direction in accordance with the face direction for each of the object individual subjects or the combination thereof, described with reference to FIGS. 42 through 44, have been completed as the composition control. Accordingly, in the event that determination is made in step S1107 that the mode flag f is 2, the second composition adjustment mode is executed in the procedures of step S1128 and on.

For example, while no description has been made above in the description of composition control with reference to FIGS. 42 through 44 regarding how to set the position of the center of gravity of the object individual subjects in the vertical direction in the screen, in actual practice, there may be cases wherein a better composition can be obtained by moving vertically (offset) by a certain amount from the center of the screen. Accordingly, with a practical application of the composition control according to the present embodiment, a vertical direction offset amount is also set for the total subject center of gravity Gt so that a better optimal composition can be obtained. The procedures for this are the second composition adjustment mode, executed as step S1128 and the step S1129 which will be described next.

In step S1128, determination is made regarding whether or not the position of the total subject center of gravity Gt (in the event that the number of object individual subjects is one, the center of gravity G of that object individual subject) is offset from a horizontal line (X-axis) passing through the origin coordinates P in the screen by a vertical offset amount Δy (i.e., whether or not the center of gravity offset is OK).

In the event that a negative determination result is obtained in step S1128, in step S1129 tilt control is performed such that the tilt mechanism of the platform 10 moves so as to offset the center of gravity by the set vertical offset amount Δy, and the flow returns to step S1101. At the point that a positive determination result is obtained in step S1128, this means that the position of the total subject image portion in both the horizontal direction and in the vertical direction is in accordance with the optimal composition, and further, the size of the total subject image portion is also in accordance with the optimal composition. That is to say, the optimal composition has been achieved.

Several techniques can be conceived regarding how to set the actual value of the vertical offset amount Δy with regard to steps S1128 and S1129, and accordingly, the present embodiment is not restricted to any in particular. One of the simplest ways of setting is to give a length value equivalent to ⅙ of the vertical image size Cy from the center position in the vertical direction, based on the Rule of Thirds, for example. Of course, a configuration wherein different values are set based on the number of object individual subjects, direction of faces and the combination thereof, for example, can be conceived.

In the event that a positive determination result is obtained in step S1128, processing procedures corresponding to a release action starting from step S1130 is executed. The release action described here is an action for storing the imaged image data obtained at that time as still image data in a storage medium (memory card 40) as described earlier. That is to say, this corresponds to a case wherein the user is performing a manual shutter operation, and the imaged image data obtained at that time is stored in the recording medium as still image data in response to the shutter operation.

In step S1130, determination is made regarding whether or not conditions are currently satisfied for executing a release action. Conditions may include, for example, whether in a focused state (in the event that auto focus control is set to on), whether the pan/tilt mechanism of the platform 10 is in a still state, and so on.

In the event that a negative determination result is obtained in step S1130, the flow returns to step S1101, and a state conditions are satisfied for executing a release action is awaited. On the other hand, in the event that a negative determination result is obtained in step S1130, a release action is executed in step S1131. Thus, imaged image data of an optimal composition can be recorded as still image data with the present embodiment.

Upon the release action ending, initialization setting is performed in step S1132 regarding certain parameters. In this processing, the initial value of the mode flag f is set to zero, and the zoom lens position is also returned to the initial position set beforehand.

After executing step S1132, the processing is returned to step S1101. Returning the processing from step S1132 to step S1101 means that the actions of searching for subjects, obtaining an optimal composition in accordance with the direction in which the object individual subjects detected by this searching are facing, and the number of object individual subjects, and performing imaging recording (release action), are automatically repeatedly performed.

The release action in the case of FIG. 45 described above is an operation for recording a still image to a recording medium from the imaged image, but in a broader sense, the release action according to the present embodiment encompasses acquiring still image data as appropriate from imaged images for example, including recording the still image in a recording medium. Accordingly, an action wherein still image data is acquired from the imaged image by the digital still camera 1 according to the present embodiment for transfer to another recording device or the like via a data interface or the like, for example, is also included in the release action.

With the procedures in FIG. 45 described so far, first, in steps S1108 and S1109, pan/tilt control is performed for capturing, wherein the total subject center of gravity Gt of one or more object individual subjects is positioned at the origin coordinates P in the screen based on the movement amount $S_{pan}$, $S_{tilt}$ obtained with the above Expression 5 in steps S1108 and S1109. At the next stage, the horizontal offset amount Δx is obtained based on the number of object individual subjects, and the relation of face directions detected for each of the object individual subjects, and pan control is performed wherein the total subject center of gravity Gt is moved in the left or right direction by an amount corresponding to the horizontal offset amount Δx, with the vertical line passing through the origin coordinate P which is the image region division line Ld (Y-axial line) as a reference. Further, tilt control is performed wherein the total subject center of gravity Gt is moved up or down by an amount corresponding to the vertical offset amount Δy, with the horizontal line passing through the origin coordinate P as a reference.

In light of the above, it can be said that the pan/tilt control of the procedures in FIG. 45 involves first obtaining movement amount $S_{pan}$, $S_{tilt}$ by the following Expression 7

$$(S_{pan}, S_{tilt}) = \frac{\sum_{i=0}^{n-1} p(x_i, y_i) + (\Delta_x, \Delta_y)}{n}$$

and then performing control of the pan mechanism for obtaining movement amount within the screen corresponding to the movement amount $S_{pan}$, and control of the tilt mechanism for obtaining movement amount within the screen corresponding to the movement amount $S_{tilt}$.

Figure 46:
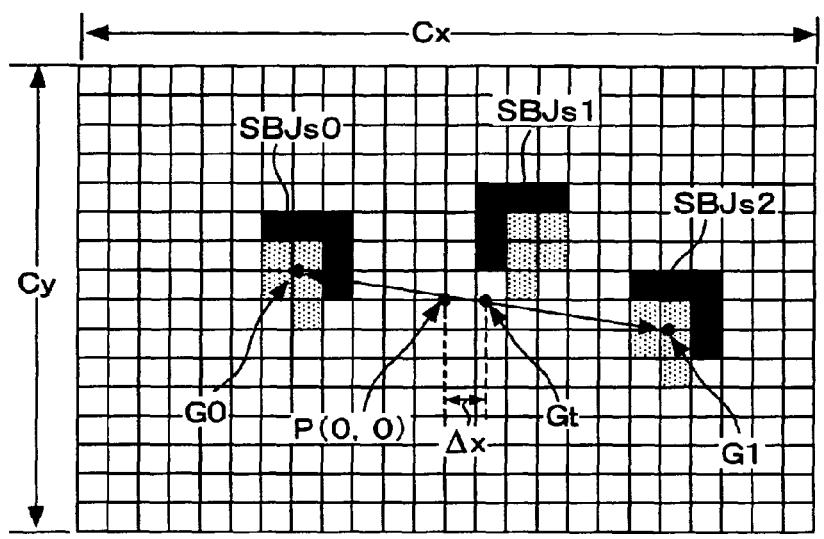
FIG. 46 is a diagram schematically illustrating an example of composition control, with a second example of composition control, in a case wherein the number of individual subjects detected is three.

Next, composition control according to a second example of the present embodiment will be described. A situation corresponding to the composition control of the second example is shown in FIG. 46, illustrating a state wherein three object individual subjects SBJs0, SBJs1, and SBJs2, have been distinguished. Of these object individual subjects, the face direction detected for the object individual subjects SBJs0 and SBJs2 is left, while the face direction detected for the object individual subject SBJs1 is right. In this case, the face directions of all of the object individual subjects are not the same, so with the first composition control example, the composition would be set such that the total subject center of gravity Gt is set on the vertical line passing through the origin coordinate P which is the image region division line Ld (Y-axial line), as described with FIG. 43B and other drawings.

However, the fact that the two object individual subjects SBJs0 and SBJs2, which are a majority of the three object individual subjects are facing in the same direction (the face direction is the same), might lead us to think that if the object individual subjects are looking at anything of importance, the probability that this would be in the direction in which the two object individual subjects SBJs0 and SBJs2 are facing is greater than the probability that this would be in the direction in which the one object individual subject SBJs1 is facing. Based on this idea, we can say that leaving space in the region toward which the two object individual subjects SBJs0 and SBJs2 are facing will result in greater probability of a good composition being obtained. In this case, the two object individual subjects SBJs0 and SBJs2 are detected facing the left, so the total subject center of gravity Gt of the total subject image portion made up of the three object individual subjects SBJs0, SBJs1, and SBJs2 is moved to the image region which is to the right of the image region division line Ld in the screen, so as to obtain a good composition.

Accordingly, with the composition control according to this second example, in the event that the number of same face directions are a majority of the entire number of object individual subjects by a predetermined percentage, this same face direction is taken as the reference face direction, with regard to the region of face directions detected for each of the multiple individual subjects. The reference face direction can also be said to indicate the direction in which the entirety of the group of multiple object individual subjects is facing as a whole in the screen. The horizontal offset amount $\Delta x$ is obtained and set based on this reference face direction. In the case shown in FIG. 46, a composition wherein the total subject center of gravity Gt is set to the right of the vertical line passing through the origin coordinates P due to such composition control.

Also, although not shown here, in the event that not enough same face directions are obtained to be a majority by the predetermined percentage, i.e., in the event that the above reference face direction is indeterminate, the idea with the present embodiment is that a composition is preferably set with the total subject image portion being situated around the middle in the horizontal direction. Accordingly, in this case, zero is set for the horizontal offset amount $\Delta x$.

FIG. 47 illustrates a procedure example to be executed by the subject detection processing unit 201, composition determination block 62, and communication control processing block 64 shown in FIG. 5, in accordance with the above-described second example.

Of the procedures shown in FIG. 47, the procedures from step S1201 through S1232 are each the same as the procedures from step S1101 through S1132, with the exception of steps S1221-1 and S1222-2. Step S1221-1 and the subsequent step S1222-2 have been inserted as procedures to execute in the event that a negative determination result has been obtained in step S1222. That is to say, steps S1221-1 and S1222-2 are executed in the event that the number of object individual subjects is a plurality, and the relation of face directions detected for each of the object individual subjects is not all the same face direction at the stage that size adjustment of the total subject image portion has been completed.

In step S1222-1, processing is executed for determining the reference face direction. To this end, as described above for example, determination is made regarding whether or not a set of object individual subjects having the same face direction is made up of a number of object individual subjects great enough to be a majority by a certain percentage or higher of the total number of object individual subjects that have been detected, with regard to the multiple object individual subjects and the relation in face directions. In the event that there is such a set of object individual subjects, the face direction of this set of object individual subjects is determined to be a valid reference face direction. On the other hand, in the event that there is no such set of object individual subjects, determination is made that there is no reference face direction.

With regard to the above predetermined percentage, what sort of value is to be actually set should be determined as appropriate, taking into consideration an appropriate composition with regard to the number of object individual subjects and the relation of face directions of the object individual subjects in actual practice. While one fixed value may be basically set, an arrangement may be made wherein different predetermined values are set in accordance with the number of determined object individual subjects, for example.

Further, other algorithms for reference face direction detection processing may be conceived other than the above. For example, an armament may be made wherein the face direction of the greatest set of object individual subjects having the same face direction is simply taken as the value reference face direction, without taking into consideration the percentage thereof as to the total number of object individual subjects, for example. In this case, if the number of object individual subjects in each set having difference face directions is the same, determination is made that there is no reference face direction.

In step S1222-2, determination is made regarding whether or not a valid reference face direction has been determined as the result of the face direction determining processing in step S1222-1.

Now, in the event that a positive determination result has been obtained, the flow proceeds to step S1223. In step S1223 in this case, the coefficient D is determined based on the reference face direction determined in step S1222-1, and the horizontal offset amount $\Delta x$ is determined and set.

On the other hand, in the event that a negative determination result has been obtained in step S1222-2, this means that a valid reference face direction was not determined in the previous step S1222-1, neither right nor left. In this case, the flow proceeds to step S1224, whereby the horizontal offset amount $\Delta x$ is set to zero. Thus, inserting the steps S1222-1 and S1222-2 realizes the composition control according to the second example as described with reference to FIG. 46.

Note that the procedures shown in FIGS. 45 and 47 include procedures which can be viewed as composition determination processing, and procedures for controlling composition matching in accordance with the determination results (composition control), in a mixed manner, while some steps perform composition determination and composition matching at the same time. This is due to the procedures shown in FIGS. 45 and 47 being specifically illustrated in accordance with actual practice. The basic concept of the embodiment should be viewed as application of the configurations for composition determination illustrated as the composition determination block 200, composition determination block 62, and so forth, described so far. That is to say, the imaging system according to the present embodiment can be viewed as determining and deciding a composition deemed optimal in accordance with the number of object individual subjects, and appropriately performing zoom control and pan/tilt control such that imaged image data of the determined composition is actually obtained (reflected).

Also, with the specific examples of composition determination and composition control described in the drawings from FIGS. 40A and 40B on, description has been made that face direction detection is in two stages of left or right, but in reality, there may be configurations made for face direction detection processing including facing straight ahead, in addition to left and right. In this case as well, the composition control based on an embodiment of the present invention can be validly applied.

For example, in the event that a single object individual subject is detected as with the case in FIG. 42, and the face is detected to be facing straight ahead, one conceivable arrangement would be to situate the subject position in the horizontal direction at around the middle of the screen, such that the center of gravity G is more or less on the image region division line Ld (Y-axis). However, this composition is often typified as a poor example of composition. Accordingly, an arrangement can be conceived wherein, in the event that the number of detected individual subjects is one, and the face direction is straight ahead, the horizontal offset amount Δx is set such as with the composition in FIG. 42, or a composition so as to be linearly symmetrical across the image region division line Ld as to the composition in FIG. 42. This allows a good composition to be obtained in accordance with the Rule of Thirds.

Also, in the event that two or more object individual subjects are detected, and the face direction of all of the object individual subjects is straight ahead, or the reference face direction is straight ahead, an arrangement can be conceived wherein the horizontal offset amount Δx is set upon having set the coefficient D in Expression 1 to zero, so as to obtain the composition.

Also, in the event that vertical face directions can be detected, the composition control based on an embodiment of the present invention can be performed in accordance with the face direction detection results in the vertical direction. In this case, the total subject center of gravity Gt is moved vertically with the image region division line Ld (a horizontal line (X-axis) passing through the origin coordinates, for example, will suffice) as a reference.

Further, in the event that diagonal face directions can be detected, the composition control based on an embodiment of the present invention can be performed in accordance with the face direction detection results in the diagonal direction, which is a composite of the horizontal direction and vertical direction. In this case, a line crossing the screen orthogonally to the detected diagonal face direction (a horizontal line passing through the origin coordinates, for example) is set as the image region division line Ld, and the total subject center of gravity Gt is moved to one of the image regions section by this image region division line Ld.

Further, in the event that face direction detection is enabled in two stages or three or more states in the horizontal direction of vertical direction for example, an arrangement can be conceived wherein an algorithm is employed in which the horizontal offset amount Δx (or vertical offset amount Δy) is variable in accordance with the degree of stage of direction thus detected.

Also, as shown in FIG. 41, in this case, the reference point through which the reference line passes has been described as being the origin coordinates in the screen, but the position of the reference point may be set to a position other than the origin coordinates for the purpose of obtaining a better composition, for example.

Also, it should be noted that the examples described with reference to FIGS. 14 through 23 are partial examples, and that other devices, systems, application software, and so forth, to which the composition determination according to the present invention can be applied, can be conceived.

Also, with description of the embodiment so far, the subject (object individual subject) has been described as being a person, but the present invention can be applied can also be applied to cases of subjects other than people, such as animals, for example.

Also, the composition determined with embodiments of the present invention (optimal composition) is not necessarily restricted to compositions determined by applying composition setting techniques such as the Rule of Thirds to the element of the number of object individual subjects. Even compositions which are generally thought to be poor may be felt by the user to be interesting or even better, depending on how the composition is set. Accordingly, the composition determined with embodiments of the present invention (optimal composition) is not particularly restricted in actual use, and can be optionally set taking into consideration usability, elements of entertainment, and so forth.

Also, with the above embodiments, real subjects and unreal subjects (still subjects) are distinguished from detected individual subjects, and the real subjects are taken as being the object of composition determination. This is assuming use demanding faces in posters and so forth to be eliminated and optimal compositions to be obtained with only real people as the subject. However, there clearly may be configurations based on embodiments of the present invention wherein unreal subjects (still subjects) are to be the object of composition determination. Such configuration are also applicable as configurations of composition determination based on embodiments of the present invention, and are useful depending on the application thereof.

Also, in relation to this, composition determination based on embodiments of the present invention may be made configured such that the subjects to be taken as the object of composition determination can be switched between real subjects and unreal subjects, in accordance with user operations or determination made based on predetermined device operation conditions or the like, for example.

Also, with the above embodiment, description has been made regarding a configuration wherein a detected individual subject which is in a still state is detected as being a still subject by using movement detection, but techniques other than movement detection can be conceived as well.

For example, differentiation based on temperature can be conceived. That is to say, a real subject which is a real person would have temperature around body temperature, which would usually be different to the ambient temperature. On the other hand, an unreal subject such as a poster or the like would have temperature which is the same as the ambient temperature, since it is a thing. Thus real subjects and unreal subjects can be differentiated.

Once conceivable configuration for this would be to detect the temperature distribution within the image frame of the imaged image by employing so-called thermography technology. Of the detected individual subjects in the image frame, those with the same temperature as the ambient temperature can be differentiated as unreal subjects (still subjects), and those not the same as real subjects.

Also, as described above, at least a part of the configuration of embodiments of the present invention can be realized by a CPU or DSP executing a program. Such a program may be written into and stored in ROM for example at the time of manufacturing, or may be stored in a removable storage medium and installed (including updating) from the storage medium so as to be stored in a nonvolatile storage region corresponding to the DSP or flash memory 30 or the like. Also, an arrangement may be conceived wherein the program can be installed by control from another host device via a data interface such as USB or IEEE 1394 or the like. Further, a configuration can be conceived wherein the program is stored in a storage device on a network such as a server, and a digital still camera 1 which has been provided with networking functions can obtain the program by downloading from the server.

It should be understood by those skilled in the art that various modifications, combinations, sub-combinations and alterations may occur depending on design requirements and other factors insofar as they are within the scope of the appended claims or the equivalents thereof.

What is claimed is:

1. A composition determination device comprising:
   subject detection means configured to detect a subject in an image based on acquired image data;
   still detection means configured to detect a still state, with an image based on said image data, or a subject detected by said subject detection means, as an object thereof; and
   composition determination means configured to determine a composition, with only real subjects or only unreal subjects, of subjects detected by said subject detection means, as the object thereof, based on detection results of said still detection means, wherein determining a composition comprises changing the position of a subject or subjects within an image frame,
   wherein when there are one or more real subjects in an image, determining a composition comprises determining a face direction for each of the real subjects and automatically shifting a total center of gravity for the real subjects according to the determined face directions and the number of real subjects in the image,
   wherein the amount of shift is calculated by adding the centers of gravity for the real subjects and dividing by the number of subjects.

2. The composition determination device according to claim 1, further comprising:
   distinguishing means configured to distinguish between real subjects and unreal subjects with regard to subjects detected by said subject detection means, based on detection results of a still region by said still detection means, obtained by said still detection means detecting a still region which is still within the image, as detection results with an image based on image data as the object thereof;
   wherein said composition determination means determine a composition with the real subjects, or unreal subjects, distinguished by said distinguishing means, as the object thereof.

3. The composition determination device according to claim 1, further comprising:
   distinguishing means configured to distinguish between real subjects and unreal subjects by distinguishing subjects, from the subjects detected by said subject detecting means, such that subjects which have been detected as being still subjects as the detection result of said still detection means are distinguished as being unreal subjects, and distinguishing subjects not detected as said still subjects are distinguished as being real subjects;
   wherein said composition determination means determine a composition with the real subjects, or unreal subjects, distinguished by said distinguishing means, as the object thereof.

4. The composition determination device according to claim 1, further comprising:
   masking means configured to execute masking processing in which a still region, obtained by said still detection means detecting a still region which is still within the image, as detection results with an image based on image data as the object thereof, or other than said still region, is excluded from said screen of image data as being an object of said subject determination;
   wherein said subject detection means detect one or the other of real subjects and unreal subjects by inputting image data which has been subjected to masking processing by said masking means and executing subject detection;
   and wherein said composition determination means determine a composition with subjects detected by said subject detection means as the object thereof.

5. The composition determination device according to claim 1, further comprising:
   masking means configured to execute masking processing in which, a still region detected by said still detection means detecting a still region which is still within the image obtained as detection results with an image based on image data as the object thereof, or other than said still region, is excluded from said screen of image data as being an object of said subject determination;
   wherein said subject detection means detect one or the other of real subjects and unreal subjects by inputting image data which has been subjected to masking processing by said masking means and executing subject detection;
   and wherein said composition determination means determine a composition with subjects detected by said subject detection means as the object thereof.

6. The composition determination device according to claim 1, further comprising:
   information holding means configured to hold still subject related information made up of predetermined information relating to each still subjects detected as being still as the result of detection processing performed by said still detection means with subjects detected by said subject detection means as the object thereof; and
   distinguishing means configured to distinguish, from subjects detected by said subject detection means, subjects which match said still subjects as being unreal subjects, and subjects which do not match said still subjects as being real subjects, based on said still subject related information;
   wherein said composition determination means determine a composition with real subjects, or unreal subjects, distinguished by said distinguishing means, as the object thereof.

7. The composition determination device according to claim 6;
   wherein said still detection means detect still images from candidates of real subjects which have been detected by said subject detection means and further determined to match said still subject distinguished by said distinguishing means;
   and wherein said composition determination means determine a composition with still subjects detected by said still detection means as real subjects as the object thereof.

8. The composition determination device according to claim 6, further comprising:
   movement state detection means configured to detect movement of the composition determination device itself; and
   deleting means configured to delete still subject related information held in said information holding means, in accordance with movement of said composition determination device itself having been detected by said movement state detection means.

9. The composition determination device according to claim 8;
   wherein said movement state detection means are arranged to not detect, as movement, any movement of said composition determination device itself which is due to action of a movable mechanism unit capable of moving said composition determination device according to a predetermined form;

and wherein said movement state detection means are arranged to detect, as movement, any movement of said composition determination device itself which is due force other than that of said movable mechanism unit while said movable mechanism unit is operating.

10. The composition determination device according to claim 1, further comprising:

position information setting means configured to set pan/tilt position information indicating a pan position and/or tilt position of an imaging apparatus, of which an imaging view angle is changed in the pan direction and/or tilt direction, in the event that position information of said still subject detected by said still detection means indicates that said still subject is positioned at a limit position in the horizontal and/or vertical direction within an image frame of an image, based on image data obtained by said imaging apparatus acquiring imaged image data.

11. The composition determination device according to claim 10;

wherein said information holding means include said pan/tilt position information in said still subject related information;

and wherein said distinguishing means compare said pan/tilt position information for each subject, included in said still subject related information, with said pan/tilt position information regarding a subject detected at said limit position by said subject detection means, and perform distinguishing in which subjects matching said pan/tilt position information included in said still subject related information are taken to be unreal subjects, and subjects not matching said pan/tilt position information included in said still subject related information are taken to be real subjects.

12. The composition determination device according to claim 1, further comprising:

position information setting means configured to obtain absolute position corresponding angle information indicating an absolute angle in the pan direction and/or tilt direction, based on image frame size in the horizontal and/or vertical direction within an image, based on image data obtained by an imaging apparatus, of which an imaging view angle is changed in the pan direction and/or tilt direction, acquiring imaged image data, and the position of a subject detected within the image based on said imaged image data, and take this absolute position corresponding angle information as position information regarding the subject detected by said subject detection means.

13. The composition determination device according to claim 12;

wherein said information holding means include the position information of said absolute position corresponding angle information in said still subject related information;

and wherein said distinguishing means compare the position information of said absolute position corresponding angle information for each subject, included in said still subject related information, with the position information of said absolute position corresponding angle information regarding a subject detected at said limit position by said subject detection means, and perform distinguishing in which subjects matching the position information of said absolute position corresponding angle information included in said still subject related information are taken to be unreal subjects, and subjects not matching the position information of said absolute position corresponding angle information included in said still subject related information are taken to be real subjects.

14. The composition determination device according to claim 1;

wherein said subject detection means are configured to perform subject detection by individually recognizing features of each subject, and include individual recognition information capable of individually recognizing the subjects in detection information;

and wherein said information holding means include said individual recognition information for each still subject in said still subject related information;

and wherein said distinguishing means compare said individual recognition information for each subject, included in said still subject related information, with said individual recognition information regarding each subject included in detection information from said subject detection means, and perform distinguishing in which subjects matching said individual recognition information included in said still subject related information are taken to be unreal subjects, and subjects not matching said individual recognition information included in said still subject related information are taken to be real subjects.

15. A composition determination method comprising the steps of:

first detecting, of a subject in an image based on acquired image data;

second detecting, of a still state, with an image based on said image data, or a subject detected in said first detecting, as an object thereof; and determining a composition, with only real subjects or only unreal subjects, of subjects detected in said first detecting, as the object thereof, based on detection results of said second detecting, wherein determining a composition comprises changing the position of a subject or subjects within an image frame, wherein when there are one or more real subjects in an image, determining a composition comprises determining a face direction for each of the real subjects and automatically shifting a total center of gravity for the real subjects according to the determined face directions and the number of real subjects in the image, wherein the amount of shift is calculated by adding the centers of gravity for the real subjects and dividing by the number of subjects.

16. A non-transitory computer-readable medium having stored thereon a computer-readable program, causing a composition determination device to execute comprising the steps of:

first detecting, of a subject in an image based on acquired image data;

second detecting, of a still state, with an image based on said image data, or a subject detected in said first detecting, as an object thereof; and determining a composition, with only real subjects or only unreal subjects, of subjects detected in said first detecting, as the object thereof, based on detection results of said second detecting, wherein determining a composition comprises changing the position of a subject or subjects within an image frame, wherein when there are one or more real subjects in an image, determining a composition comprises determining a face direction for each of the real subjects and automatically shifting a total center of gravity for the real subjects according to the determined face directions and the number of real subjects in the image, wherein the amount of shift is calculated by adding the centers of gravity for the real subjects and dividing by the number of subjects.

17. A composition determination device comprising:

a subject detection unit configured to detect a subject in an image based on acquired image data;

a still detection unit configured to detect a still state, with an image based on said image data, or a subject detected by said subject detection unit, as an object thereof; and a composition determination unit configured to determine a composition, with only real subjects or only unreal subjects, of subjects detected by said subject detection unit, as the object thereof, based on detection results of said still detection unit, wherein determining a composition comprises changing the position of a subject or subjects within an image frame, wherein when there are one or more real subjects in an image, determining a composition comprises determining a face direction for each of the real subjects and automatically shifting a total center of gravity for the real subjects according to the determined face directions and the number of real subjects in the image, wherein the amount of shift is calculated by adding the centers of gravity for the real subjects and dividing by the number of subjects.

\* \* \* \* \*